US012738527B2

(12) United States Patent
Yoshitomi et al.

(10) Patent No.: US 12,738,527 B2
(45) Date of Patent: Sep. 15, 2026

(54) METHOD FOR FABRICATING SECONDARY BATTERY

(71) Applicant: SEMICONDUCTOR ENERGY LABORATORY CO., LTD., Atsugi (JP)

(72) Inventors: Shuhei Yoshitomi, Ayase (JP); Tetsuji Ishitani, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 726 days.

(21) Appl. No.: 18/006,206

(22) PCT Filed: Jul. 21, 2021

(86) PCT No.: PCT/IB2021/056566
§ 371 (c)(1),
(2) Date: Jan. 20, 2023

(87) PCT Pub. No.: WO2022/023883
PCT Pub. Date: Feb. 3, 2022

(65) Prior Publication Data

US 2023/0335782 A1 Oct. 19, 2023

(30) Foreign Application Priority Data

Jul. 31, 2020 (JP) ................................ 2020-130900

(51) Int. Cl.
*H01M 10/04* (2006.01)

(52) U.S. Cl.
CPC ..... *H01M 10/049* (2013.01); *H01M 10/0409* (2013.01)

(58) Field of Classification Search
CPC ........... H01M 10/049; H01M 10/0409; H01M 50/171; Y02E 60/10; H01G 11/52
See application file for complete search history.

(56) References Cited

U.S. PATENT DOCUMENTS 6,235,433 B1 * 5/2001 Amano ................. H01M 6/181 429/300
8,404,383 B2 3/2013 Onishi et al.
(Continued)

FOREIGN PATENT DOCUMENTS

CN 102687333 A 9/2012
CN 103384937 A 11/2013
(Continued)

OTHER PUBLICATIONS

International Search Report (Application No. PCT/IB2021/056566) Dated Oct. 19, 2021.
(Continued)

*Primary Examiner* — Thomas J Hong
*Assistant Examiner* — Jose K Abraham
(74) *Attorney, Agent, or Firm* — Fish & Richardson P.C.

(57) ABSTRACT

At least part of a fabrication process of a secondary battery is automated. A highly reliable secondary battery is provided. The secondary battery is fabricated by placing a first electrode over a first exterior body; placing a separator over the first electrode; placing a second electrode over the separator; dripping an electrolyte on at least one of the first electrode, the separator, and the second electrode; placing a resin layer over the first exterior body; impregnating the at least one of the first electrode, the separator, and the second electrode with the electrolyte; then placing a second exterior body over the first exterior body to cover the first electrode, the separator, and the second electrode; curing at least part of the resin layer by irradiation of the resin layer with ultraviolet light under reduced pressure; and sealing the first electrode, the separator, and the second electrode with the first exterior body and the second exterior body under atmospheric pressure after the ultraviolet light irradiation.

11 Claims, 20 Drawing Sheets

(56) References Cited

U.S. PATENT DOCUMENTS

| | | | | |
|---|---|---|---|---|
| 9,039,789 | B2 | 5/2015 | Takeda et al. | |
| 10,741,834 | B2 | 8/2020 | Zhang et al. | |
| 10,777,782 | B2 | 9/2020 | Adams et al. | |
| 2002/0110736 | A1 | 8/2002 | Kweon et al. | |
| 2003/0104279 | A1 | 6/2003 | Miyazaki et al. | |
| 2004/0142241 | A1 | 7/2004 | Nagayama | |
| 2006/0263690 | A1 | 11/2006 | Suhara et al. | |
| 2007/0117014 | A1 | 5/2007 | Saito et al. | |
| 2008/0241693 | A1 | 10/2008 | Fukuchi et al. | |
| 2009/0087362 | A1 | 4/2009 | Sun et al. | |
| 2009/0104532 | A1 | 4/2009 | Hosoya | |
| 2009/0214954 | A1 | 8/2009 | Onishi et al. | |
| 2010/0086854 | A1 | 4/2010 | Kumar et al. | |
| 2010/0247986 | A1 | 9/2010 | Toyama et al. | |
| 2013/0000110 | A1 | 1/2013 | Takeda et al. | |
| 2013/0029205 | A1* | 1/2013 | Adams | H01M 4/70 429/185 |
| 2013/0052534 | A1 | 2/2013 | Fujiki et al. | |
| 2013/0323567 | A1 | 12/2013 | Saki et al. | |
| 2013/0323596 | A1 | 12/2013 | Morita et al. | |
| 2014/0212759 | A1 | 7/2014 | Blangero et al. | |
| 2015/0008364 | A1 | 1/2015 | Endo | |
| 2016/0006032 | A1 | 1/2016 | Paulsen et al. | |
| 2016/0013478 | A1 | 1/2016 | Satow et al. | |
| 2016/0087305 | A1* | 3/2016 | Yoneda | H01M 10/0436 |
| 2016/0111710 | A1* | 4/2016 | Momo | H01M 10/0409 204/278 |
| 2016/0156012 | A1* | 6/2016 | Takahashi | H01M 50/536 429/163 |
| 2016/0156032 | A1 | 6/2016 | Lee et al. | |
| 2016/0268601 | A1 | 9/2016 | Paulsen et al. | |
| 2016/0276659 | A1 | 9/2016 | Choi et al. | |
| 2018/0013130 | A1 | 1/2018 | Ochiai et al. | |
| 2018/0131029 | A1* | 5/2018 | Watanabe | H01M 10/0404 |
| 2018/0145317 | A1 | 5/2018 | Momma et al. | |
| 2018/0145368 | A1 | 5/2018 | Ochiai et al. | |
| 2019/0245199 | A1 | 8/2019 | Zeng et al. | |
| 2019/0273246 | A1 | 9/2019 | Kono | |
| 2020/0058954 | A1 | 2/2020 | Oguni et al. | |
| 2020/0176770 | A1 | 6/2020 | Takahashi et al. | |
| 2020/0185665 | A1 | 6/2020 | Takahashi et al. | |
| 2020/0220173 | A1 | 7/2020 | Jo et al. | |
| 2021/0083281 | A1 | 3/2021 | Mikami et al. | |
| 2021/0184214 | A1 | 6/2021 | Mikami et al. | |
| 2021/0296701 | A1 | 9/2021 | Kadoma et al. | |
| 2021/0313571 | A1 | 10/2021 | Momma et al. | |
| 2021/0408516 | A1 | 12/2021 | Inoue et al. | |
| 2021/0408593 | A1 | 12/2021 | Yoneda et al. | |
| 2022/0131146 | A1 | 4/2022 | Saito et al. | |
| 2022/0181697 | A1 | 6/2022 | Narita et al. | |
| 2022/0285691 | A1 | 9/2022 | Ikenuma et al. | |
| 2022/0359870 | A1 | 11/2022 | Mikami et al. | |
| 2025/0105282 | A1 | 3/2025 | Liu et al. | |

FOREIGN PATENT DOCUMENTS

| | | | |
|---|---|---|---|
| CN | 105449261 | A | 3/2016 |
| CN | 105655554 | A | 6/2016 |
| CN | 113140726 | A | 7/2021 |
| EP | 1798790 | A | 6/2007 |
| GB | 2477552 | | 8/2011 |
| GB | 2489640 | | 10/2012 |
| JP | 2000-203842 | A | 7/2000 |
| JP | 2002-141102 | A | 5/2002 |
| JP | 2002-216760 | A | 8/2002 |
| JP | 2003-045486 | A | 2/2003 |
| JP | 2004247159 | A * | 9/2004 |
| JP | 2005-129913 | A | 5/2005 |
| JP | 2007-257859 | A | 10/2007 |
| JP | 2009-218540 | A | 9/2009 |
| JP | 2010-080407 | A | 4/2010 |
| JP | 2012-174442 | A | 9/2012 |
| JP | 2012-204279 | A | 10/2012 |
| JP | 2013-016286 | A | 1/2013 |
| JP | 2013-519196 | | 5/2013 |
| JP | 2015-099722 | A | 5/2015 |
| JP | 2016-028386 | A | 2/2016 |
| JP | 2017-117729 | A | 6/2017 |
| JP | 2019-009130 | A | 1/2019 |
| JP | 2019-212464 | A | 12/2019 |
| KR | 2012-0093839 | A | 8/2012 |
| KR | 2014-0003519 | A | 1/2014 |
| WO | WO-2011/095758 | | 8/2011 |
| WO | WO-2012/077707 | | 6/2012 |
| WO | WO-2012/114951 | | 8/2012 |

OTHER PUBLICATIONS

Written Opinion (Application No. PCT/IB2021/056566) Dated Oct. 19, 2021.

Zhang.J et al., "Trace doping of multiple elements enables stable battery cycling of LiCoO2 at 4.6 V", Nature Energy, Jun. 17, 2019, vol. 4, pp. 594-603.

Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.

Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.

Okumura.T et al., "Correlation of lithium ion distribution and X-ray absorption near-edge structure in O3- and O2-lithium cobalt oxides from first-principle calculation", J. Mater. Chem. (Journal of Materials Chemistry), 2012, vol. 22, pp. 17340-17348.

Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.

Wang.Z et al., "Eels analysis of cation valence states and oxygen vacancies in magnetic oxides", Micron, Oct. 1, 2000, vol. 31, No. 5, pp. 571-580, Elsevier.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.

Chen.Z et al., "Staging Phase Transitions in LixCoO2", J. Electrochem. Soc. (Journal of the Electrochemical Society), Oct. 29, 2002, vol. 149, No. 12, pp. A1604-A1609.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Zou.M et al., "Synthesis and Electrochemical Performance of High Voltage Cycling LiM0.05Co0.95O2 as Cathode Material for Lithium Rechargeable Cells", Electrochemical and Solid-State Letters, Apr. 26, 2004, vol. 7, No. 7, pp. A176-A179.

Kim.Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.

Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.

(56) References Cited

OTHER PUBLICATIONS

Taguchi.N et al., "Characterization of MgO-coated-LiCoO2 particles by analytical transmission electron microscopy", Journal of Power Sources, Aug. 10, 2016, vol. 328, pp. 161-166, Elsevier.
Amatucci.G et al., "CoO2, the End Member of the LixCoO2 Solid Solution", J. Electrochem. Soc. (Journal of the Electrochemical Society), Mar. 1, 1996, vol. 143, No. 3, pp. 1114-1123.
Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.
Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.
Shao-horn.Y et al., "Probing Lithium and Vacancy Ordering in O3 Layered Lix CoO2 (x=0.5) : An Electron Diffraction Study", J. Electrochem. Soc. (Journal of the Electrochemical Society), Feb. 6, 2003, vol. 150, No. 3, pp. A366-A373.
Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507-21.
Zhang.S et al., "Surface engineering of LiCoO2 by a multifunctional nanoshell for stable 4.6V electrochemical performance", Energy Storage Materials, Feb. 21, 2023, vol. 57, pp. 289-298.
Yano.A et al., "Capability and Reversibility of LiCoO2 during Charge/Discharge with O3/H1-3 Layered Structure Change", J. Electrochem. Soc. (Journal of the Electrochemical Society), May 11, 2021, vol. 168, No. 5, pp. 050517-1-050517-11.

* cited by examiner

S07

S08

S10

S01

S02

1415
1421
1320
1413
1422
1414
1300
1301a 1322
1320
1325
1301a
1324
1326

Gear 1305
Inverter 1312
Motor 1304
1316
Motor controller 1303
1321
Battery controller 1302
Second battery 1311
1320
First battery 1301a
1415
1320
First battery 1301b
DCDC 1310
DCDC 1306
Stereo 1313
Power window 1314
Lamps 1315
Low-voltage system
Electric power steering 1307
Heater 1308
Defogger 1309
High-voltage system
Rear motor 1317

2800
2802
2803
2806
2804
2801
2805
2807

2800
2802
2803
2806
2804
2801
2805
2807

2802
2803
2806

2802
2803

2802
2803

METHOD FOR FABRICATING SECONDARY BATTERY

This application is a U.S. National Phase Application under 35 U.S.C. § 371 of International Application PCT/IB2021/056566, filed on Jul. 21, 2021, which is incorporated by reference and claims the benefit of a foreign priority application filed in Japan on Jul. 31, 2020, as Application No. 2020-130900.

TECHNICAL FIELD

One embodiment of the present invention relates to a secondary battery and a fabrication method thereof. Another embodiment of the present invention relates to a portable information terminal, a vehicle, and the like each including a secondary battery. Another embodiment of the present invention relates to a manufacturing apparatus for a secondary battery.

Note that one embodiment of the present invention is not limited to the above technical field. Examples of the technical field of one embodiment of the present invention include a semiconductor device, a display device, a light-emitting device, a power storage device, a memory device, an electronic device, a lighting device, a method for driving any of them, and a method for manufacturing any of them.

Note that electronic devices in this specification mean all devices including power storage devices, and electro-optical devices including power storage devices, information terminal devices including power storage devices, and the like are all electronic devices.

Note that in this specification, a power storage device refers to every element and device having a function of storing power. For example, a power storage device (also referred to as a secondary battery) such as a lithium-ion secondary battery, a lithium-ion capacitor, and an electric double layer capacitor are included.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, and laptop computers, portable music players, digital cameras, medical equipment, next-generation clean energy vehicles such as hybrid electric vehicles (HVs), electric vehicles (EVs), and plug-in hybrid electric vehicles (PHVs), and the like, and the lithium-ion secondary batteries are essential as rechargeable energy supply sources for today's information society.

A lithium-ion secondary battery is composed of a positive electrode containing a positive electrode active material such as lithium cobalt oxide ($LiCoO_2$) or lithium iron phosphate ($LiFePO_4$), a negative electrode containing a negative electrode active material such as a carbon material, e.g., graphite capable of occluding and releasing lithium, and an electrolyte containing an organic solvent such as ethylene carbonate (EC) or diethyl carbonate (DEC), for example.

For the lithium-ion secondary batteries, high capacity, high performance, safety in various operating environments, and the like are required.

Patent Document 1 discloses a manufacturing apparatus for a laminated battery, which can improve manufacturing efficiency.

REFERENCE

Patent Document

[Patent Document 1] Japanese Published Patent Application No. 2017-117729

SUMMARY OF THE INVENTION

Problems to be Solved by the Invention

An object of one embodiment of the present invention is to automate at least part of a fabrication process of a secondary battery.

An object of one embodiment of the present invention is to provide a method for fabricating a secondary battery with a comparatively large size.

An object of one embodiment of the present invention is to fabricate a secondary battery efficiently in a short time. An object of one embodiment of the present invention is to fabricate a secondary battery with high yield. An object of one embodiment of the present invention is to provide a method for fabricating a secondary battery at lower manufacturing cost.

An object of one embodiment of the present invention is to provide a method for fabricating a highly reliable secondary battery. An object of one embodiment of the present invention is to provide a method for fabricating a highly safe secondary battery.

Note that the description of these objects does not preclude the existence of other objects. One embodiment of the present invention does not need to achieve all of these objects. Other objects can be derived from the description of the specification, the drawings, and the claims.

Means for Solving the Problems

One embodiment of the present invention is a method for fabricating a secondary battery, in which a first electrode is placed over a first exterior body; a separator is placed over the first electrode; a second electrode is placed over the separator; an electrolyte is dripped on at least one of the first electrode, the separator, and the second electrode; a resin layer is placed over the first exterior body; at least one of the first electrode, the separator, and the second electrode is impregnated with the electrolyte and then a second exterior body is placed over the first exterior body to cover the first electrode, the separator, and the second electrode; at least part of the resin layer is cured by irradiation of the resin layer with ultraviolet light under reduced pressure; and the first electrode, the separator, and the second electrode are sealed with the first exterior body and the second exterior body under atmospheric pressure after the ultraviolet light irradiation. One of the first electrode and the second electrode is a positive electrode, and the other is a negative electrode.

The first exterior body preferably includes a concave portion. The first electrode, the separator, and the second electrode are preferably placed in the concave portion.

Alternatively, one embodiment of the present invention is a method for fabricating a secondary battery, in which a plurality of stacks are placed over a first exterior body; a resin layer is placed over the first exterior body; a second exterior body is placed over the first exterior body to cover the plurality of stacks; at least part of the resin layer is cured by irradiation of the resin layer with ultraviolet light under reduced pressure; the plurality of stacks are sealed with the first exterior body and the second exterior body under atmospheric pressure after the ultraviolet light irradiation; and the first exterior body and the second exterior body are divided after the sealing to obtain separate secondary batteries each including the stack. Each of the plurality of stacks is formed by placing a first electrode over the first exterior body, placing a separator over the first electrode, placing a second electrode over the separator, and dripping an electrolyte on at least one of the first electrode, the separator, and the second electrode. One of the first electrode and the second electrode is a positive electrode, and the other is a negative electrode.

The first exterior body preferably includes a plurality of concave portions. It is preferable that one of the plurality of stacks be placed in corresponding one of the plurality of concave portions.

The resin layer is preferably placed in a frame-like shape to surround the first electrode, the separator, and the second electrode.

The sealing may be performed by irradiation of the resin layer with ultraviolet light to cure the resin layer. At this time, an area of the resin layer irradiated with the ultraviolet light during the sealing is preferably larger than an area of the resin layer irradiated with the ultraviolet light under the reduced pressure.

Alternatively, the sealing may be performed by thermocompression bonding.

The second exterior body preferably has a function of transmitting ultraviolet light at least in a region overlapping the resin layer.

The second exterior body preferably has a function of blocking ultraviolet light at least in a region overlapping at least one of the first electrode, the separator, and the second electrode.

It is preferable to include a step of connecting a first lead electrode to the first electrode and a step of connecting a second lead electrode to the second electrode before the ultraviolet light irradiation under the reduced pressure.

The electrolyte preferably contains fluorine.

The electrolyte preferably contains an ionic liquid.

One or both of the first electrode and the second electrode preferably contain graphene.

The first electrode preferably includes a first active material layer on one or both surfaces of a first current collector.

The second electrode preferably includes a second active material layer on one or both surfaces of a second current collector.

One embodiment of the present invention is a manufacturing apparatus for a secondary battery in which a stack of one or more positive electrodes, one or more separators, and one or more negative electrodes is provided between a first exterior body and a second exterior body. The manufacturing apparatus includes a transfer chamber, a first treatment chamber, and a second treatment chamber. The transfer chamber has a function of transferring the secondary battery during fabrication from the first treatment chamber to the second treatment chamber.

The first treatment chamber includes a first stage, a suction mechanism, an electrolyte dripping mechanism, and a sealant supply mechanism. The first stage has a function of supporting the secondary battery during fabrication. The suction mechanism has a function of attaching the components of the stack by suction and placing the components over the first exterior body. The electrolyte dripping mechanism has a function of dripping an electrolyte on the components of the stack. The sealant supply mechanism has a function of forming a resin layer over the first exterior body. The second treatment chamber includes a second stage, an exhaust mechanism, an exterior body support mechanism, and a first ultraviolet light irradiation mechanism. The second stage has a function of supporting the secondary battery that is transferred from the first treatment chamber during fabrication. The exhaust mechanism has a function of reducing pressure inside the second treatment chamber. The exterior body support mechanism has a function of supporting the second exterior body in a position facing the secondary battery that is transferred from the first treatment chamber during fabrication. The first ultraviolet light irradiation mechanism has a function of irradiating at least part of the resin layer with ultraviolet light through the first exterior body or the second exterior body.

The suction mechanism preferably has a function of attaching the first exterior body by suction and placing the first exterior body over the first stage.

The first treatment chamber preferably includes an inert gas supply mechanism. The inert gas supply mechanism preferably has a function of supplying an inert gas into the first treatment chamber. The inert gas is preferably an argon gas.

The manufacturing apparatus according to one embodiment of the present invention preferably further includes a third treatment chamber. The third treatment chamber includes a second ultraviolet light irradiation mechanism. The second ultraviolet light irradiation mechanism has a function of irradiating the resin layer with ultraviolet light through the first exterior body or the second exterior body. An area of the resin layer irradiated with ultraviolet light by the second ultraviolet light irradiation mechanism is larger than an area of the resin layer irradiated with ultraviolet light by the first ultraviolet light irradiation mechanism.

Effect of the Invention

According to one embodiment of the present invention, at least part of a fabrication process of a secondary battery can be automated.

According to one embodiment of the present invention, a method for fabricating a secondary battery with a relatively large size can be provided. In the case of mounting a secondary battery with high capacity, the number of secondary batteries to be mounted can be smaller than the number of small secondary batteries to be mounted. A reduction in the number of secondary batteries to be mounted allows easy control of each battery and reduces a load on a charging control circuit.

In the method for fabricating a secondary battery according to one embodiment of the present invention, sealing steps of a plurality of secondary batteries can be performed at a time; thus, a fabrication process of secondary batteries can be significantly shortened. Accordingly, manufacturing cost of secondary batteries can be reduced. In addition, secondary batteries can be fabricated efficiently in a short time. Moreover, secondary batteries can be fabricated with high yield.

According to one embodiment of the present invention, a method for fabricating a highly reliable secondary battery can be provided. According to another embodiment of the present invention, a method for fabricating a highly safe secondary battery can be provided.

Note that the description of these effects does not preclude the existence of other effects. One embodiment of the present invention does not need to have all the effects. Other effects can be derived from the description of the specification, the drawings, and the claims.

MODE FOR CARRYING OUT THE INVENTION

Figure 1A:
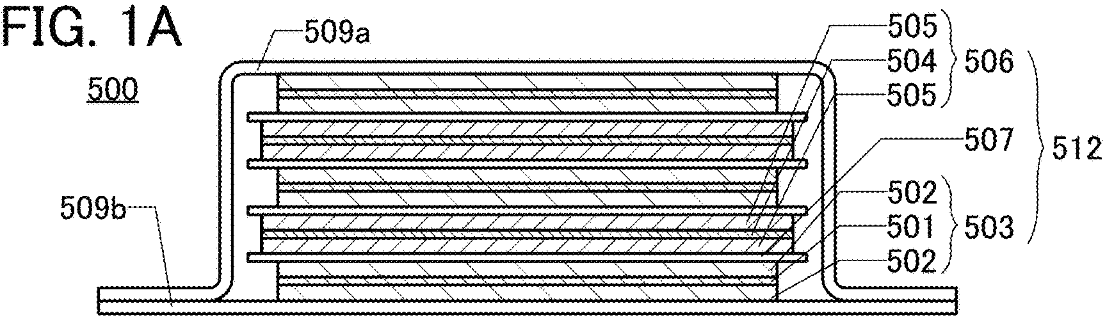
FIG. 1A is a cross-sectional view illustrating an example of a secondary battery.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be construed as being limited to the description in the following embodiments.

Note that in structures of the invention described below, the same portions or portions having similar functions are denoted by the same reference numerals in different drawings, and description thereof is not repeated. Furthermore, the same hatch pattern is used for the portions having similar functions, and the portions are not especially denoted by reference numerals in some cases.

The position, size, range, and the like of each component illustrated in drawings do not represent the actual position, size, range, and the like in some cases for easy understanding. Therefore, the disclosed invention is not necessarily limited to the position, size, range, and the like disclosed in the drawings.

Note that the term "film" and the term "layer" can be interchanged with each other depending on the case or circumstances. For example, the term "conductive layer" can be replaced with the term "conductive film." For another example, the term "insulating film" can be replaced with the term "insulating layer."

Embodiment 1

In this embodiment, methods for fabricating a secondary battery according to one embodiment of the present invention will be described with reference to FIG. 1 to FIG. 11.

In a fabrication process of a secondary battery, a stack of a positive electrode, a separator, and a negative electrode is put in a can or a bag-like exterior body, an electrolyte solution is injected, and then, sealing is performed in many cases. In such a method, it sometimes takes time to impregnate the insides of the positive electrode and the negative electrode with an electrolyte. In addition, in such a method, impregnation of the insides of the positive electrode and the negative electrode with an electrolyte is sometimes insufficient. Furthermore, such a method might cause outward diffusion of lithium ions from an inlet. Moreover, with such a method, the number of steps tends to increase. In addition, it is sometimes difficult to adjust the injection amount of the electrolyte solution with high accuracy. Accurate injection of a necessary amount of the electrolyte solution for a secondary battery can lead to mass production of secondary batteries with uniform characteristics.

In the method for fabricating a secondary battery according to one embodiment of the present invention, a first electrode is placed over a first exterior body, a separator is placed over the first electrode, a second electrode is placed over the separator, and an electrolyte is dripped on at least one of the first electrode, the separator, and the second electrode that are placed. Dripping of a plurality of drops of the electrolyte enables uniform or sufficient impregnation of the first electrode, the separator, or the second electrode with the electrolyte.

In addition, in the method for fabricating a secondary battery according to one embodiment of the present invention, a frame-like resin layer is placed over the first exterior body. An ultraviolet curable resin is preferably used for the resin layer. Then, a second exterior body is placed over the first exterior body to cover a stacked-layer structure (hereinafter also referred to as a stack) of the first electrode, the separator, and the second electrode, and the resin layer is irradiated with ultraviolet light under reduced pressure (also referred to as "in a reduced pressure atmosphere") so that at least part of the resin layer is cured. An exterior film is preferably used for each of the first exterior body and the second exterior body.

After at least the part of the resin layer is cured in an atmosphere with pressure reduced from atmospheric pressure, the secondary battery during fabrication is exposed to atmospheric pressure (also referred to as “in an atmospheric pressure atmosphere or under normal pressure”) so that atmospheric pressure is applied to the first exterior body and the second exterior body. Thus, the reduced pressure state of a space surrounded by the first exterior body, the second exterior body, and the frame-like resin layer is maintained. Consequently, mixing of impurities into the secondary battery can be inhibited.

In addition, when the dripped electrolyte is exposed from the reduced pressure atmosphere to the atmospheric pressure atmosphere, the dripped electrolyte can permeate through components in a short time. Therefore, the time taken to impregnate the surfaces and insides of the positive electrode and the negative electrode with the electrolyte can be shortened. Then, the insides of the positive electrode and the negative electrode can be sufficiently impregnated with the electrolyte.

Note that a lead electrode (also referred to as a lead wiring or a lead terminal) that functions as an external extraction terminal is made to project outside the exterior body. The lead electrode is provided to lead the positive electrode or the negative electrode of the secondary battery to the outside of the exterior body.

After that, in the method for fabricating a secondary battery according to one embodiment of the present invention, the stack is sealed under atmospheric pressure by the first exterior body and the second exterior body. For example, in the case of a thin-film (laminated) secondary battery, outer edges of the first exterior body and the second exterior body (four sides when viewed from above, in the case where the shape of the secondary battery is a thin rectangular solid) are sealed without any space. As a sealing method, a method in which a resin layer is irradiated with light such as ultraviolet light, a method in which an exterior body is subjected to thermocompression bonding, or the like can be used.

In this specification and the like, sealing refers to blocking a certain hermetically sealed region from the outside air; in a secondary battery, a stack and its vicinity are regarded as a hermetically sealed region, and blocking the hermetically sealed region from the outside air by surrounding the outside of the hermetically sealed region by an exterior body is referred to as sealing. In addition, after sealing, the end portions of the exterior body are folded to increase sealing strength, so that entry of impurities from the outside or release of a gas or the like from the inside is prevented.

A step of curing a resin layer by light irradiation under reduced pressure or under atmospheric pressure does not need exposure of the secondary battery at high temperatures; thus, degradation of the secondary battery can be inhibited and the reliability of the secondary battery can be increased.

In the method for fabricating a secondary battery according to one embodiment of the present invention, at least the step of forming the stack over the first exterior body to the step of curing the resin layer under reduced pressure can be successively performed using one apparatus; thus, mixing of impurities into the secondary battery can be inhibited.

Note that one of the first electrode and the second electrode is the positive electrode, and the other is the negative electrode. The stack may be either a stack where the positive electrode, the separator, and the negative electrode are stacked in this order or a stack where the negative electrode, the separator, and the positive electrode are stacked in this order. In addition, the separator is used to prevent short-circuit between the positive electrode and the negative electrode. In the case where a structure is employed in which a plurality of positive electrodes and a plurality of negative electrodes are stacked to increase the capacity of the secondary battery, a structure may be employed in which one common separator is folded and used to reduce the number of components.

In addition, in the method for fabricating a secondary battery according to one embodiment of the present invention, a plurality of stacks may be placed over the first exterior body. At this time, as the resin layer, one frame-like resin layer that surrounds all the plurality of stacks may be formed, or a plurality of frame-like resin layers that surround one or more stacks may be formed. For example, one frame-like resin layer may be formed for each stack. Furthermore, the second exterior body is placed over the first exterior body to cover the plurality of stacks. Then, the resin layer is irradiated with ultraviolet light under reduced pressure, and the plurality of stacks are sealed by the first exterior body and the second exterior body under atmospheric pressure. After sealing, the first exterior body and the second exterior body are divided, and separate secondary batteries each including the stack are obtained.

In addition, although an example in which an ultraviolet curable resin is used for the material of the resin layer is described in the above, one embodiment of the present invention is not limited thereto. For the material of the resin layer, a variety of curable adhesives, for example, a photocurable resin (also referred to as a photocurable adhesive or the like) such as an ultraviolet curable resin, a thermosetting resin (also referred to as a thermosetting adhesive), a reactive curable adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material having a high gas barrier property, such as an epoxy resin, is preferable. Alternatively, a two-component-mixture-type resin may be used.

In the case where a variety of photocurable resins are used, at least part of the resin layer can be cured by irradiation of the resin layer with light under reduced pressure. Thus, the reduced pressure state of the space surrounded by the first exterior body, the second exterior body, and the frame-like resin layer is maintained even when the secondary battery during fabrication is exposed to atmospheric pressure. Consequently, mixing of impurities into the secondary battery can be inhibited. The use of the photocurable resin eliminates the need for exposing the secondary battery to high temperatures when the resin layer is cured; thus, degradation of the secondary battery can be inhibited and a highly reliable secondary battery can be fabricated.

Furthermore, in the case where a thermosetting resin is used, thermocompression bonding or welding is preferably performed under reduced pressure. Thus, the reduced pressure state of the space surrounded by the first exterior body, the second exterior body, and the frame-like resin layer is maintained even when the secondary battery during fabrication is exposed to atmospheric pressure. Consequently, mixing of impurities into the secondary battery can be inhibited. The use of the thermosetting resin eliminates the need for introducing a light irradiation apparatus; thus, the cost of introducing the apparatus can be reduced in some cases.

Moreover, in the case where thermocompression bonding or welding is performed under reduced pressure, the step of forming the resin layer is not necessarily performed. For example, by thermocompression bonding or welding using a resin (a thermoplastic film material or the like) on an inner surface of the exterior film, the reduced pressure state of the space surrounded by the first exterior body, the second exterior body, and the frame-like resin layer can be maintained under atmospheric pressure in some cases. Thus, the number of manufacturing steps of the secondary battery can be reduced.

Note that in the case where a plurality of secondary batteries are independently sealed under reduced pressure, for example, a sealing step under atmospheric pressure can be eliminated.

An example of the secondary battery according to one embodiment of the present invention will be described with reference to FIG. 1A.

A secondary battery 500 illustrated in FIG. 1A includes an exterior body 509*a*, an exterior body 509*b*, and a stack 512 placed between the exterior bodies 509*a* and 509*b*. The stack 512 includes a positive electrode 503, a negative electrode 506, and a separator 507. In the stack 512, the positive electrode 503 and the negative electrode 506 overlap each other, and the separator 507 is placed between the positive electrode 503 and the negative electrode 506.

The positive electrode 503 includes a positive electrode current collector 501 and positive electrode active material layers 502. In this embodiment, an example is described in which the positive electrode active material layers 502 are provided on both sides of the positive electrode current collector 501. Note that the positive electrode active material layer 502 may be provided only on one side of the positive electrode current collector 501.

The negative electrode 506 includes a negative electrode current collector 504 and negative electrode active material layers 505. In this embodiment, an example is described in which the negative electrode active material layers 505 are provided on both sides of the negative electrode current collector 504. Note that the negative electrode active material layer 505 may be provided only on one side of the negative electrode current collector 504.

The positive electrode active material layer 502 and the negative electrode active material layer 505 are preferably placed to face each other with the separator 507 therebetween. FIG. 1A illustrates an example in which four pairs each including the positive electrode active material layer 502 and the negative electrode active material layer 505 that face each other with the separator 507 therebetween. The number of pairs of the positive electrode active material layer 502 and the negative electrode active material layer 505 is not particularly limited, and can be greater than or equal to 1 and less than or equal to 50.

In the secondary battery according to one embodiment of the present invention, a plurality of drops of an electrolyte are dripped on any one or more of the positive electrode 503, the negative electrode 506, and the separator 507, so that any one or more of the positive electrode 503, the negative electrode 506, and the separator 507 can be uniformly and sufficiently impregnated with the electrolyte.

Figure 1B:
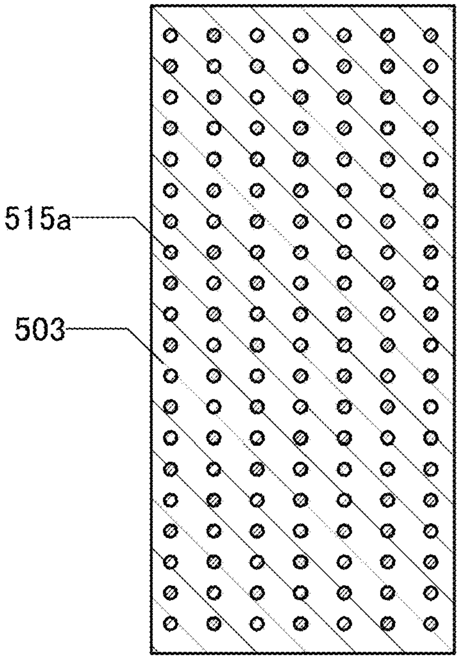
FIG. 1B is a top view illustrating a state after dripping of an electrolyte on an electrode.

FIG. 1B illustrates an example in which a plurality of drops of an electrolyte 515*a* are dripped on the positive electrode 503. The electrode of the secondary battery includes the active material layer over the current collector, and the active material layer includes an active material, a conductive material, a binder, and the like with a space therebetween. It is preferable that the dripped electrolyte move from a dripping position to the space of the active material layer so that the positive electrode is in a state of being uniformly impregnated with the electrolyte, ideally, in a state without any space.

Although FIG. 1B illustrates liquid drops of the electrolyte 515*a* on 140 portions (20 rows×7 columns) at regular intervals on the positive electrode 503, the number of liquid drops, the positions of the liquid drops, and the like are not particularly limited and are determined as appropriate by a practitioner. In the case of using one nozzle, sequential scanning is preferably performed while dripping positions are checked using an imaging mechanism (an imaging element such as a CCD element). In addition, it is preferable that liquid drops be concurrently dripped from a plurality of nozzles because treatment time for dripping can be shortened.

Note that it is preferable that the electrolyte be weighed out at the time of dripping so that the dripping amount can be the same between every dripping. For example, dripping is preferably performed using a pipette (a micropipette or the like).

Figure 1C:
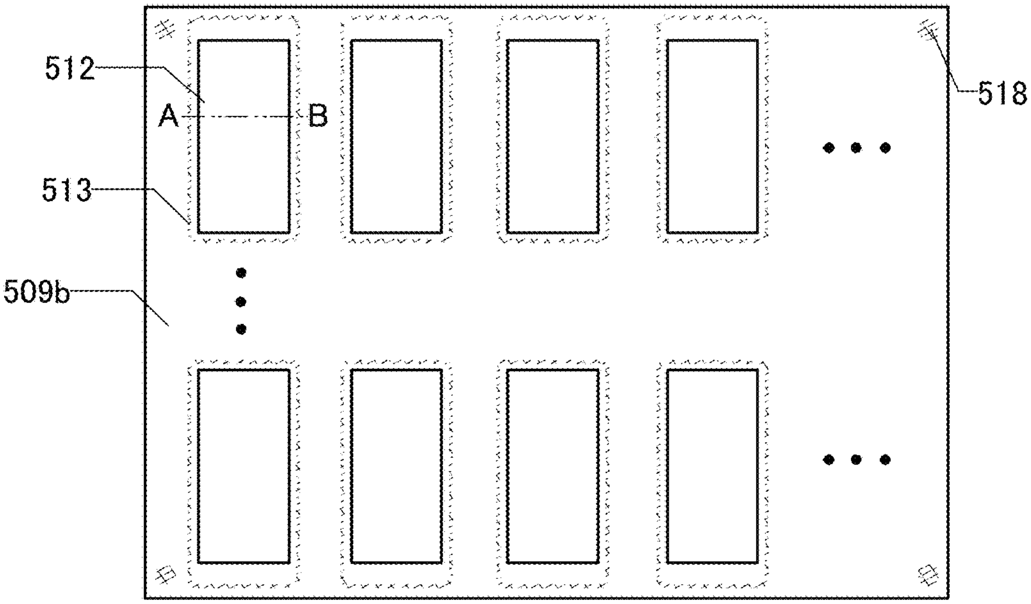
FIG. 1C is a top view illustrating multiple formation.

Furthermore, as illustrated in FIG. 1C, multiple formation can be performed by placing a plurality of stacks 512 on the exterior body 509*b*. Multiple formation refers to a method for fabricating a plurality of secondary batteries by placing a plurality of stacks on one large exterior body to form secondary batteries and then planarly dividing the exterior body for each stack. Multiple formation can shorten fabrication time per secondary battery. Moreover, when multiple formation is performed by the method for fabricating a secondary battery according to one embodiment of the present invention, the characteristics of the plurality of secondary batteries can be easily made uniform and the secondary batteries can be fabricated with high yield.

For example, with the use of a large-area exterior film as each of the exterior body 509*a* and the exterior body 509*b*, a large number of secondary batteries can be fabricated at a time. For example, a large-area exterior film having a size of 320 mm×400 mm, 370 mm×470 mm, 550 mm×650 mm, 600 mm×720 mm, 680 mm×880 mm, 1000 mm×1200 mm, 1100 mm×1250 mm, 1150 mm×1300 mm, or the like is preferably used. This enables efficient fabrication of a plurality of secondary batteries from one large-area exterior film. Furthermore, a large-area exterior film having a size of 1500 mm×1800 mm, 1800 mm×2000 mm, 2000 mm×2100 mm, 2200 mm×2600 mm, 2600 mm×3100 mm, or the like can also be used. Moreover, the exterior body can also be referred to as a packaging material.

FIG. 1C also illustrates an example of placing resin layers. For example, resin layers 518 may be provided at four corners of the exterior body 509*b*, and a plurality of frame-like resin layers 513 may be provided to surround one stack 512. For example, the resin layers 518 may be cured under reduced pressure, and then, the frame-like resin layers 513 may be cured under atmospheric pressure. When the resin layers 518 are cured under reduced pressure, even in the case where the frame-like resin layers 513 have not been cured, the reduced pressure state of a space surrounded by the two exterior bodies and the frame-like resin layers 513 is maintained under atmospheric pressure.

[Example of Manufacturing Apparatus of Secondary Battery]

Figure 2:
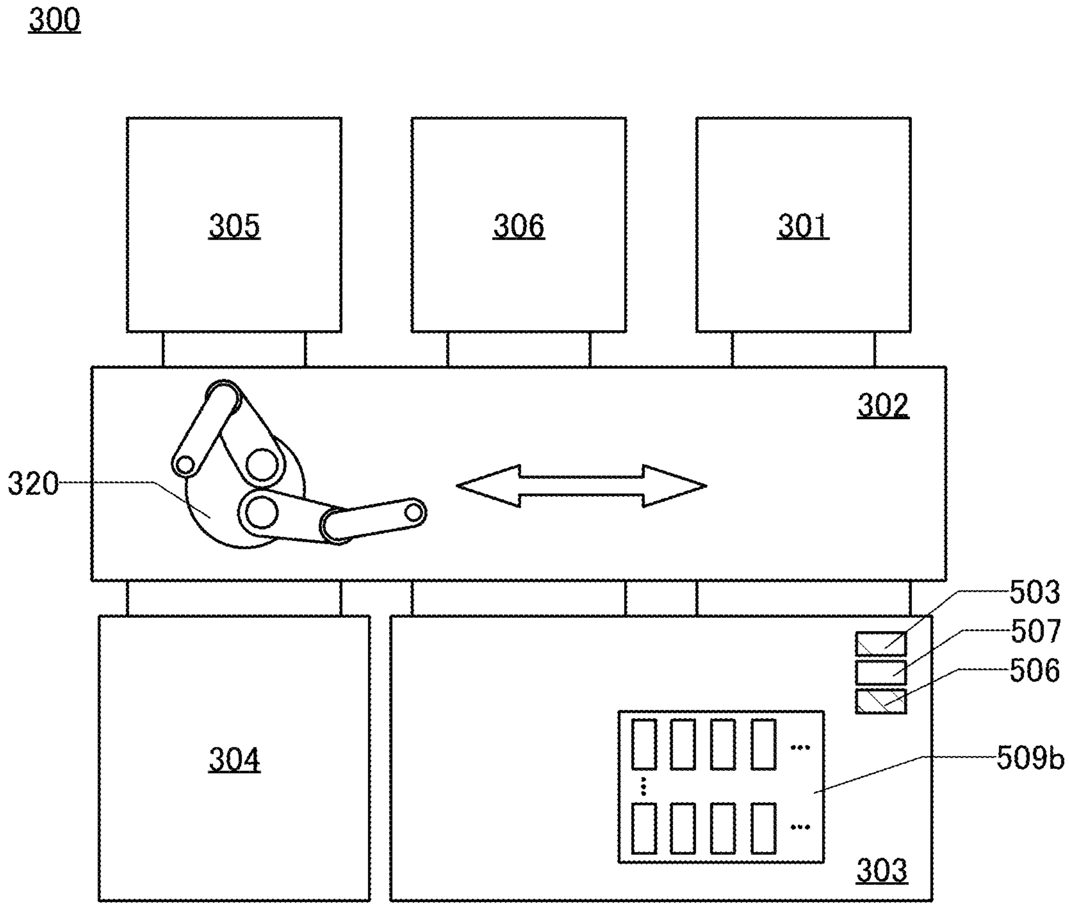
FIG. 2 is a top view illustrating an example of a manufacturing apparatus for a secondary battery.

FIG. 2 illustrates an example of a manufacturing apparatus that can be used for fabrication of the secondary battery according to one embodiment of the present invention.

A manufacturing apparatus 300 illustrated in FIG. 2 includes a component introduction chamber 301, a transfer chamber 302, a treatment chamber 303, a treatment chamber

304, a treatment chamber 305, and a component extraction chamber 306. A structure can be employed in which each chamber is connected to a variety of exhaust mechanisms depending on usage.

Alternatively, a structure can be employed in which each chamber is connected to a variety of gas supply mechanisms depending on usage. An inert gas is preferably supplied into the manufacturing apparatus 300 because entry of impurities into the manufacturing apparatus 300 is inhibited. Note that a gas that has been highly purified by a gas purifier before introduction into the manufacturing apparatus 300 is preferably used as the gas supplied into the manufacturing apparatus 300.

The component introduction chamber 301 is a chamber for introducing the positive electrode 503, the separator 507, the negative electrode 506, the exterior body 509*a*, the exterior body 509*b*, and the like into the manufacturing apparatus 300.

The transfer chamber 302 functions as a delivery chamber that transfers a component or the like from any one of the component introduction chamber 301, the treatment chamber 303, the treatment chamber 304, the treatment chamber 305, and the component extraction chamber 306 to another chamber. For example, the secondary battery during fabrication can be transferred from the treatment chamber 303 to the treatment chamber 304. The transfer chamber 302 includes a transfer mechanism 320.

The treatment chamber 303 has a function of stacking and placing the positive electrode 503, the separator 507, and the negative electrode 506 over the exterior body 509*b* and a function of forming the resin layer over the exterior body 509*b*.

The treatment chamber 303 includes a stage, a suction mechanism, an electrolyte dripping mechanism, and a sealant supply mechanism.

The stage has a function of supporting the secondary battery during fabrication.

The suction mechanism has a function of sucking the component (the positive electrode 503, the separator 507, or the negative electrode 506) included in the stack and placing the component over the exterior body 509*b*. The suction mechanism may further have a function of sucking the exterior body 509*b* (or a tentative support substrate where the exterior body 509*b* is placed) and placing it over the stage.

The electrolyte dripping mechanism has a function of dripping the electrolyte on the component included in the stack.

The sealant supply mechanism has a function of forming the resin layer over the exterior body 509*b*. The sealant supply mechanism has, for example, a function of supplying an ultraviolet curable resin.

The treatment chamber 303 further includes holders for storing a plurality of positive electrodes 503, a plurality of separators 507, and a plurality of negative electrodes 506. These components are transferred to the stage or the vicinity of the stage by a transfer mechanism such as a robotic arm or a robotic hand as needed. Alternatively, the suction mechanism may directly attach the component in the holder by suction.

The treatment chamber 303 preferably includes an inert gas supply mechanism. The inert gas supply mechanism preferably has a function of supplying an inert gas into the treatment chamber 303. Nitrogen or a rare gas can be used as the inert gas, and an argon gas is preferable.

The treatment chamber 304 has a function of curing the resin layer under reduced pressure. In this embodiment, description is made by giving an example in which an ultraviolet curable resin is used for the resin layer. That is, the treatment chamber 304 has a function of irradiating the resin layer with ultraviolet light under reduced pressure.

The treatment chamber 304 includes a stage, an exhaust mechanism, an exterior body support mechanism, and an ultraviolet light irradiation mechanism.

The stage has a function of supporting the secondary battery during fabrication and has been transferred from the treatment chamber 303.

The exhaust mechanism has a function of reducing pressure in the treatment chamber 304. Examples of the exhaust mechanism include a dry pump, a rotary pump, and a diaphragm pump. Other examples of the exhaust mechanism include an exhaust mechanism including a pump having a suction unit, such as a cryopump, a sputtering ion pump, or a titanium sublimation pump, and an exhaust mechanism including a turbo molecular pump provided with a cold trap.

The treatment chamber 304 is capable of making a vacuum through vacuum exhaust, and preferably has a function of making atmospheric pressure by introduction of an inert gas after vacuum exhaust. Note that the treatment chamber 303 also preferably has the function. In addition, each of the other chambers included in the manufacturing apparatus 300 also preferably has the function.

For example, the treatment chamber 304 is capable of making the ultimate vacuum approximately 0.1 Pa and is capable of controlling back-diffusion of impurities from a pump side and an exhaust system.

The exterior body support mechanism has a function of supporting the exterior body 509*a* (or a tentative support substrate where the exterior body 509*a* is placed) in a position opposite to the secondary battery during fabrication and has been transferred from the treatment chamber 303. As the exterior body support mechanism, for example, one or more of a suction mechanism, an electrostatic mechanism, a slight adhesion mechanism, and the like can be used.

The treatment chamber 304 includes the ultraviolet light irradiation mechanism. The ultraviolet light irradiation mechanism has a function of irradiating at least part of the resin layer with ultraviolet light through the exterior body 509*a* or the exterior body 509*b*.

In the manufacturing apparatus 300, after the electrolyte is dripped in the treatment chamber 303, the resin layer can be cured under reduced pressure by the treatment chamber 304 without exposure to the air. Consequently, entry of impurities the secondary battery during fabrication can be inhibited. In addition, in the manufacturing apparatus 300, the secondary battery can also be sealed by the treatment chamber 305 without exposure to the air. When processings are successively performed using one apparatus, the reliability of the secondary battery can be increased.

The treatment chamber 305 has a function of performing sealing.

For example, in the case where sealing is performed by ultraviolet light irradiation, the treatment chamber 305 includes an ultraviolet light irradiation mechanism. At this time, the ultraviolet light irradiation mechanism of the treatment chamber 305 may be either similar to or different from that of the treatment chamber 304. The treatment chamber 305 can have an atmospheric pressure atmosphere.

For example, in the case where sealing is performed by thermocompression bonding, the treatment chamber 305 includes a thermocompression bonding mechanism. The treatment chamber 305 can have an atmospheric pressure atmosphere or a reduced pressure atmosphere.

Note that in the method for fabricating a secondary battery according to one embodiment of the present invention, even when exposure to atmospheric pressure is performed after the resin layer is cured under reduced pressure by the treatment chamber 304, the reduced pressure state of the space surrounded by the exterior body 509*a*, the exterior body 509*b*, and the frame-like resin layer is maintained. Even when thermocompression bonding is performed under atmospheric pressure, a highly reliable secondary battery can be fabricated.

Alternatively, it may be possible not to provide the treatment chamber 305 and to transfer the secondary battery to the component extraction chamber 306 so that the secondary battery is extracted to the outside of the manufacturing apparatus 300 after processing by the treatment chamber 304 ends. Then, sealing may be performed outside the manufacturing apparatus 300.

The component extraction chamber 306 is a chamber for extracting the secondary battery that has been fabricated to the outside of the manufacturing apparatus 300.

[Example of Method for Fabricating Secondary Battery]

Figure 3:
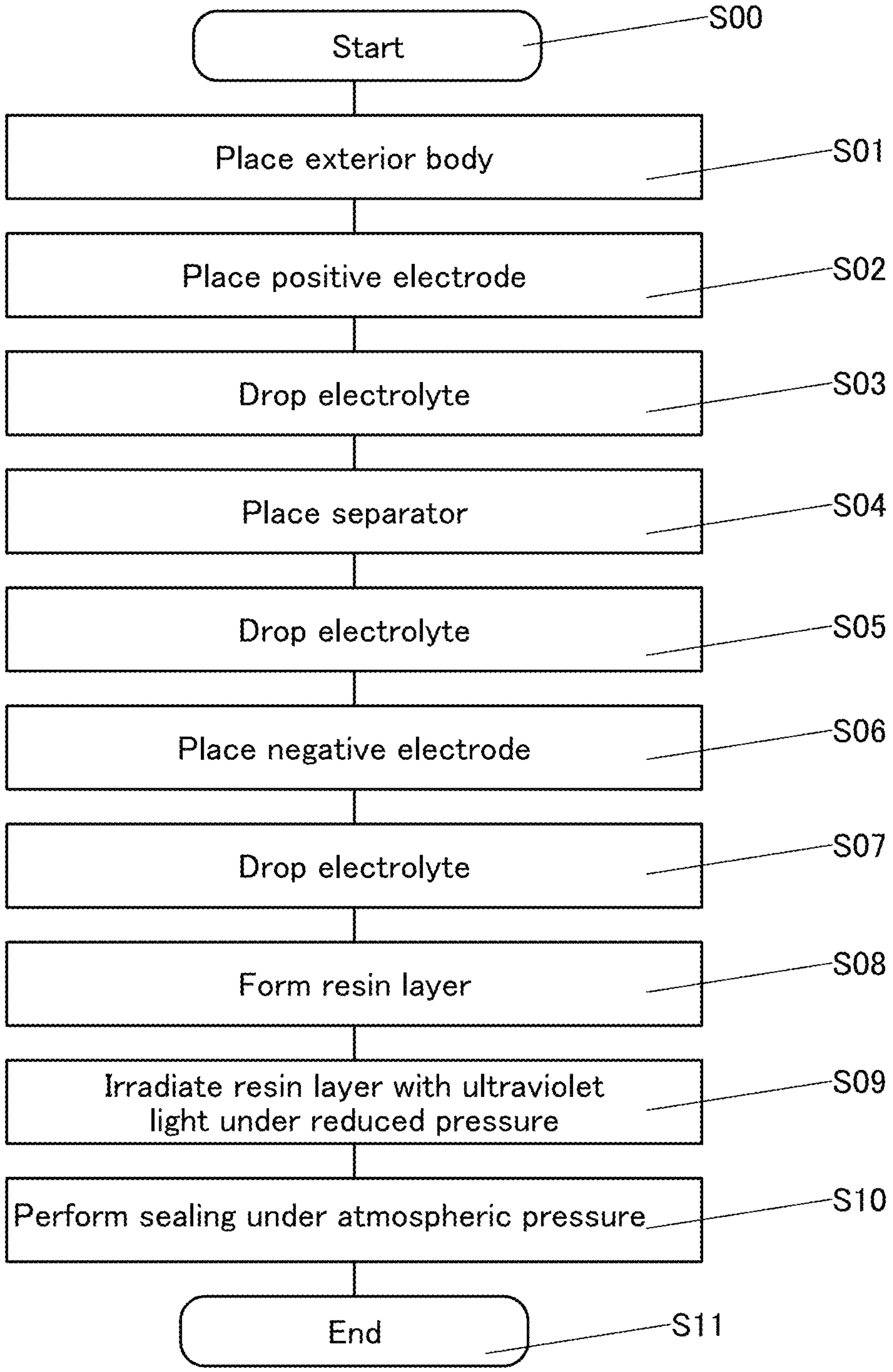
FIG. 3 is a flow chart showing an example of a method for fabricating a secondary battery.

Next, the method for fabricating a secondary battery according to one embodiment of the present invention will be described with reference to FIG. 3 to FIG. 5. FIG. 3 is a flow chart showing the method for fabricating a secondary battery according to one embodiment of the present invention. FIG. 4 and FIG. 5 are cross-sectional views illustrating the method for fabricating a secondary battery according to one embodiment of the present invention, and correspond to cross-sectional views along dashed-double dotted lines A-B illustrated in FIG. 1C.

Note that in some steps, description is made giving an example of the fabrication method using the manufacturing apparatus 300.

<Step S00>

In Step S00, processing starts.

<Step S01>

The exterior body 509*b* is placed over a stage 331 of the treatment chamber 303 in Step S01. In order to facilitate transfer and placement of the exterior body 509*b*, the exterior body 509*b* may be temporarily fixed to a tentative support substrate or the like (that is, may be fixed by a detachable method) to be placed over the stage 331. An exterior film is preferably used for the exterior body 509*b*.

<Step S02>

Figure 4A:
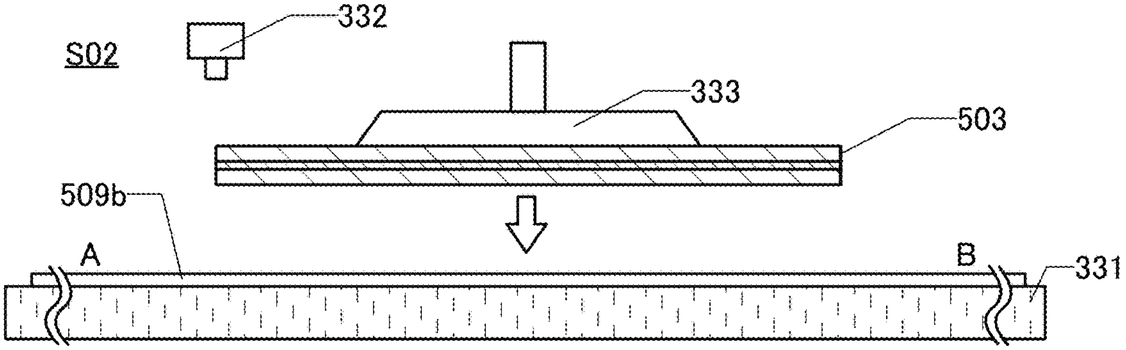
FIG. 4A to FIG. 4D are cross-sectional views illustrating an example of a method for fabricating a secondary battery.

The positive electrode 503 is placed over the exterior body 509*b* in Step S02 (FIG. 4A). Although the positive electrode 503, the exterior body 509*b*, the stage 331, and the like are placed inside the treatment chamber 303, chamber inner walls and the like are not illustrated for simplicity.

The stage 331 may be movable back and forth, from side to side, or up and down. Examples of fixing mechanisms for fixing a component or the like placed over the stage 331 include chucks such as a mechanical chuck, a suction chuck, and an electrostatic chuck. For example, a porous chuck may be used. Alternatively, a component may be fixed to an adhesive sheet, a suction table, a heater table, a spinner table, or the like.

The stage 331 may include a heating mechanism. When the stage 331 is heated during the step in the treatment chamber 303, the component can be impregnated with an electrolyte more quickly.

FIG. 4A illustrates an example in which the positive electrode 503 is transferred to a predetermined position in a state of being sucked by a suction jig 333. Although FIG. 4A illustrates one suction jig 333, a plurality of suction jigs may be used. In order to facilitate alignment, the treatment chamber 303 preferably includes an alignment camera 332.

<Step S03>

Figure 4B:
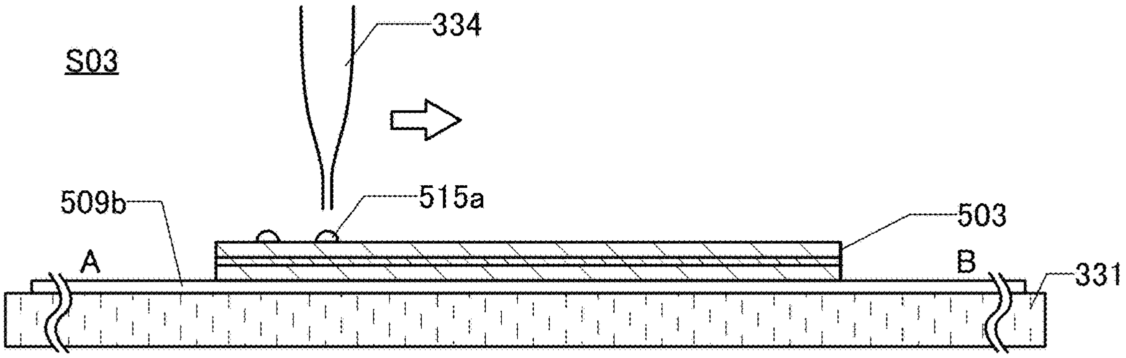
Figure 4C:
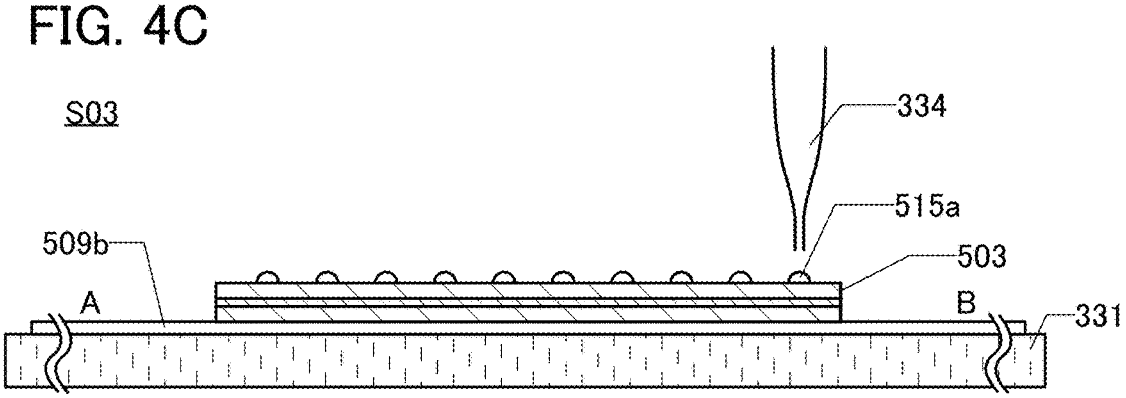

Next, the electrolyte 515*a* is dripped on the positive electrode 503 in Step S03. FIG. 4B and FIG. 4C each illustrate a state where the electrolyte 515*a* is dripped on the positive electrode 503 from a nozzle 334.

With movement of the nozzle 334, the electrolyte 515*a* can be dripped on the entire surface of the positive electrode 503. Alternatively, with movement of the stage 331, the electrolyte 515*a* may be dripped on the entire surface of the positive electrode 503.

The plurality of drops of the electrolyte are dripped once or a plurality of times at a uniform pitch on a plane of a surface where the drops are dripped. As a dripping method, any one of a dispensing method, a spraying method, an inkjet method, and the like can be used, for example. A dispensing method is a method using a quantitative liquid discharge apparatus, which enables a constant amount of drops to be dripped from a nozzle. The use of a plurality of quantitative liquid discharge apparatuses can shorten manufacturing time. When the nozzle or an object on which the drops are dripped (any one or more of the positive electrode, the separator, and the negative electrode) is moved relatively, dripping can be performed at regular distance intervals. Assuming that the dripping amount on one portion with a certain nozzle diameter is 0.01 cc, dripping on n ($n>1$) portions enables impregnation with the electrolyte with the amount of 0.01 cc×n, so that the falling points of the drops or the total dripping amount can be precisely controlled. In the case of the positive electrode, for example, dripping on n ($n>1$) portions of a plane, that is, dripping on a plurality of portions of the positive electrode can shorten the time for impregnating the entire positive electrode with the electrolyte as compared with dripping on only one portion of the positive electrode, which can reduce the manufacturing time. In addition, an ODF (One Drop Fill) method can be used for dripping the electrolyte.

In addition, the viscosity of the electrolyte dripped from the nozzle or the like is preferably adjusted as appropriate. When the viscosity of the whole electrolyte falls within a range from 0.3 mPa·s to 1000 mPa·s at room temperature (25° C.), the electrolyte can be dripped from the nozzle. For example, the viscosity of the electrolyte is preferably greater than or equal to 10 mPa·s and less than or equal to 95 mPa·s. Note that the viscosity is measured with a rotating viscometer (for example, TVE-35L, produced by Toki Sangyo Co., Ltd.).

As the electrolyte to be dripped, an organic solvent (also referred to as an organic electrolyte solution) or an ionic liquid can be used.

The method for fabricating a secondary battery according to this embodiment includes a step performed under reduced pressure. An ionic liquid is preferable because it hardly volatilizes even at a high vacuum. Alternatively, a mixture of an ionic liquid and an organic solvent may be used as the electrolyte. In the case where an organic solvent is contained as the electrolyte, the degree of vacuum in a treatment chamber is desirably set at a low vacuum lower than approximately $5\times10^{-1}$ Pa.

<Step S04>

Next, the separator 507 is placed over the positive electrode 503 in Step S04. The separator 507 is placed to overlap the entire surface of the positive electrode 503. Accordingly, short-circuit due to contact between the positive electrode 503 and the negative electrode 506 to be placed later can be prevented.

<Step S05>

Figure 4D:
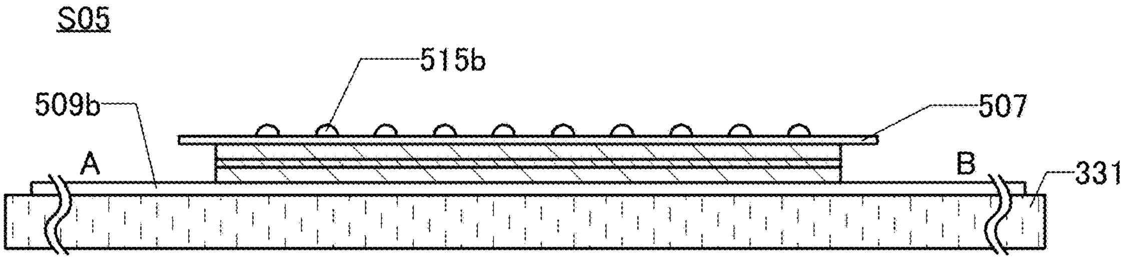

Next, an electrolyte 515*b* is dripped on the separator 507 in Step S05. FIG. 4D illustrates a state where the electrolyte 515*b* is dripped on the separator 507. The electrolyte 515*b* can be dripped using the nozzle 334.

<Step S06>

Next, the negative electrode 506 is placed over the separator 507 in Step S06. The negative electrode 506 is placed over the separator 507 so that it does not protrude from the separator 507 in a top view. Accordingly, short-circuit due to contact between the positive electrode 503 and the placed negative electrode 506 can be prevented.

<Step S07>

Figure 5A:
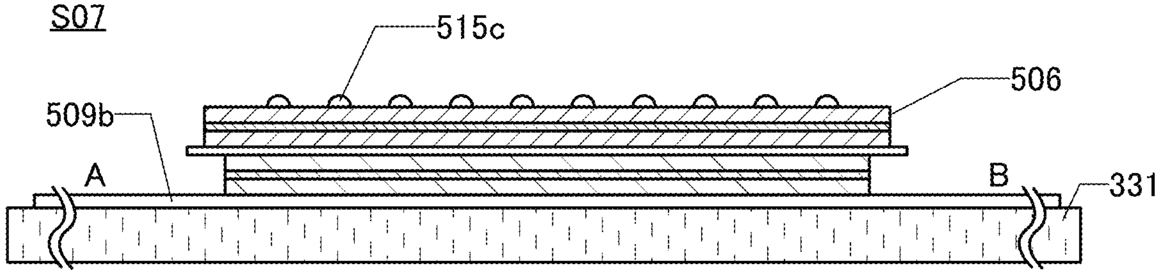
FIG. 5A to FIG. 5C are cross-sectional views illustrating an example of a method for fabricating a secondary battery.

Next, an electrolyte 515*c* is dripped on the negative electrode 506 in Step S07. FIG. 5A illustrates a state where the electrolyte 515*c* is dripped on the negative electrode 506. The electrolyte 515*c* can be dripped using the nozzle 334.

After Step S07, another stack of the positive electrode 503, the separator 507, and the negative electrode 506 can be further stacked. For example, after Step S07, the separator 507, the positive electrode 503, the separator 507, the negative electrode 506, the separator 507, and the positive electrode 503 are sequentially stacked, so that the stack 512 illustrated in FIG. 1A can be fabricated. The electrolyte is preferably dripped every time after any of the positive electrode 503, the negative electrode 506, and the separator 507 is placed.

Note that although this embodiment describes an example in which the positive electrode 503, the separator 507, and the negative electrode 506 are stacked in this order, this embodiment is not limited thereto. For example, the negative electrode 506, the separator 507, and the positive electrode 503 may be stacked in this order. Alternatively, stacking may be started from the separator 507. For example, the separator 507, the positive electrode 503, the separator 507, and the negative electrode 506 may be stacked in this order, or the separator 507, the negative electrode 506, the separator 507, and the positive electrode 503 may be stacked in this order.

Note that in the method for fabricating a secondary battery according to one embodiment of the present invention, at least one of Step S03, Step S05, and Step S07 is performed. That is, the electrolyte is dripped at least on one of the positive electrode 503, the negative electrode 506, and the separator 507. For example, the electrolyte may be dripped only on the positive electrode 503 and the negative electrode 506. Alternatively, the electrolyte may be dripped only on the separator 507. Furthermore, the same material may be used for the electrolytes to be dripped on the positive electrode 503, the negative electrode 506, and the separator 507, or different materials may be used for some or all of the electrolytes.

<Step S08>

Figure 5B:
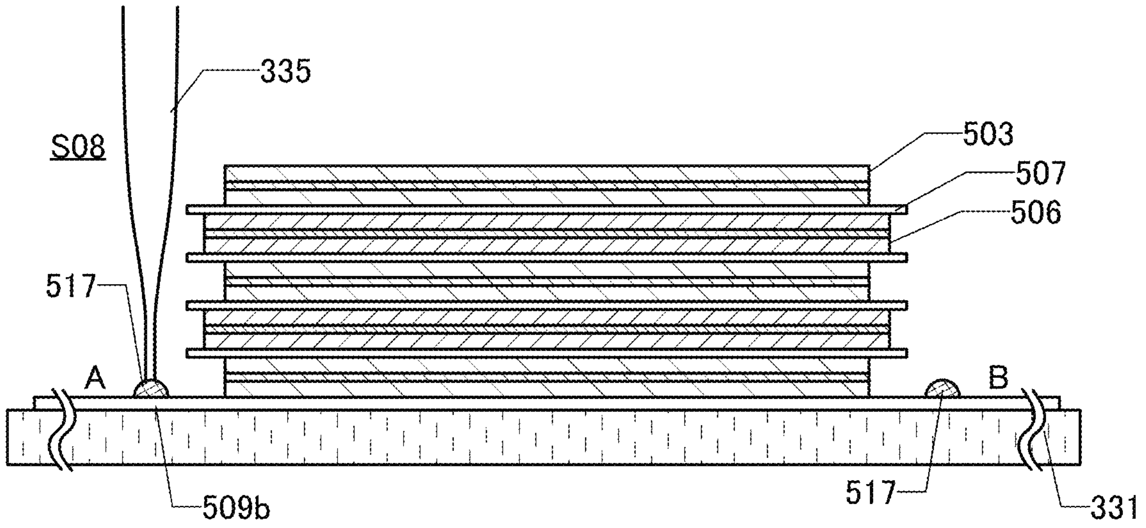

Next, resin layers are formed over the exterior body 509*b* in Step S08. FIG. 1C illustrates an example in which the frame-like resin layers 513 and the resin layers 518 at the four corners are formed. FIG. 5B illustrates a state where a resin 517 is discharged from a nozzle 335 on the exterior body 509*b*.

Note that the resin layers are formed over the exterior body 509*b* at any timing before Step S09, and for example, may be formed after Step S01.

Note that in a period between Step S07 and Step S09, lead electrodes may be connected to the positive electrode 503 and the negative electrode 506.

For formation of the resin layers, for example, any one of a dispensing method, a spraying method, an inkjet method, and the like can be used, for example.

As the material of each of the resin layers, the variety of adhesives can be used. Alternatively, in the case where a resin layer that forms the exterior body is used, this step is not necessarily performed.

As the material of each of the resin layers, it is preferable to use a photocurable resin, and it is particularly preferable to use an ultraviolet curable resin.

Note that when the material of the resin layer is mixed into the electrolyte, the reliability of the secondary battery might be decreased. Thus, it is preferable to form the resin layer not to be in contact with the electrolyte. As a result, the reliability of the secondary battery can be increased.

<Step S09>

Next, at least part of the resin layer is irradiated with ultraviolet light under reduced pressure in Step S09.

Specifically, the exterior body 509*a* is placed over the exterior body 509*b* to cover the positive electrode 503, the separator 507, and the negative electrode 506, and the resin layer is irradiated with ultraviolet light under reduced pressure, so that at least part of the resin layer is cured.

Here, an example is described in which the resin layers 518 provided at the four corners of the exterior body 509*b* are cured. Thus, when the secondary battery during fabrication is exposed to atmospheric pressure, atmospheric pressure is applied to the exterior body 509*a* and the exterior body 509*b*. Then, the reduced pressure state of the space surrounded by the exterior body 509*a*, the exterior body 509*b*, and the frame-like resin layers 513 is maintained. Consequently, entry of impurities from the outside into the secondary battery during fabrication can be inhibited.

At reduced pressure, a region where the secondary battery during fabrication can be irradiated with ultraviolet light is sometimes limited. Therefore, in the method for fabricating a secondary battery according to one embodiment of the present invention, part of the resin layer is cured under reduced pressure so that the reduced pressure state of the inside of the secondary battery during fabrication can be maintained even under atmospheric pressure. Accordingly, a sealing step can be performed under atmospheric pressure.

The exterior body 509*a* transmits ultraviolet light at least in regions overlapping the resin layers 518.

Although this embodiment describes an example in which the resin layer is cured by ultraviolet light irradiation, one embodiment of the present invention is not limited thereto. For example, the resin layer may be cured by irradiation with light other than ultraviolet light. Alternatively, the resin layer may be cured by, for example, thermocompression bonding or welding (also referred to as fusion bonding, thermobonding, or the like). Examples of welding include high-frequency welding, thermal welding, and ultrasonic welding.

<Step S10>

Next, sealing is performed under atmospheric pressure in Step S10.

Since the processing in Step S09 is performed under reduced pressure, the sealing step in Step S10 can be performed under atmospheric pressure. The sealing step is preferably performed in an inert atmosphere such as an argon atmosphere or a nitrogen atmosphere.

For example, the sealing can be performed by curing the frame-like resin layers 513 through ultraviolet light irradiation. In this manner, in the resin layer, an area irradiated with ultraviolet light during the sealing is preferably larger than an area of the resin layer irradiated with ultraviolet light under reduced pressure reduced pressure. The sealing performed through light irradiation eliminates the need for exposing the secondary battery to high temperatures; thus, degradation of the secondary battery can be inhibited and a highly reliable secondary battery can be fabricated.

Alternatively, the sealing may be performed by thermocompression bonding or welding. For example, in the case where one frame-like resin layer (see a frame-like resin layer 521 to be described later in FIG. 9A) that surrounds all the plurality of stacks is provided in Step S08, the sealing is preferably performed by thermocompression bonding or welding.

Figure 5C:
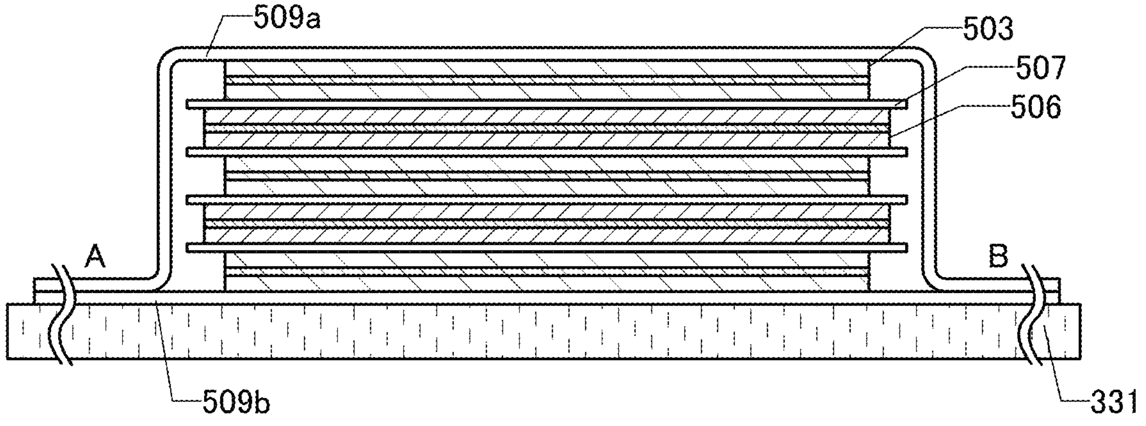

FIG. 5C illustrates a state where the positive electrode 503, the separator 507, and the negative electrode 506 are sealed by the exterior body 509*a* and the exterior body 509*b*.

<Step S11>

Through the above steps, the processing ends in Step S11.

Note that in the case where a plurality of secondary batteries are fabricated over the exterior body 509*b* as illustrated in FIG. 1C, these secondary batteries can be separated into different parts by dividing the exterior body 509*a* and the exterior body 509*b* into different parts. The exterior bodies can be divided into different parts by using laser light or the like.

<Modification Example of Exterior Body 509*b*>

The exterior body 509*b* preferably includes a concave portion. At this time, the positive electrode 503, the separator 507, and the negative electrode 506 are preferably placed in the concave portion. When the positive electrodes 503, the separators 507, and the negative electrodes 506 are placed in the concave portion, the positive electrodes 503, the separators 507, and the negative electrodes 506 can be easily placed in desired positions, and deviation of the positions of these components can be inhibited. Accordingly, a highly reliable secondary battery can be fabricated.

Figure 6A:
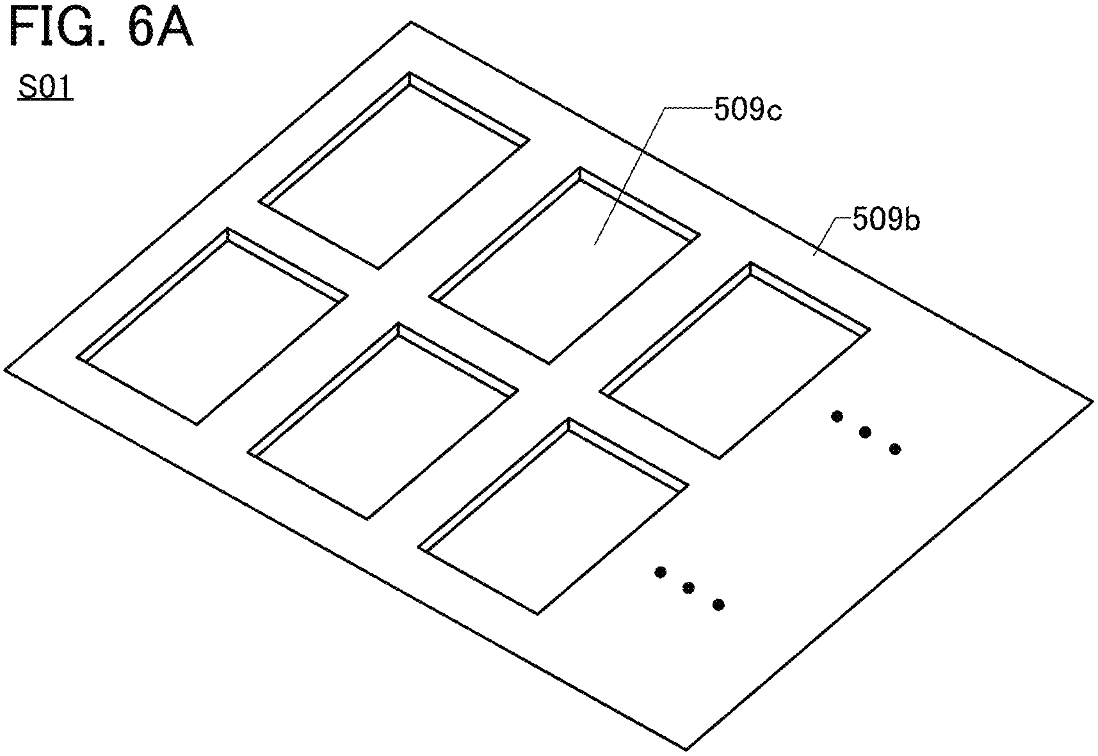
FIG. 6A and FIG. 6B are perspective views illustrating an example of a method for fabricating a secondary battery.

FIG. 6A illustrates an example in which the exterior body 509*b* that includes a plurality of concave portions 509*c* is placed in Step S01.

It is preferable that one secondary battery be fabricated for each concave portion 509*c*. Thus, it is preferable to determine the shape (width, length, depth, or the like) of the concave portion depending on the shape of a secondary battery to be fabricated.

The concave portion is preferably formed in advance by press working or the like. The depth of the concave portion is preferably equal to or larger than the thickness of the stack. In a top view, the area of a bottom of the concave portion is preferably larger than the area of the positive electrode. In addition, in the top view, the area of the bottom of the concave portion is preferably larger than the area of the negative electrode. Furthermore, in the top view, the area of the bottom of the concave portion is preferably larger than the area of the stack. The concave portion preferably has an internal space where regions excluding at least tab regions of the positive electrode and the negative electrode can be placed.

Figure 6B:
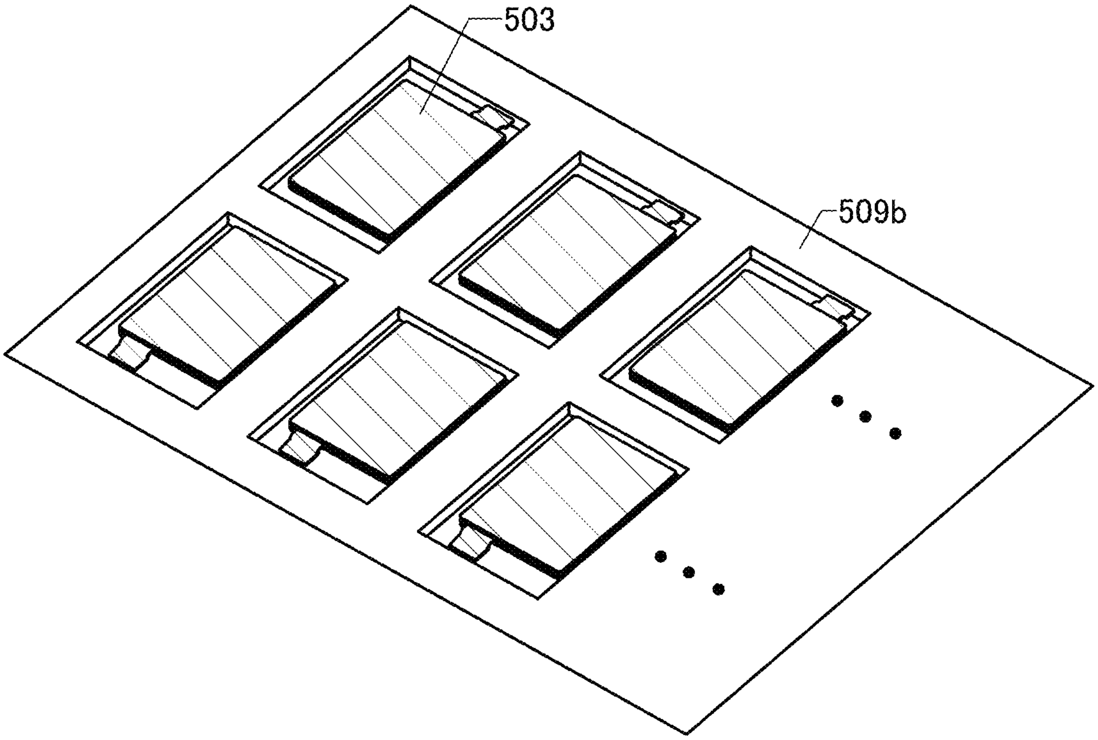

FIG. 6B illustrates an example in which one positive electrode 503 is placed for each concave portion in Step S02.

Figure 7A:
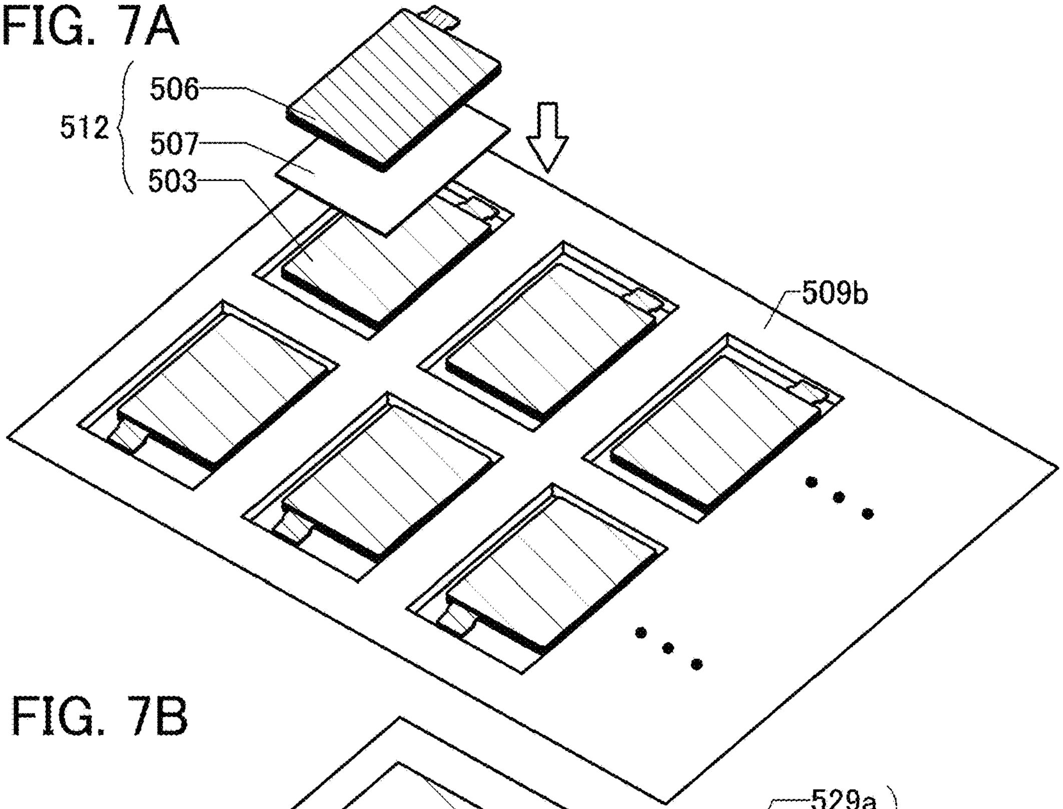
FIG. 7A and FIG. 7B are perspective views illustrating an example of a method for fabricating a secondary battery.

Similarly, one separator 507 is placed for each concave portion in Step S04, and one negative electrode 506 is placed for each concave portion in Step S06. Thus, one stack 512 can be placed for each concave portion (FIG. 7A). Note that although FIG. 7A illustrates one positive electrode 503, one separator 507, and one negative electrode 506 as the stack 512, the structure of the stack 512 is not limited thereto. The stack 512 may include the plurality of positive electrodes 503, the plurality of separators 507, and the plurality of negative electrodes 506.

Figure 8A:
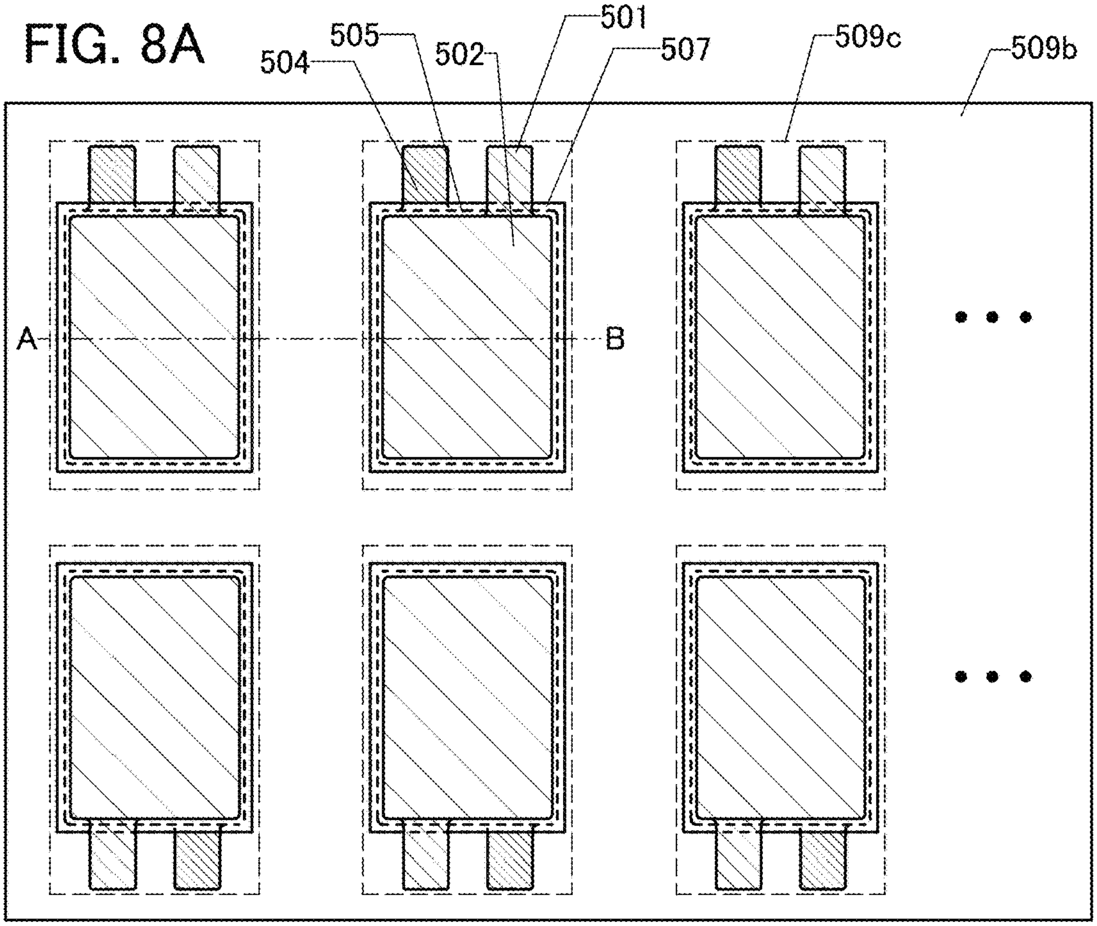
FIG. 8A is a top view illustrating an example of a method for fabricating a secondary battery.
Figure 8B:
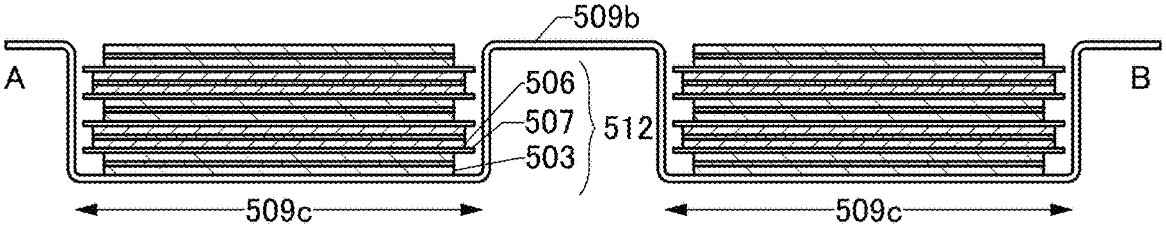
FIG. 8B is a cross-sectional view illustrating an example of a secondary battery during fabrication.

FIG. 8A illustrates a top view after the stack 512 is placed in the concave portion 509*c* of the exterior body 509*b*. FIG. 8B illustrates a cross-sectional view along dashed-dotted line A-B in FIG. 8A.

As illustrated in each of FIG. 8A and FIG. 8B, the stack of the positive electrodes 503, the separators 507, and the negative electrodes 506 is placed in the concave portion 509*c*. FIG. 8B illustrates an example in which the stack 512 includes three positive electrodes 503, four separators, and two negative electrodes 506. The thickness of the stack 512 is preferably equal to or less than the depth of the concave portion 509*c*. Consequently, deviation of the stack 512 and each component included in the stack 512 from the desired positions can be particularly inhibited.

The positive electrode 503 includes a region where the positive electrode current collector 501 is partly exposed (hereinafter referred to as a tab region). The negative electrode 506 includes a region where the negative electrode current collector 504 is partly exposed, that is, a tab region.

In a plurality of positive electrode current collectors 501, for example, the tab regions are placed to overlap each other. The overlapping tab regions and a positive electrode lead electrode may overlap each other to be bonded to each other by ultrasonic welding or the like. In addition, in a plurality of negative electrode current collectors 504, for example, the tab regions are placed to overlap each other. The overlapping tab regions and a negative electrode lead electrode may overlap each other to be bonded to each other by ultrasonic welding or the like. The timing of bonding by ultrasonic welding or the like is selected as appropriate by a practitioner; the bonding may be performed either before sealing or after sealing.

Figure 8C:
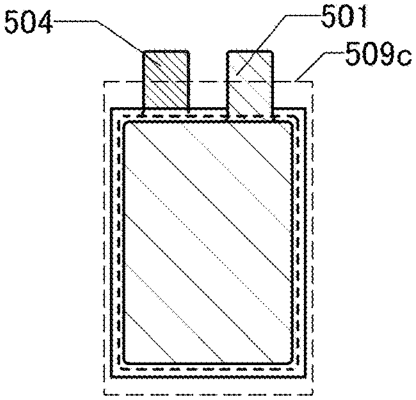
FIG. 8C is a top view illustrating an example of a secondary battery during fabrication.

In addition, although FIG. 8A illustrates an example in which all the tab regions of the positive electrode 503 and the negative electrode 506 fit inside the concave portion 509*c*, the tab regions may include a portion extending to the outside of the concave portion 509*c*, as illustrated in FIG. 8C.

<Modification Example of Exterior Body 509*a*>

As described above, the exterior body 509*a* transmits ultraviolet light at least in a region overlapping the resin layer. The exterior body 509*a* preferably blocks ultraviolet light at least in a region overlapping at least one of the positive electrode 503, the separator 507, and the negative electrode 506. In particular, the exterior body 509*a* preferably blocks ultraviolet light in a region overlapping the stack 512. Consequently, degradation of the secondary battery due to irradiation of the stack 512 with ultraviolet light can be inhibited.

Figure 7B:
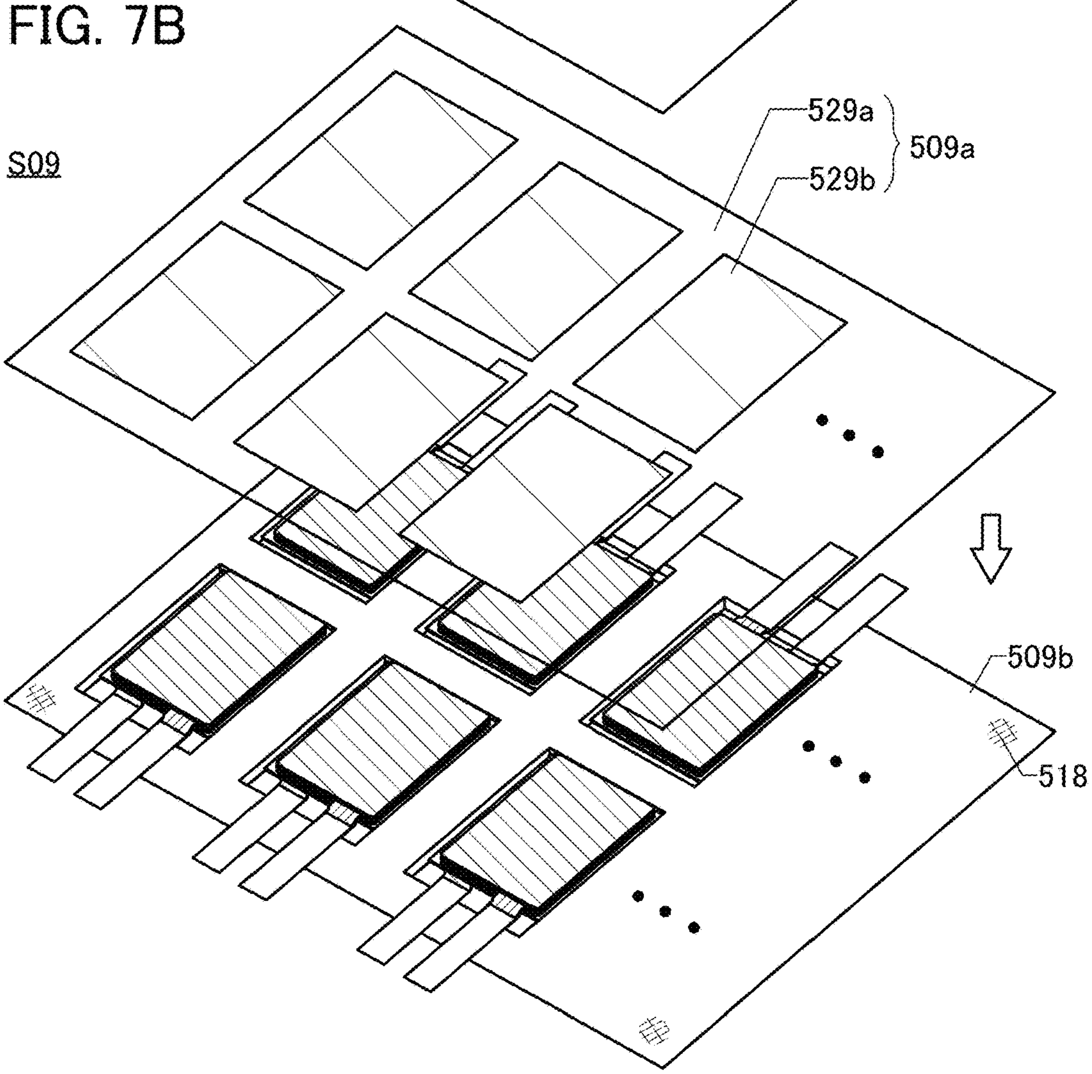

FIG. 7B illustrates an example in which the exterior body 509*a* including an ultraviolet light transmission region 529*a* and an ultraviolet light blocking region 529*b* is used in Step S09. The ultraviolet light blocking region 529*b* is placed to overlap the concave portion of the exterior body 509*b*. In the top view, the width and length of the ultraviolet light blocking region 529*b* are preferably equal to or greater than those of the concave portion of the exterior body 509*b*. Such a structure can particularly prevent irradiation of the stack 512 with ultraviolet light, so that the reliability of the secondary battery can be increased. Note that the ultraviolet light transmission region 529*a* may transmit visible light.

In FIG. 7B, the resin layer 518 overlaps the ultraviolet light transmission region 529*a* of the exterior body 509*a*. When the resin layer 518 is irradiated with ultraviolet light through the ultraviolet light transmission region 529*a* of the exterior body 509*a*, the resin layer 518 can be cured.

<Top-View Layout of Resin Layer>

Next, an example of top-view layout of the resin layer provided over the exterior body 509*b* is described.

Figure 9A:
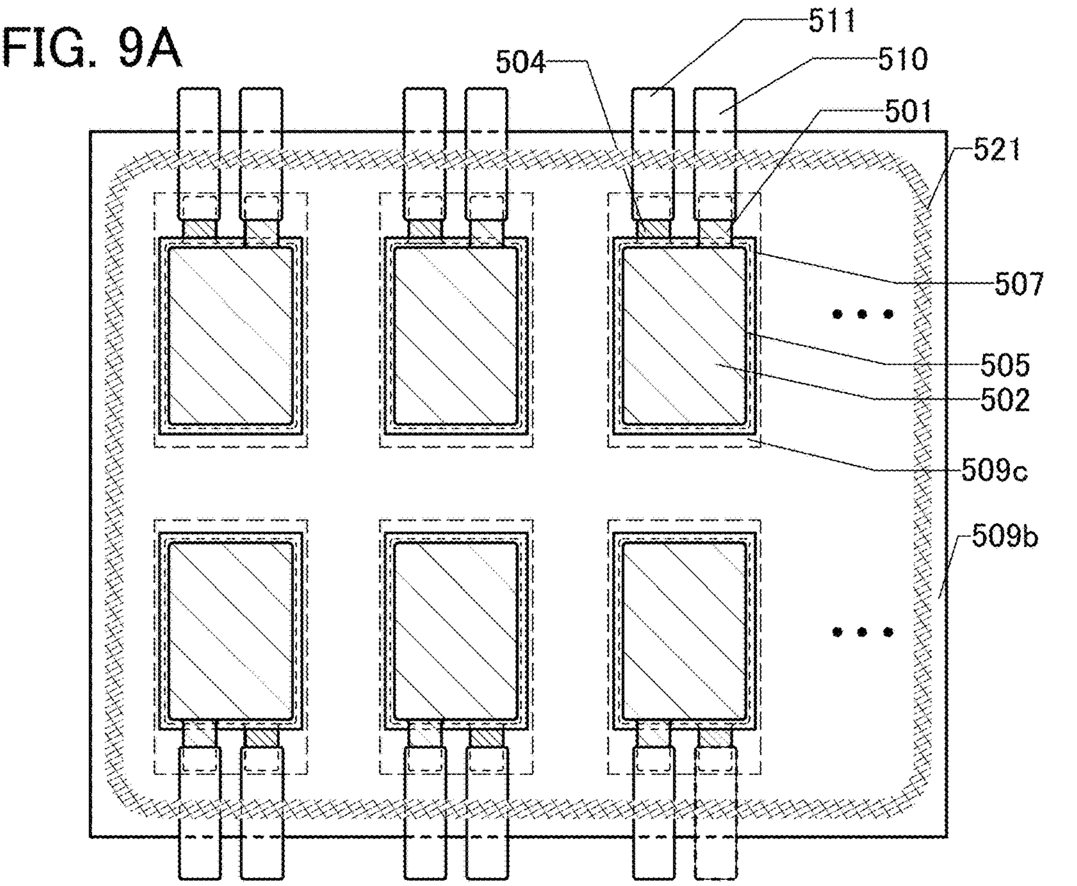
FIG. 9A and FIG. 9B are top views illustrating examples of a method for fabricating a secondary battery.
Figure 9B:
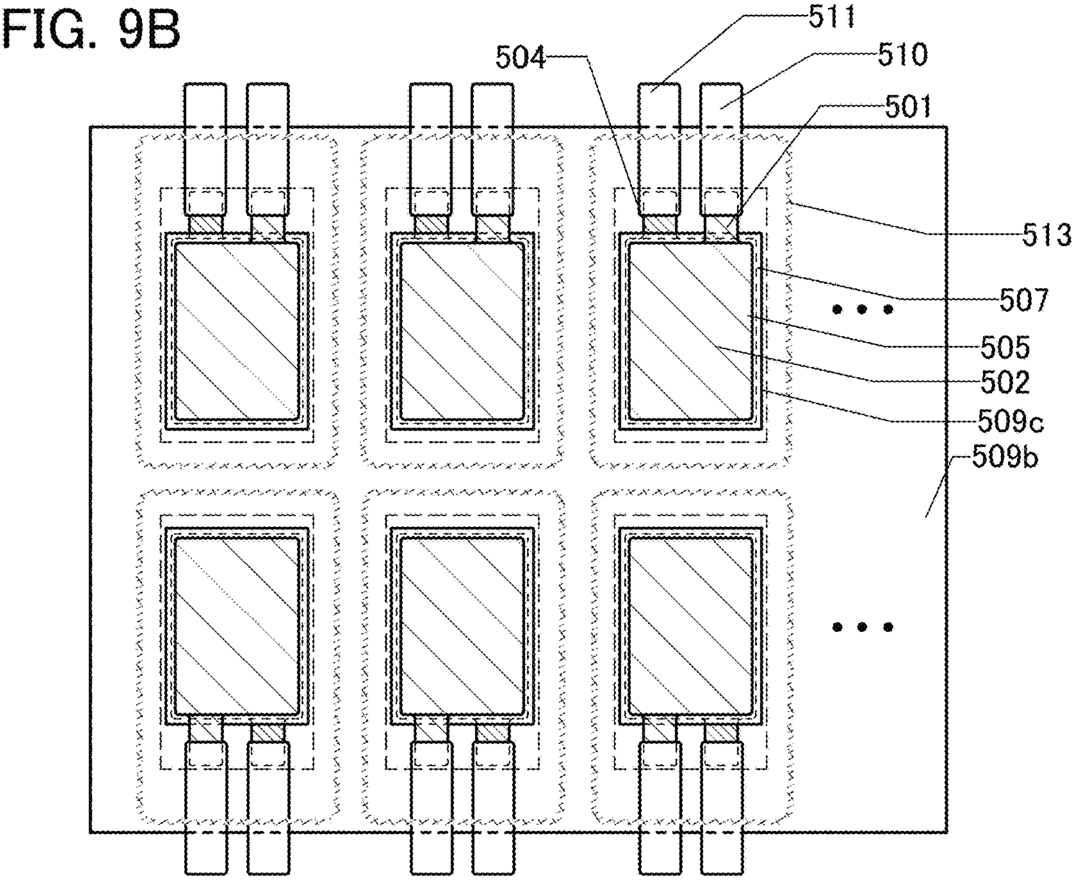

In each of FIG. 9A and FIG. 9B, the positive electrode (the positive electrode active material layer 502 and the positive electrode current collector 501), the separator 507, and the negative electrode (the negative electrode active material layer 505 and the negative electrode current collector 504) are placed in the concave portion 509*c* of the exterior body 509*b*. In addition, a positive electrode lead electrode 510 is bonded to the positive electrode current collector 501, and a negative electrode lead electrode 511 is bonded to the negative electrode current collector 504.

FIG. 9A illustrates an example in which the frame-like resin layer 521 is provided along four sides of the exterior body 509*b*. In this case, it is preferable that the frame-like resin layer 521 be irradiated with ultraviolet light under reduced pressure in Step S09 so that at least part of the frame-like resin layer 521 is cured. Then, sealing is preferably performed by thermocompression bonding in Step S10. In this manner, the frame-like resin layer 521 is preferably provided in the vicinity of an end portion of the exterior body 509*b* or an outside portion that is sufficiently apart from a region where the secondary battery is formed in the exterior body 509*b*. Accordingly, mixing of the material of the resin layer into the electrolyte can be inhibited. Note that in the case where the resin layer is provided to overlap the lead electrodes, a resin material with high insulating properties is preferably used so that the lead electrodes are brought into conduction. Alternatively, it is preferable to form a protective layer between the lead electrodes and the resin layer so that the resin layer is formed not to be in contact with the lead electrodes.

Figure 10:
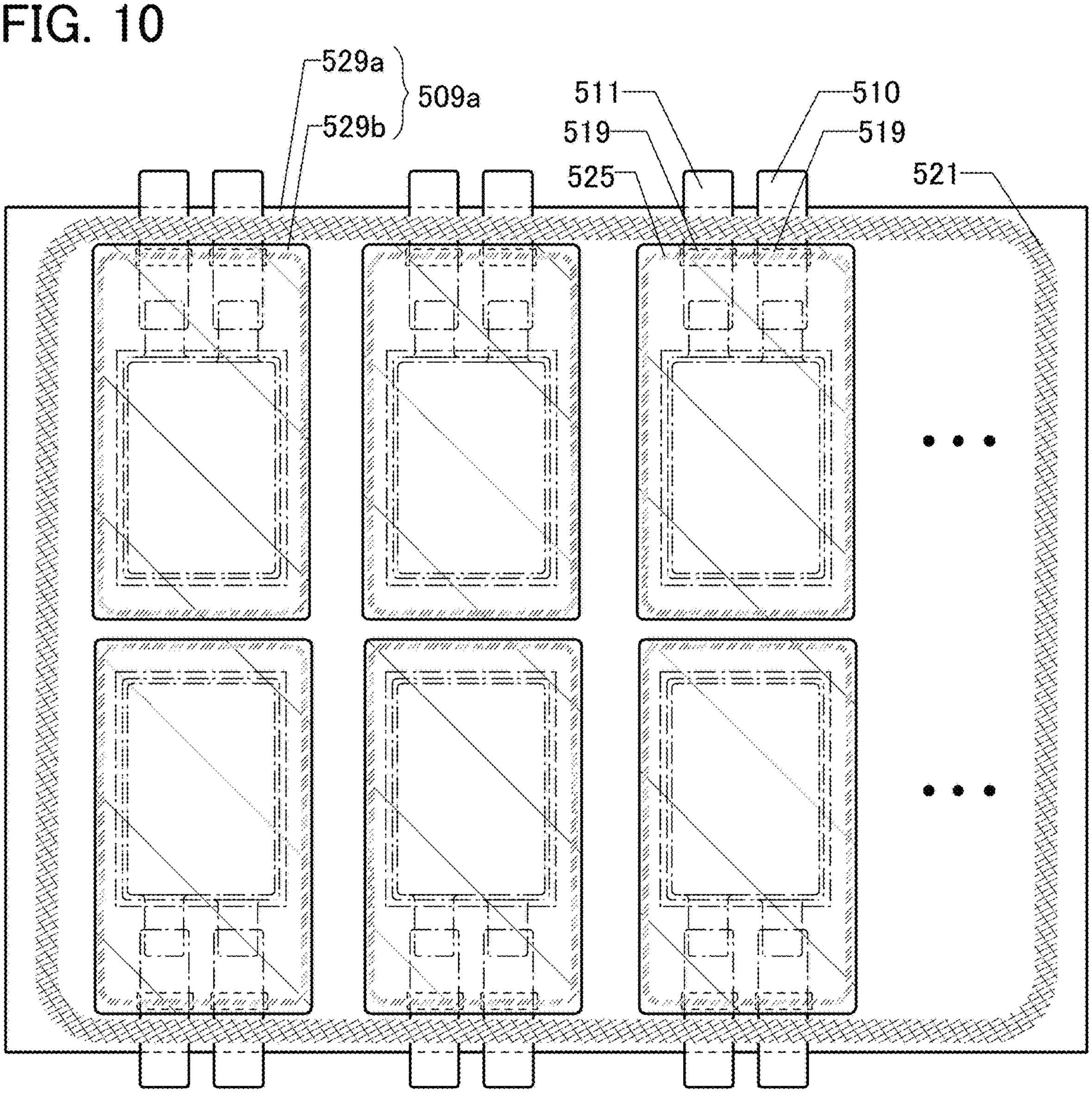
FIG. 10 is a top view illustrating an example of a method for fabricating a secondary battery.

FIG. 10 illustrates an example of top-view layout of seal regions 525 formed by thermocompression bonding. One seal region 525 is provided for one secondary battery.

The exterior body 509*a* is attached to the exterior body 509*b* (not illustrated) by the frame-like resin layer 521 and the seal region 525. An example is described in which the structure including the ultraviolet light transmission region 529*a* and the ultraviolet light blocking region 529*b* is applied to the exterior body 509*a*.

The seal region 525 is provided to surround the positive electrode, the separator, and the negative electrode. The positive electrode lead electrode 510 and the negative electrode lead electrode 511 each include a sealing layer 519 in a position overlapping the seal region 525. Accordingly, the lead electrode and the exterior body as well as the exterior bodies can be fixed to each other, and the reliability of the secondary battery can be increased.

FIG. 9B illustrates an example in which one frame-like resin layer 513 is provided for one concave portion 509*c*. Specifically, the frame-like resin layer 513 is provided over the exterior body 509*b* to surround the concave portion 509*c*. In this case, it is preferable that the frame-like resin layer 513 be irradiated with ultraviolet light under reduced pressure in Step S09 so that at least part of the frame-like resin layer 513 is cured. In particular, at least part of each of the plurality of frame-like resin layers 513 is preferably cured.

Then, it is preferable to irradiate the entire frame-like resin layer 513 with ultraviolet light under atmospheric pressure in Step S10 so that the entire frame-like resin layer 513 is cured.

Alternatively, sealing may be performed by thermocompression bonding in Step S10. At this time, part of the frame-like resin layer 513 may be uncured.

Alternatively, in the case where the plurality of frame-like resin layers 513 are each cured under reduced pressure so that the secondary batteries are individually sealed, for example, in Step S09, Step S10 is not necessarily performed.

Figure 11:
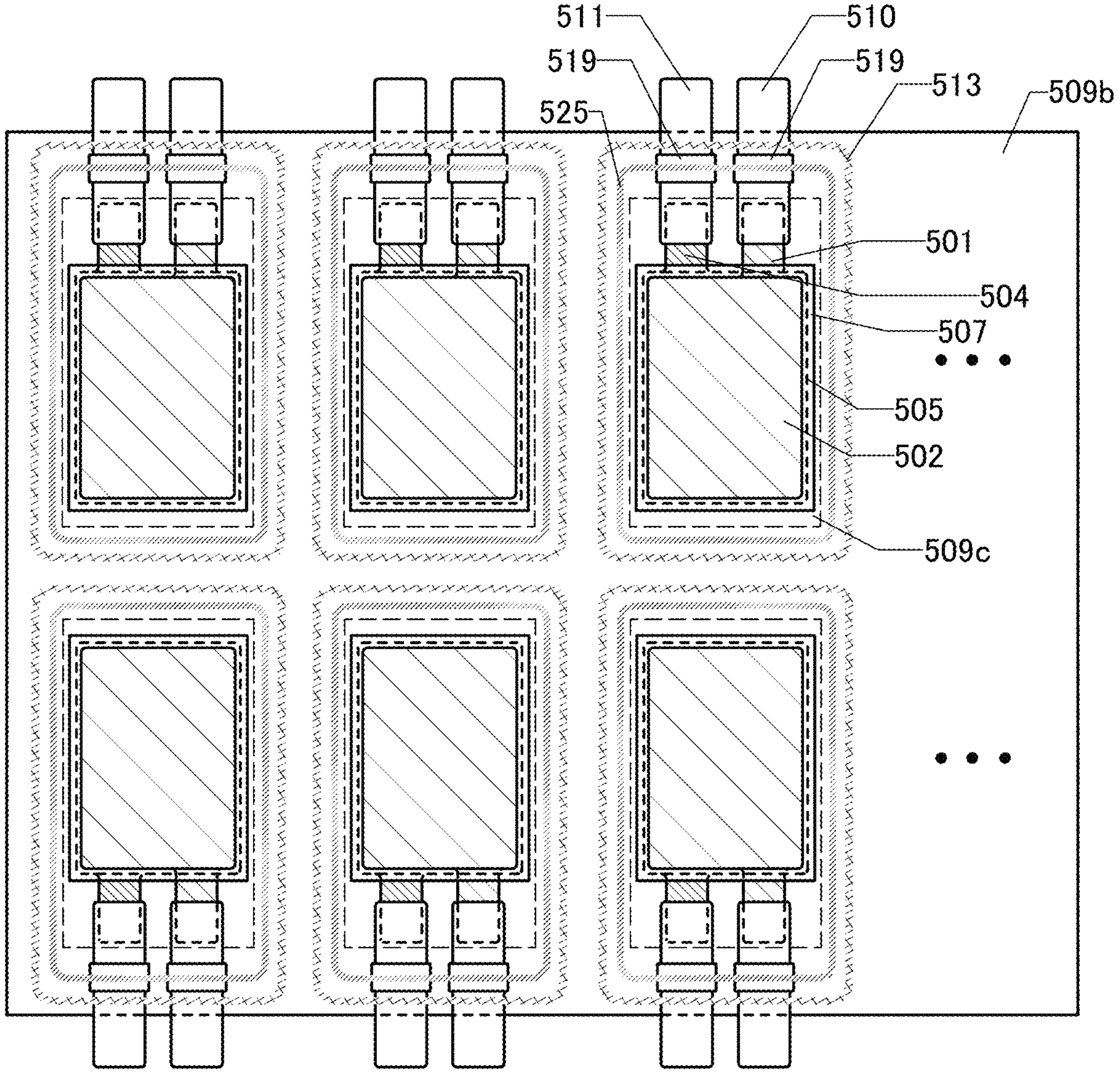
FIG. 11 is a top view illustrating an example of a method for fabricating a secondary battery.

FIG. 11 illustrates an example of the top-view layout of the seal regions 525 formed by thermocompression bonding. One seal region 525 is provided for one secondary battery. The seal region 525 is preferably provided inside the frame-like resin layer 513. Note that FIG. 11 does not illustrate the exterior body 509*a*.

The seal region 525 is provided to surround the positive electrode, the separator, and the negative electrode. The positive electrode lead electrode 510 and the negative electrode lead electrode 511 each include the sealing layer 519 in a position overlapping the seal region 525. Accordingly, the lead electrode and the exterior body as well as the exterior bodies can be fixed to each other, and the reliability of the secondary battery can be increased.

The use of a film (also referred to as a laminate film) including a stack of metal foil (aluminum foil, stainless steel foil, or the like) and a resin (heat-seal resin) as each of the exterior body 509*a* and the exterior body 509*b* allows fabrication of a thin secondary battery that is more lightweight than a secondary battery that uses a metal can. Metal foil having an adhesive layer on one or both surfaces (also referred to as a heat-seal layer) is used. Thermocompression bonding is performed in a state where a first adhesive layer of a first laminate film and a second adhesive layer of a second laminate film are attached closely to each other such that the first adhesive layer and the second adhesive layer are positioned inside, so that the seal region 525 is formed. In addition, there is no limitation on thermocompression bonding, and the seal region 525 may be formed using a thermosetting resin or the like.

A thermoplastic film material, a thermosetting adhesive, an anaerobic adhesive, a photocurable adhesive such as an ultraviolet curable adhesive, or a reactive curable adhesive can be used for the adhesive layer. As the material of the adhesive, an epoxy resin, an acrylic resin, a silicone resin, a phenol resin, or the like can be used.

The seal region 525 has a frame-like shape or a closed-loop shape. The stack of the positive electrode 503, the separator 507, and the negative electrode 506 is placed in a region surrounded by the seal region 525 to be hermetically sealed. Thus, the area of the region surrounded by the seal region 525 is larger than at least the area of the positive electrode 503 of the secondary battery.

As a film used for the exterior body of the secondary battery, a single-layer film selected from a metal film (foil of a metal such as aluminum, stainless steel, nickel steel, gold, silver, copper, titanium, nichrome, iron, tin, tantalum, niobium, molybdenum, zirconium, or zinc, an alloy thereof, or the like), a plastic film made of an organic material, a hybrid material film containing an organic material (an organic resin, fiber, or the like) and an inorganic material (ceramic or the like), and a carbon-containing inorganic film (a carbon film, a graphite film, or the like), a stacked-layer film including a plurality of the above films, or the like can be used.

In addition, the sealing structure of the secondary battery is a structure in which two exterior bodies overlap each other and are fixed and sealed on four sides of each of the exterior bodies with an adhesive layer. Alternatively, the sealing structure of the secondary battery is a structure in which one rectangular exterior body is folded in half such that two end portions, between which a folded portion is sandwiched, of four corners overlap each other and is fixed and sealed on four sides with an adhesive layer. With such a structure, the stack of the positive electrode, the separator, and the negative electrode is stored to be surrounded by the exterior body.

Note that the examples of the thin battery (laminated type) are mainly described in this embodiment; however, the shape of the battery fabricated by the method for fabricating a secondary battery according to one embodiment of the present invention is not particularly limited thereto and can also be applied to a wound battery. In the case of a wound battery, an electrolyte is dripped on a wound body or dripping is performed before a wound body is fabricated, i.e., before winding is performed. A wound body refers to an object in which a belt-shaped positive electrode, a belt-shaped separator, and a belt-shaped negative electrode overlap each other in this order and winding is performed while they are kept to overlap each other.

As described above, in the method for fabricating a secondary battery according to one embodiment of the present invention, in a phase of fabricating a stack by stacking a positive electrode, a separator, and a negative electrode, a plurality of drops of an electrolyte are dripped on at least one of the positive electrode, the separator, and the negative electrode. Consequently, the positive electrode, the separator, or the negative electrode can be uniformly or sufficiently impregnated with the electrolyte.

In addition, in the method for fabricating a secondary battery according to one embodiment of the present invention, when a resin layer is cured under reduced pressure, for example, a space surrounded by exterior bodies and a frame-like resin layer can be set in a reduced pressure state. Consequently, mixing of impurities into the secondary battery can be inhibited. Furthermore, when the dripped electrolyte is exposed from a reduced pressure atmosphere to an atmospheric pressure atmosphere, the dripped electrolyte permeates in a short time. Therefore, the time taken to impregnate the surfaces and insides of the positive electrode and the negative electrode with the electrolyte can be shortened. Then, the insides of the positive electrode and the negative electrode can be sufficiently impregnated with the electrolyte. Moreover, after that, sealing can also be performed under atmospheric pressure; thus, it is possible to expand options of the sealing method.

This embodiment can be combined with the other embodiments as appropriate. In addition, in this specification, in the case where a plurality of structure examples are illustrated in one embodiment, the structure examples can be combined as appropriate.

Embodiment 2

In this embodiment, components, materials, and the like of the secondary battery according to one embodiment of the present invention will be described.

[Positive Electrode]

The positive electrode includes a positive electrode active material layer and a positive electrode current collector. The positive electrode active material layer includes a positive electrode active material. The positive electrode active material layer may further include one or both of a conductive material and a binder.

[Negative Electrode]

The negative electrode includes a negative electrode active material layer and a negative electrode current collector. The negative electrode active material layer includes a negative electrode active material. The negative electrode active material layer may further include one or both of a conductive material and a binder.

[Current Collector]

For each of the positive electrode current collector and the negative electrode current collector, it is possible to use a highly conductive material that is not alloyed with carrier ions such as lithium ions, e.g., a metal such as stainless steel, gold, platinum, zinc, iron, nickel, copper, aluminum, titanium, or tantalum, an alloy thereof, or the like.

It is also possible to use an aluminum alloy to which an element that improves heat resistance, such as silicon, titanium, neodymium, scandium, or molybdenum, is added. Alternatively, one or both of the positive electrode current collector and the negative electrode current collector may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel.

The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness greater than or equal to 10 μm and less than or equal to 30 μm.

As each of the current collectors, a titanium compound may be stacked over the above-described metal. As a titanium compound, for example, it is possible to use one selected from titanium nitride, titanium oxide, titanium nitride in which oxygen is substituted for part of nitrogen, titanium oxide in which nitrogen is substituted for part of oxygen, and titanium oxynitride ($TiO_xN_y$, where $0<x<2$ and $0<y<1$), or a mixture or a stack of two or more of them. Titanium nitride is particularly preferable because it has high conductivity and has a high capability of inhibiting oxidation. Provision of a titanium compound over the surface of the current collector inhibits a reaction between a material contained in the active material layer formed over the current collector and the metal, for example. In the case where the active material layer contains a compound containing oxygen, an oxidation reaction between the metal element and oxygen can be inhibited. In the case where aluminum is used for the current collector and the active material layer is formed using graphene oxide described later, for example, an oxidation reaction between oxygen contained in the graphene oxide and aluminum might occur. In such a case, provision of a titanium compound over aluminum can inhibit an oxidation reaction between the current collector and the graphene oxide.

[Conductive Material]

The active material layer such as the positive electrode active material layer or the negative electrode active material layer preferably includes a conductive material (also referred to as a conductive agent or a conductive additive). As the conductive material, it is preferable to include a carbon-based material such as a graphene compound, carbon black, graphite, carbon fiber, or fullerene, and it is particularly preferable to include a graphene compound. As the carbon black, acetylene black (AB) can be used, for example. As the graphite, natural graphite or artificial graphite such as mesocarbon microbeads can be used, for example. These carbon-based materials may each function as an active material.

As carbon fiber, mesophase pitch-based carbon fiber and isotropic pitch-based carbon fiber can be used, for example.

As the carbon fiber, carbon nanofiber, carbon nanotube, or the like can be used. Carbon nanotube can be formed by, for example, a vapor deposition method.

The active material layer may contain as a conductive material metal powder or metal fiber of copper, nickel, aluminum, silver, gold, or the like, a conductive ceramic material, or the like.

The content of the conductive material to the total amount of the active material layer is preferably greater than or equal to 1 wt % and less than or equal to 10 wt %, further preferably greater than or equal to 1 wt % and less than or equal to 5 wt %.

Unlike a particulate conductive material such as carbon black, which makes point contact with an active material, the graphene compound is capable of making low-resistance surface contact. Accordingly, the electrical conduction between the particulate active material and the graphene compound can be improved with a smaller amount of the graphene compound than that of a normal conductive material. This can increase the proportion of the active material in the active material layer. Thus, discharge capacity of the secondary battery can be increased.

A compound containing particulate carbon such as carbon black or graphite or a compound containing fibrous carbon such as carbon nanotube easily enters a microscopic space. A microscopic space refers to, for example, a region between a plurality of active materials. When a carbon-containing compound that easily enters a microscopic space and a compound containing sheet-like carbon, such as graphene, that can impart conductivity to a plurality of particles are used in combination, the density of the electrode increases and an excellent conductive path can be formed. The secondary battery obtained by the fabrication method according to one embodiment of the present invention can have stability, and is effective as an in-vehicle secondary battery. An increase in the number of secondary batteries results in complicated control. With the use of a large secondary battery, the number of secondary batteries can be reduced and a load on a charging control circuit can be reduced.

[Binder]

The active material layer preferably includes a binder. The binder binds or fixes the electrolyte and the active material, for example. In addition, the binder can bind or fix the electrolyte and a carbon-based material, the active material and a carbon-based material, a plurality of active materials, a plurality of carbon-based materials, or the like.

As the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

Polyimide has thermally, mechanically, and chemically excellent stable properties.

A fluorine polymer which is a high molecular material containing fluorine, specifically, polyvinylidene fluoride (PVDF) or the like can be used. PVDF is a resin having a melting point in the range of higher than or equal to 134° C. and lower than or equal to 169° C., and is a material with excellent thermal stability.

As the binder, a rubber material such as styrene-butadiene rubber (SBR), styrene-isoprene-styrene rubber, acrylonitrile-butadiene rubber, butadiene rubber, or an ethylene-propylene-diene copolymer is preferably used. Alternatively, fluororubber can be used as the binder.

As the binder, for example, water-soluble polymers are preferably used. As the water-soluble polymers, a polysaccharide can be used, for example. As the polysaccharide, starch, a cellulose derivative such as carboxymethyl cellulose (CMC), methyl cellulose, ethyl cellulose, hydroxypropyl cellulose, diacetyl cellulose, or regenerated cellulose, or the like can be used. It is further preferred that such water-soluble polymers be used in combination with any of the above-described rubber materials.

Two or more of the above materials may be used in combination for the binder.

<Graphene Compound>

A graphene compound in this specification and the like refers to graphene, multilayer graphene, multi graphene, graphene oxide, multilayer graphene oxide, multi graphene oxide, reduced graphene oxide, reduced multilayer graphene oxide, reduced multi graphene oxide, graphene quantum dots, and the like. A graphene compound contains carbon, has a plate-like shape, a sheet-like shape, or the like, and has a two-dimensional structure formed of a six-membered ring composed of carbon atoms. The two-dimensional structure formed of the six-membered ring composed of carbon atoms may be referred to as a carbon sheet. A graphene compound may include a functional group. A graphene compound is preferably bent. A graphene compound may be rounded like carbon nanofiber.

In this specification and the like, for example, graphene oxide contains carbon and oxygen, has a sheet-like shape, and includes a functional group, in particular, an epoxy group, a carboxy group, or a hydroxy group.

In this specification and the like, for example, reduced graphene oxide contains carbon and oxygen, has a sheet-like shape, and has a two-dimensional structure formed of a six-membered ring composed of carbon atoms. The reduced graphene oxide may also be referred to as a carbon sheet. The reduced graphene oxide functions by itself and may have a stacked-layer structure. The reduced graphene oxide preferably includes a portion where the carbon concentration is higher than 80 atomic % and the oxygen concentration is higher than or equal to 2 atomic % and lower than or equal to 15 atomic %. With such a carbon concentration and such an oxygen concentration, the reduced graphene oxide can function as a conductive material with high conductivity even with a small amount. In addition, the intensity ratio G/D of a G band to a D band of the Raman spectrum of the reduced graphene oxide is preferably 1 or more. The reduced graphene oxide with such an intensity ratio can function as a conductive material with high conductivity even with a small amount.

A graphene compound can sometimes be provided with pores by reduction of graphene oxide.

A material obtained by terminating an end portion of graphene with fluorine may be used.

In the longitudinal cross section of the active material layer, the sheet-like graphene compounds are dispersed substantially uniformly in a region inside the active material layer. The plurality of graphene compounds are formed to partly coat a plurality of particles of the active material or adhere to the surfaces of the plurality of particles of the active material, so that the graphene compounds make surface contact with the particles of the active material.

Here, the plurality of graphene compounds can be bonded to each other to form a net-like graphene compound sheet (hereinafter, referred to as a graphene compound net or a graphene net). A graphene net that covers the active material can function as a binder for bonding the active materials. Accordingly, the amount of the binder can be reduced, or the binder does not have to be used. This can increase the proportion of the active material in the electrode volume or the electrode weight. That is, the charge and discharge capacity of the secondary battery can be increased.

Here, it is preferable to perform reduction after a layer to be the active material layer is formed in such a manner that graphene oxide is used as the graphene compound and mixed with an active material. That is, the formed active material layer preferably contains reduced graphene oxide. When graphene oxide with extremely high dispersibility in a polar solvent is used to form the graphene compounds, the graphene compounds can be substantially uniformly dispersed in a region inside the active material layer. The solvent is removed by volatilization from a dispersion medium containing the uniformly dispersed graphene oxide to reduce the graphene oxide; hence, the graphene compounds remaining in the active material layer partly overlap with each other and are dispersed such that surface contact is made, thereby forming a three-dimensional conductive path. Note that graphene oxide may be reduced by heat treatment or with the use of a reducing agent, for example.

It is possible to form, with a spray dry apparatus, a graphene compound serving as a conductive material as a coating film to cover the entire surface of the active material in advance and to form a conductive path by electrically connecting the active materials using the graphene compound.

A material used in formation of the graphene compound may be mixed with the graphene compound to be used for the active material layer. For example, particles used as a catalyst in formation of the graphene compound may be mixed with the graphene compound. As an example of the catalyst in formation of the graphene compound, particles containing one or more of silicon oxide ($SiO_2$ or $SiO_x$ ($x<2$)), aluminum oxide, iron, nickel, ruthenium, iridium, platinum, copper, germanium, and the like can be given. The average particle diameter (D50: also referred to as a median diameter) of the particles is preferably less than or equal to 1 μm, further preferably less than or equal to 100 nm.

[Negative Electrode Active Material]

As the negative electrode active material, a material that can react with carrier ions of the secondary battery, a material into and from which carrier ions can be inserted and extracted, a material that enables an alloying reaction with a metal serving as a carrier ion, a material that enables melting and precipitation of a metal serving as a carrier ion, or the like is preferably used.

Examples of the negative electrode active material will be described below.

A metal or a compound including one or more elements selected from silicon, tin, gallium, aluminum, germanium, lead, antimony, bismuth, silver, zinc, cadmium, and indium can be used as the negative electrode active material. Examples of an alloy-based compound using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

A material whose resistance is lowered by addition of one or more of phosphorus, arsenic, boron, aluminum, gallium, and the like as an impurity element to silicon may be used. Furthermore, a silicon material pre-doped with lithium may be used. Examples of a pre-doping method include annealing of a mixture of silicon with lithium fluoride, lithium carbonate, or the like and mechanical alloying of a lithium metal and silicon. A secondary battery may be fabricated in the following manner: an electrode is formed; lithium doping is performed through charge and discharge reaction with a combination of the formed electrode and an electrode of a lithium metal or the like; and then the electrode subjected to doping is combined with a counter electrode (e.g., a positive electrode for a negative electrode subjected to pre-doping).

For example, silicon nanoparticles can be used as the negative electrode active material. The average diameter of silicon nanoparticles is, for example, preferably greater than or equal to 5 nm and less than 1 μm, further preferably greater than or equal to 10 nm and less than or equal to 300 nm, still further preferably greater than or equal to 10 nm and less than or equal to 100 nm.

The silicon nanoparticles may have crystallinity. The silicon nanoparticles may include a region with crystallinity and an amorphous region.

As a material containing silicon, a material represented by $SiO_x$ (x is preferably less than 2, further preferably greater than or equal to 0.5 and less than or equal to 1.6) can be used, for example.

Carbon-based materials such as graphite, graphitizing carbon, non-graphitizing carbon, carbon nanotube, carbon black, and a graphene compound can be used as the negative electrode active material.

Furthermore, an oxide including one or more elements selected from titanium, niobium, tungsten, and molybdenum can be used as the negative electrode active material.

As the negative electrode active material, an oxide such as SnO, $SnO_2$, titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used. Alternatively, as the negative electrode active material, $Li_{3-x}M_xN$ (Mis Co, Ni, or Cu) with a $Li_3N$ structure, which is a composite nitride containing lithium and a transition metal, can be used. For example, $Li_{2.6}Co_{0.4}N_3$ is preferable because of high charge and discharge capacity (900 mAh/g).

A composite nitride of lithium and a transition metal is preferably used as a negative electrode material, in which case the negative electrode material can be used in combination with a material that does not contain lithium ions, such as $V_2O_5$ or $Cr_3O_8$, as a positive electrode material. Note that in the case of using a material containing lithium ions as a positive electrode material, the composite nitride of lithium and a transition metal can be used as the negative electrode material by extracting the lithium ions contained in the positive electrode material in advance.

Alternatively, a material that causes a conversion reaction can be used as the negative electrode active material. For example, a transition metal oxide that does not cause an alloying reaction with lithium, such as cobalt oxide (CoO), nickel oxide (NiO), and iron oxide (FeO), may be used as the negative electrode active material. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides may be used as the positive electrode material because of its high potential.

As the negative electrode active material, it is possible to use a combination of two or more of the aforementioned metals, materials, compounds, and the like.

[Positive Electrode Active Material]

Examples of the positive electrode active material include lithium-containing materials with an olivine crystal structure, a layered rock-salt crystal structure, and a spinel crystal structure.

For the secondary battery according to one embodiment of the present invention, a positive electrode active material with a layered crystal structure is preferably used.

An example of a layered crystal structure is a layered rock-salt crystal structure. As a lithium-containing material with a layered rock-salt crystal structure, for example, it is possible to use a lithium-containing material represented by $LiM_xO_y$ ($x>0$ and $y>0$, more specifically, $y=2$ and $0.8<x<1.2$, for example). Here, M represents a metal element, which is preferably one or more selected from cobalt, manganese, nickel, and iron. Alternatively, M represents two or more selected from cobalt, manganese, nickel, iron, aluminum, titanium, zirconium, lanthanum, copper, and zinc, for example.

Examples of the lithium-containing material represented by $LiM_xO_y$ include $LiCoO_2$, $LiNiO_2$, and $LiMnO_2$. Examples of a NiCo-based material represented by $LiNi_xCo_{1-x}O_2$ ($0<x<1$) and the lithium-containing material represented by $LiM_xO_y$ include a NiMn-based material represented by $LiNi_xMn_{1-x}O_2$ ($0<x<1$).

As a lithium-containing material represented by $LiMO_2$, for example, a NiCoMn-based material (also referred to as NCM) represented by $LiNi_xCo_yMn_zO_2$ ($x>0$, $y>0$, and $0.8<x+y+z<1.2$) is given. Specifically, $0.1x<y<8x$ and $0.1x<z<8x$ are preferably satisfied, for example. For example, x, y, and z preferably satisfy x:y:z=1:1:1 or the neighborhood thereof.

Alternatively, for example, x, y, and z preferably satisfy x:y:z=5:2:3 or the neighborhood thereof. Alternatively, for example, x, y, and z preferably satisfy x:y:z=8:1:1 or the neighborhood thereof. Alternatively, for example, x, y, and z preferably satisfy x:y:z=6:2:2 or the neighborhood thereof. Alternatively, for example, x, y, and z preferably satisfy x:y:z=1:4:1 or the neighborhood thereof.

Examples of a lithium-containing material with a layered rock-salt crystal structure include $Li_2MnO_3$ and $Li_2MnO_3$—$LiMeO_2$ (Me represents Co, Ni, or Mn).

With a positive electrode active material having a layered crystal structure typified by the above-described lithium-containing material, a secondary battery with a high lithium content per volume and high capacity per volume can be achieved in some cases. In such a positive electrode active material, the amount of lithium extracted during charging per volume is large; thus, in order to perform stable charging and discharging, a crystal structure after the extraction needs to be stabilized. Collapse of the crystal structure in charging and discharging may hinder fast charging or fast discharging.

As the positive electrode active material, it is preferable to mix lithium nickel oxide ($LiNiO_2$ or $LiNi_{1-x}M_xO_2$ ($0<x<1$) (M=Co, Al, or the like) with a lithium-containing material that has a spinel crystal structure and contains manganese, such as $LiMn_2O_4$. This composition can improve the performance of the secondary battery.

As the positive electrode active material, a lithium-manganese composite oxide that can be represented by a composition formula $Li_aMn_bM_cO_d$ can be used. Here, the element M is preferably silicon, phosphorus, or a metal element other than lithium and manganese, further preferably nickel. In the case where the whole particles of a lithium-manganese composite oxide are measured, it is preferable to satisfy the following at the time of discharging: $0<a/(b+c)<2$; $c>0$; and $0.26\leq(b+c)/d<0.5$. Note that the proportions of metals, silicon, phosphorus, and the like in the whole particles of a lithium-manganese composite oxide can be measured with, for example, an ICP-MS (inductively coupled plasma mass spectrometer). The proportion of oxygen in the whole particles of a lithium-manganese composite oxide can be measured by, for example, EDX (energy dispersive X-ray spectroscopy). Alternatively, the proportion can be measured by ICP-MS analysis combined with fusion gas analysis and valence evaluation of XAFS (X-ray absorption fine structure) analysis. Note that the lithium-manganese composite oxide is an oxide containing at least lithium and manganese, and may contain at least one element selected from a group consisting of chromium, cobalt, aluminum, nickel, iron, magnesium, molybdenum, zinc, indium, gallium, copper, titanium, niobium, silicon, phosphorus, and the like.

<Structure of Positive Electrode Active Material>

A material with a layered rock-salt crystal structure, such as lithium cobalt oxide ($LiCoO_2$), is known to have a high discharge capacity and excel as a positive electrode active material of a secondary battery. An example of the material with a layered rock-salt crystal structure is a composite oxide represented by $LiMO_2$. The metal M contains a metal Mel. The metal Mel is one or more kinds of metals including cobalt. The metal M can contain another metal in addition to the metal Mel. The metal is one or more metals selected from magnesium, calcium, zirconium, lanthanum, barium, copper, potassium, sodium, and zinc.

The remaining amount of lithium that can be inserted into and extracted from a positive electrode active material is represented by x in a compositional formula, e.g., x in $Li_xCoO_2$ or x in $Li_xMO_2$. In this specification, $Li_xCoO_2$ can be replaced with $Li_xMO_2$ as appropriate. In the case of a positive electrode active material in a secondary battery, x can be charge capacity/theoretical capacity. For example, when a secondary battery using $LiCoO_2$ as a positive electrode active material is charged to 219.2 mAh/g, the positive electrode active material can be represented by $Li_{0.8}CoO_2$ or $x=0.8$. Small x in $Li_xCoO_2$ means, for example, $0.1<x\leq0.24$.

It is known that the Jahn-Teller effect in a transition metal compound varies in degree according to the number of electrons in the d orbital of the transition metal.

In a compound containing nickel, distortion is likely to be caused because of the Jahn-Teller effect in some cases. Accordingly, when charging and discharging that make x smaller in $LiNiO_2$ are performed, the crystal structure might be broken because of the distortion. The influence of the Jahn-Teller effect is suggested to be small in $LiCoO_2$, and $Li_xCoO_2$ with smaller x is preferable because charge-discharge tolerance is higher in some cases.

The positive electrode active material will be described with reference to FIG. 12 and FIG. 13.

<Crystal Structure>

<<x in $Li_xCoO_2$ being 1>>

The positive electrode active material according to one embodiment of the present invention preferably has a layered rock-salt crystal structure belonging to the space group R-3m in a discharged state, i.e., in the case where x in $Li_xCoO_2$ is 1. A composite oxide having a layered rock-salt structure excels as a positive electrode active material of a secondary battery because it has high discharge capacity and a two-dimensional diffusion path for lithium ions and is thus suitable for an insertion/extraction reaction of lithium ions. For this reason, it is particularly preferable that an inner portion, which accounts for the majority of the volume of the positive electrode active material, have a layered rock-salt crystal structure. In FIG. 12, the layered rock-salt crystal structure is denoted by R-3m O3.

A surface portion is a region from which lithium ions are extracted first in charging, and is a region that tends to have a lower lithium concentration than the inner portion. Bonds between atoms are regarded as being partly cut on the surface of the positive electrode active material included in the surface portion. Thus, the surface portion is regarded as a region that tends to be unstable and tends to start deterioration of the crystal structure. Meanwhile, when the surface portion can be made sufficiently stable, the layered structure, which is formed of octahedrons of a transition metal M and oxygen, of the inner portion is unlikely to be broken even with small x in $Li_xCoO_2$, e.g., with x of less than or equal to 0.24. Furthermore, a shift in layers, which are formed of octahedrons of the transition metal M and oxygen, of the inner portion can be inhibited.

In order that the surface portion can have a stable composition and a stable crystal structure, the surface portion preferably contains an additive element A, further preferably contains a plurality of additive elements A. The surface portion preferably has a higher concentration of one or more selected from the additive elements A than the inner portion. The one or more selected from the additive elements A contained in the positive electrode active material preferably have a concentration gradient. In addition, it is further preferable that the additive elements A in the positive electrode active material be differently distributed. For example, it is further preferable that the additive elements A exhibit concentration peaks at different depths from a surface. The concentration peak here refers to the local maximum value of the concentration in the surface portion or the concentration in 50 nm or less in depth from the surface.

For example, some of the additive elements A such as magnesium, fluorine, titanium, silicon, phosphorus, boron, and calcium preferably have a concentration gradient in which the concentration increases from the inner portion toward the surface. An element having such a concentration gradient is referred to as an additive element X.

For example, magnesium, which is one of the additive elements X, is divalent, and a magnesium ion is more stable in lithium sites than in transition metal M sites in the layered rock-salt crystal structure and thus is likely to enter the lithium sites. An appropriate concentration of magnesium in the lithium sites of the surface portion facilitates maintenance of the layered rock-salt crystal structure. This is probably because magnesium in the lithium sites serves as a column supporting the $CoO_2$ layers. Moreover, the presence of magnesium can inhibit extraction of oxygen around magnesium in a state where x in $Li_xCoO_2$ is, for example, less than or equal to 0.24. The presence of magnesium probably increases the density of the positive electrode active material. In addition, a high magnesium concentration in the surface portion probably increases the corrosion resistance to hydrofluoric acid generated by the decomposition of the electrolyte solution.

An appropriate concentration of magnesium does not have an adverse effect on insertion and extraction of lithium in charging and discharging, and the above-described advantages can be obtained. However, excess magnesium might adversely affect insertion and extraction of lithium. Furthermore, the effect of stabilizing the crystal structure might be reduced. This is probably because magnesium enters the transition metal M sites in addition to the lithium sites. Moreover, an undesired magnesium compound (e.g., an oxide or a fluoride) which is substituted for neither the lithium site nor the transition metal M site might segregate at the surface of the positive electrode active material or the like to serve as a resistance component of a secondary battery. As the magnesium concentration in the positive electrode active material increases, the discharge capacity of the positive electrode active material decreases in some cases. This is probably because excess magnesium enters the lithium sites and the amount of lithium contributing to charging and discharging decreases.

Thus, the entire positive electrode active material preferably contains an appropriate amount of magnesium. For example, the number of magnesium atoms is preferably greater than or equal to 0.001 times and less than or equal to 0.1 times, further preferably greater than 0.01 times and less than 0.04 times, still further preferably approximately 0.02 times the number of cobalt atoms. The amount of magnesium contained in the entire positive electrode active material here may be a value obtained by element analysis on the entire positive electrode active material using GD-MS, ICP-MS, or the like, or may be a value based on the ratio of the raw materials mixed in the formation process of the positive electrode active material, for example.

Aluminum, which is one of the additive elements A, can exist in a transition metal M site in a layered rock-salt crystal structure. Since aluminum is a trivalent representative element and its valence does not change, lithium around aluminum is unlikely to move even in charging and discharging. Thus, aluminum and lithium therearound serve as columns to inhibit a change in the crystal structure. Furthermore, aluminum has effects of inhibiting elution of the transition metal M around aluminum and improving continuous charge tolerance. Moreover, an Al—O bond is stronger than a Co—O bond; thus, extraction of oxygen around aluminum can be inhibited. These effects improve thermal stability. Hence, a secondary battery containing aluminum as the additive element A can have improved stability. Furthermore, the positive electrode active material can have a crystal structure that is unlikely to be broken by repeated charging and discharging.

Meanwhile, excess aluminum might adversely affect insertion and extraction of lithium.

Thus, the entire positive electrode active material preferably contains an appropriate amount of aluminum. For example, the number of aluminum atoms contained in the entire positive electrode active material is preferably greater than or equal to 0.05% and less than or equal to 4%, further preferably greater than or equal to 0.1% and less than or equal to 2%, still further preferably greater than or equal to 0.3% and less than or equal to 1.5% of the number of cobalt atoms. Alternatively, the number of aluminum atoms is preferably greater than or equal to 0.05% and less than or equal to 2% of the number of cobalt atoms. Alternatively, the number of aluminum atoms is preferably greater than or equal to 0.1% and less than or equal to 4% of the number of cobalt atoms. The amount contained in the entire positive electrode active material here may be a value obtained by element analysis on the entire positive electrode active material using GD-MS, ICP-MS, or the like, or may be a value based on the ratio of the raw materials mixed in the formation process of the positive electrode active material, for example.

For example, a crystal structure preferably changes continuously from the layered rock-salt inner portion toward the surface and the surface portion that have a rock-salt structure or have features of both a rock-salt structure and a layered rock-salt structure. Alternatively, the orientations of the surface portion that has a rock-salt structure or has the features of both a rock-salt structure and a layered rock-salt structure and the layered rock-salt inner portion are preferably substantially aligned with each other.

In this specification and the like, a layered rock-salt crystal structure, which belongs to the space group R-3m, of a composite oxide containing lithium and the transition metal M such as cobalt refers to a crystal structure in which a rock-salt ion arrangement where cations and anions are alternately arranged is included and lithium and the transition metal M are regularly arranged to form a two-dimensional plane, so that lithium can be diffused two-dimensionally.

Note that a defect such as a cation or anion vacancy may exist. In the layered rock-salt crystal structure, strictly, a lattice of a rock-salt crystal is distorted in some cases.

A rock-salt crystal structure refers to a structure in which a cubic crystal structure with the space group Fm-3m or the like is included and cations and anions are alternately arranged. Note that a cation or anion vacancy may exist.

Having features of both a layered rock-salt crystal structure and a rock-salt crystal structure can be judged by electron diffraction, a TEM (Transmission Electron Microscope) image, a cross-sectional STEM (Scanning Transmission Electron Microscope) image, and the like.

Anions of a layered rock-salt crystal and anions of a rock-salt crystal have a cubic close-packed structure (face-centered cubic lattice structure). Anions of an O3' type crystal (also referred to as a pseudo-spinel crystal) described later are also presumed to have a cubic close-packed structure. Thus, when a layered rock-salt crystal and a rock-salt crystal are in contact with each other, there is a crystal plane at which orientations of cubic close-packed structures composed of anions are aligned with each other.

The description can also be made as follows. Anions on the {111} plane of a cubic crystal structure have a triangle lattice. A layered rock-salt structure, which belongs to a space group R-3m and is a rhombohedral structure, is generally represented by a composite hexagonal lattice for easy understanding of the structure, and the (0001) plane of the layered rock-salt structure has a hexagonal lattice. The triangle lattice on the {111} plane of the cubic crystal has atomic arrangement similar to that of the hexagonal lattice on the (0001) plane of the layered rock-salt structure. These lattices being consistent with each other can be expressed as "orientations of the cubic close-packed structures are aligned with each other."

Note that the space groups of the layered rock-salt crystal and the O3' type crystal are R-3m, which is different from the space group Fm-3m (the space group of a general rock-salt crystal) of the rock-salt crystal; thus, the Miller index of the crystal plane satisfying the above conditions in the layered rock-salt crystal and the O3' type crystal is different from that in the rock-salt crystal. In this specification, a state where the orientations of the cubic close-packed structures composed of anions in the layered rock-salt crystal, the O3' type crystal, and the rock-salt crystal are aligned with each other is referred to as a state where crystal orientations are substantially aligned with each other in some cases.

The orientations of crystals in two regions being substantially aligned with each other can be judged, for example, from a TEM image, a STEM image, a HAADF-STEM (High-angle Annular Dark Field Scanning TEM) image, an ABF-STEM (Annular Bright-Field Scanning Transmission Electron microscopy) image, electron diffraction, and FFT of a TEM image, a STEM image, or the like. XRD (X-ray Diffraction), neutron diffraction, and the like can also be used for judging.

Figure 13:
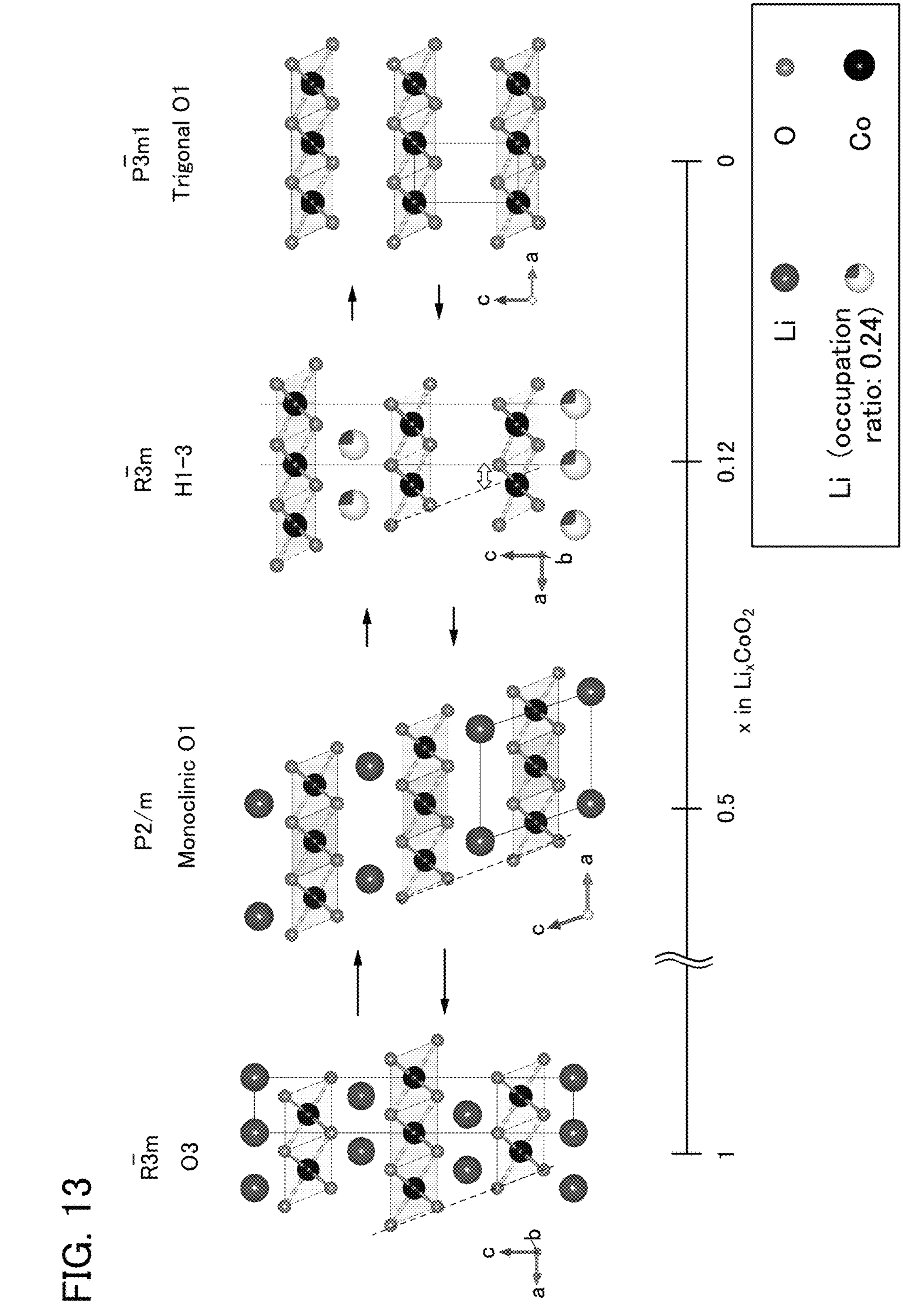
FIG. 13 is a diagram illustrating crystal structures of a positive electrode active material.

In FIG. 13, the crystal structure of lithium cobalt oxide with x in $Li_xCoO_2$ of 1 is denoted by R-3m O3. In this crystal structure, lithium occupies octahedral sites and a unit cell includes three $CoO_2$ layers. Thus, this crystal structure is referred to as an O3 type crystal structure in some cases. Note that the $CoO_2$ layer has a structure in which octahedral geometry with oxygen hexacoordinated to cobalt continues on a plane in the edge-sharing state. This is sometimes referred to as a layer formed of octahedrons of cobalt and oxygen.

Conventional lithium cobalt oxide with x of approximately 0.5 is known to have an improved symmetry of lithium and have a monoclinic crystal structure belonging to the space group P2/m. This structure includes one $CoO_2$ layer in a unit cell. Thus, this crystal structure is referred to as an O1 type structure or a monoclinic O1 type structure in some cases.

When x is 0, the positive electrode active material has a trigonal crystal structure of the space group P-3 ml, and one $CoO_2$ layer exists in a unit cell. Thus, this crystal structure is referred to as an O1 type structure or a trigonal O1 type structure in some cases. Moreover, in some cases, this crystal structure is referred to as a hexagonal O1 type structure when a trigonal crystal is converted into a composite hexagonal lattice.

Moreover, conventional lithium cobalt oxide with x of approximately 0.12 has the crystal structure of the space group R-3m. This structure can also be regarded as a structure in which $CoO_2$ structures such as trigonal O1 type structures and $LiCoO_2$ structures such as R-3m O3 are alternately stacked. Thus, this crystal structure is referred to as an H1-3 type crystal structure in some cases. Note that since insertion and extraction of lithium are not necessarily uniform in reality, the H1-3 type crystal structure starts to be observed when x is approximately 0.25 experimentally. The number of cobalt atoms per unit cell in the actual H1-3 type crystal structure is twice as large as that of cobalt atoms per unit cell in other structures. However, in this specification including FIG. 13, the c-axis of the H1-3 type crystal structure is half that of the unit cell for easy comparison with the other crystal structures.

For the H1-3 type crystal structure, the coordinates of cobalt and oxygen in the unit cell can be expressed as follows, for example: Co (0, 0, 0.42150±0.00016), $O_1$ (0, 0, 0.27671±0.00045), and $O_2$ (0, 0, 0.11535±0.00045). $O_1$ and $O_2$ are each an oxygen atom. A unit cell that should be used for representing a crystal structure in a positive electrode active material can be judged by the Rietveld analysis of XRD, for example. In this case, a unit cell is selected such that the value of GOF (goodness of fit) is small.

When charging and discharging are repeated so that x in $Li_xCoO_2$ becomes less than or equal to 0.24, the crystal structure of conventional lithium cobalt oxide repeatedly changes between the H1-3 type crystal structure and the R-3m O3 structure in the discharged state (i.e., an unbalanced phase change).

However, there is a large shift in the $CoO_2$ layers between these two crystal structures. As indicated by a dotted line and an arrow in FIG. 13, the $CoO_2$ layer in the H1-3 type crystal structure largely shifts from that in R-3m O3 in the discharged state. Such a dynamic structural change might adversely affect the stability of the crystal structure.

A difference in volume between these two crystal structures is also large. The difference in volume per the same number of cobalt atoms between the H1-3 type crystal structure and the R-3m 03 type crystal structure in the discharged state is greater than 3.5%, typically greater than or equal to 3.9%.

In addition, a structure in which $CoO_2$ layers are continuous, such as the trigonal O1 type structure, included in the H1-3 type crystal structure is highly likely to be unstable.

Thus, when charging and discharging are repeated so that x becomes less than or equal to 0.24, the crystal structure of conventional lithium cobalt oxide is gradually broken. The break of the crystal structure degrades the cycle performance. This is because the broken crystal structure has a smaller number of sites where lithium can exist stably and makes it difficult to insert and extract lithium.

Figure 12:
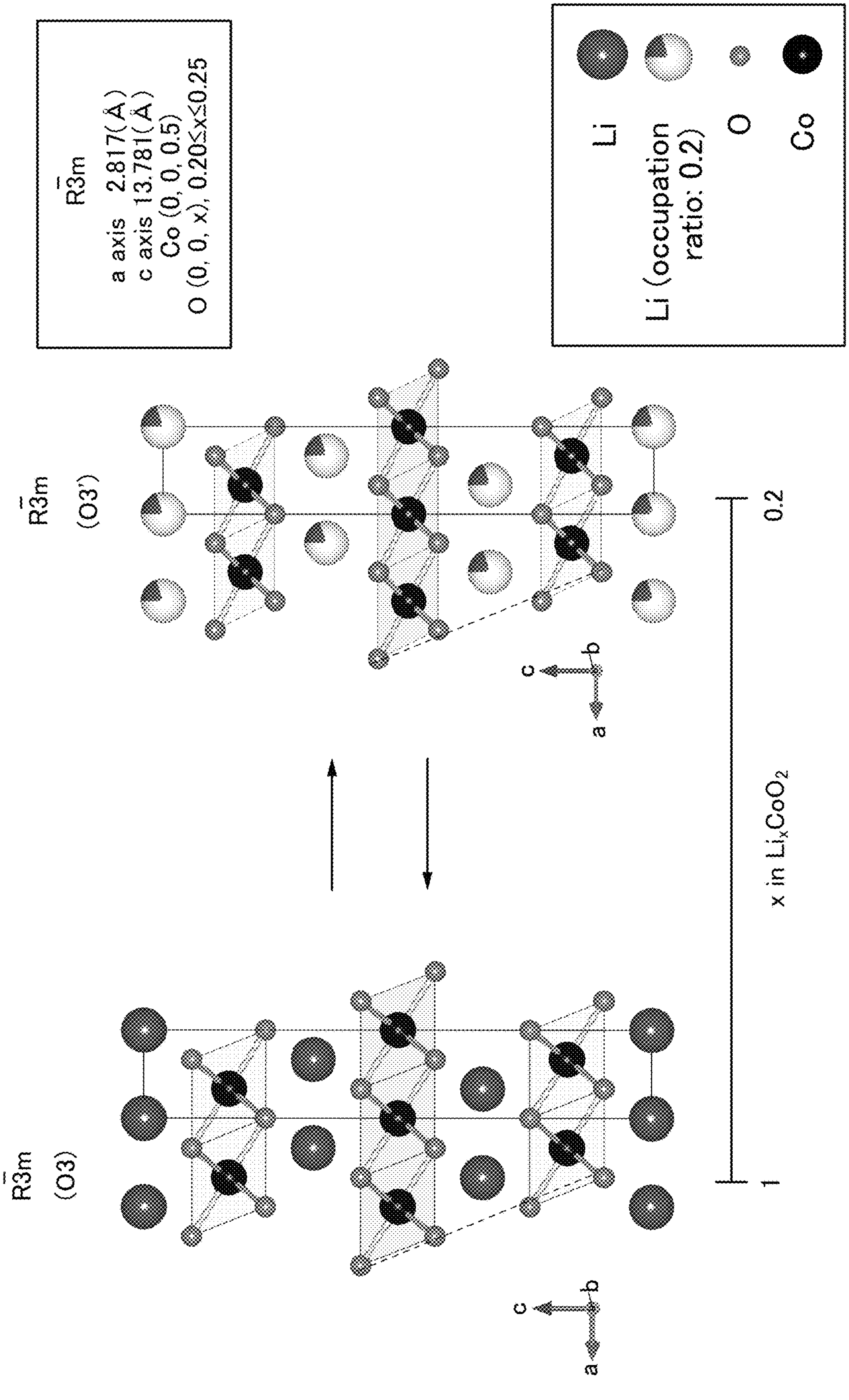
FIG. 12 is a diagram illustrating crystal structures of a positive electrode active material.

As denoted by the dotted lines in FIG. 12, the $CoO_2$ layers hardly shift between the R-3m (O3) in a discharged state and the O3' type crystal structure.

The R-3m (O3) in a discharged state and the O3' type crystal structure which contain the same number of cobalt atoms have a difference in volume of 2.5% or less, more specifically 2.2% or less, typically 1.8%.

As described above, in the positive electrode active material according to one embodiment of the present invention, a change in the crystal structure caused when x in $Li_xCoO_2$ is small, i.e., when a large amount of lithium is extracted, is smaller than that in a conventional positive electrode active material. In addition, a change in the volume in the case where the positive electrode active materials having the same number of cobalt atoms are compared is inhibited. Thus, the crystal structure of the positive electrode active material according to one embodiment of the present invention is unlikely to be broken even when charging and discharging are repeated so that x becomes less than or equal to 0.24. This inhibits a decrease in charge and discharge capacity of the positive electrode active material according to one embodiment of the present invention in charge and discharge cycles. Furthermore, the positive electrode active material according to one embodiment of the present invention can stably use a larger amount of lithium than a conventional positive electrode active material and thus has high discharge capacity per weight and per volume. Hence, with the use of the positive electrode active material according to one embodiment of the present invention, a secondary battery with high discharge capacity per weight and per volume can be fabricated.

Note that the positive electrode active material is confirmed to have the O3' type crystal structure in some cases when x in $Li_xCoO_2$ is greater than or equal to 0.15 and less than or equal to 0.24, and is presumed to have the O3' type crystal structure even when x is greater than 0.24 and less than or equal to 0.27. However, the crystal structure is influenced not only by x in $Li_xCoO_2$ but also by the number of charge and discharge cycles, charge and discharge current, temperature, an electrolyte, and the like; thus, the range of x is not limited to the above. Thus, when x in $Li_xCoO_2$ is greater than 0.1 and less than or equal to 0.24, the entire internal structure of the positive electrode active material is not necessarily the O3' type crystal structure. The positive electrode active material either may include another crystal structure or may be partly amorphous.

In order to make x in $Li_xCoO_2$ small, charging at a high charge voltage is necessary in general. Thus, a state where x in $Li_xCoO_2$ is small can be rephrased as a state where charging at a high charge voltage has been performed. For example, when CC/CV charging is performed at 25° C. and 4.6 V or higher with reference to the potential of a lithium metal, the H1-3 type crystal structure appears in a conventional positive electrode active material. Hence, a charge voltage of 4.6 V or higher can be regarded as a high charge voltage with reference to the potential of a lithium metal. In this specification and the like, unless otherwise specified, charge voltage is shown with reference to the potential of a lithium metal.

Thus, the positive electrode active material according to one embodiment of the present invention is preferable because the crystal structure with the symmetry of R-3m O3 can be maintained even when charging at a high charge voltage of 4.6 V or higher is performed at 25° C., for example. Moreover, the positive electrode active material according to one embodiment of the present invention is preferable because the O3' type crystal structure can be obtained when charging at a higher charge voltage, e.g., a voltage higher than or equal to 4.65 V and lower than or equal to 4.7 V, is performed at 25° C.

At a much higher charge voltage, the H1-3 type crystal is eventually observed also in the positive electrode active material in some cases. As described above, the crystal structure is influenced by the number of charge and discharge cycles, charge and discharge current, an electrolyte, and the like; thus, the positive electrode active material according to one embodiment of the present invention sometimes has the O3' type crystal structure even at a lower charge voltage, e.g., a charge voltage higher than or equal to 4.5 V and lower than 4.6 V, at 25° C.

Note that in the case where graphite is used as a negative electrode active material in a secondary battery, for example, the voltage of the secondary battery is lower than the above-mentioned voltage by the potential of graphite. The potential of graphite is approximately 0.05 V to 0.2 V with reference to the potential of a lithium metal. Thus, in the case of a secondary battery using graphite as a negative electrode active material, a similar crystal structure is obtained at a voltage obtained by subtracting the potential of the graphite from the above-described voltage.

As illustrated in FIG. 12, the lattice constant of the a-axis of the O3' type crystal structure is $2.817\times10^{-10}$ m and the lattice constant of the c-axis is $13.781\times10^{-10}$ m.

Note that in the unit cell of the O3' type crystal structure, the coordinates of cobalt and oxygen can be represented by Co (0, 0, 0.5) and O (0, 0, x) within the range of $0.20<x\leq0.25$.

<Particle Diameter of Positive Electrode Active Material>

A too large particle diameter of the positive electrode active material causes problems such as difficulty in lithium diffusion and too much surface roughness of an active material layer in coating to a current collector. By contrast, a too small particle diameter causes problems such as difficulty in carrying an active material layer in coating to a current collector and overreaction with an electrolyte solution. Thus, the D50 is preferably greater than or equal to 1 μm and less than or equal to 100 μm, further preferably greater than or equal to 2 μm and less than or equal to 40 μm, still further preferably greater than or equal to 5 μm and less than or equal to 30 μm. Alternatively, the D50 is preferably greater than or equal to 1 μm and less than or equal to 40 μm. Alternatively, the D50 is preferably greater than or equal to 1 μm and less than or equal to 30 μm. Alternatively, the D50 is preferably greater than or equal to 2 μm and less than or equal to 100 μm. Alternatively, the D50 is preferably greater than or equal to 2 μm and less than or equal to 30 μm. Alternatively, the D50 is preferably greater than or equal to 5 μm and less than or equal to 100 μm. Alternatively, the D50 is preferably greater than or equal to 5 μm and less than or equal to 40 μm.

<Analysis Method>

Whether or not a given positive electrode active material is the positive electrode active material according to one embodiment of the present invention, which has the O3' type crystal structure when x in $Li_xCoO_2$ is small, can be judged by analyzing a positive electrode including the positive electrode active material with small x in $Li_xCoO_2$ by XRD, electron diffraction, neutron diffraction, electron spin resonance (ESR), nuclear magnetic resonance (NMR), or the like. The XRD is particularly preferable because the symmetry of a transition metal such as cobalt contained in the positive electrode active material can be analyzed with high resolution, the degrees of crystallinity and the crystal orientations can be compared, the distortion of lattice periodicity and the crystallite size can be analyzed, and a positive electrode obtained by disassembling a secondary battery can be measured without any change with sufficient accuracy, for example.

As described above, the positive electrode active material has a feature of a small change in the crystal structure between when x in $Li_xCoO_2$ is 1 and when x is less than or equal to 0.24. A material where 50% or more of the crystal structure largely changes in high-voltage charging is not preferable because the material cannot withstand high-voltage charging and discharging.

It should be noted that the O3' type crystal structure is not obtained in some cases only by addition of the additive element A. For example, when x in $Li_xCoO_2$ is less than or equal to 0.24, lithium cobalt oxide containing magnesium and fluorine or lithium cobalt oxide containing magnesium and aluminum has the O3' type crystal structure at 60% or more in some cases, and has the H1-3 type crystal structure at 50% or more in other cases, depending on the concentration and distribution of the additive element A.

In addition, in the case where x is too small, e.g., 0.1 or less, or under the condition where charge voltage is higher than 4.9 V, the positive electrode active material according to one embodiment of the present invention sometimes has the H1-3 type crystal structure or the trigonal O1 type crystal structure. Thus, determining whether or not a positive electrode active material is the positive electrode active material according to one embodiment of the present invention requires analysis of the crystal structure by XRD and other methods and data such as charge capacity or charge voltage.

Note that a positive electrode active material with small x or in the discharged state sometimes causes a change in the crystal structure when exposed to the air. For example, the O3' type crystal structure changes into the H1-3 type crystal structure in some cases. For that reason, all samples subjected to analysis of crystal structures are preferably handled in an inert atmosphere such as an atmosphere including argon.

Whether the additive element A contained in a given positive electrode active material has the above-described distribution can be judged by, for example, analysis using XPS, EDX, EPMA (electron probe microanalysis), or the like.

The crystal structure of the surface portion, a crystal grain boundary, or the like can be analyzed by electron diffraction of a cross section of the positive electrode active material, for example.

[Electrolyte]

In the case where a liquid electrolyte (also referred to as an electrolyte solution) is used for a secondary battery, for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used for the electrolyte, or two or more of them can be used in an appropriate combination at an appropriate ratio.

The electrolyte preferably contains fluorine. As the electrolyte containing fluorine, for example, an electrolyte containing one kind or two or more kinds of fluorinated cyclic carbonates and lithium ions can be used. The fluorinated cyclic carbonate can improve nonflammability and increase the safety of the lithium-ion secondary battery.

As the fluorinated cyclic carbonate, ethylene fluoride carbonate such as monofluoroethylene carbonate (fluoroethylene carbonate, FEC, or FIEC), difluoroethylene carbonate (DFEC or F2EC), trifluoroethylene carbonate (F3EC), or tetrafluoroethylene carbonate (F4EC) can be used, for example. Note that DFEC includes an isomer such as cis-4,5 or trans-4,5. For operation at low temperatures, as the electrolyte, it is important to use one kind or two or more kinds of fluorinated cyclic carbonates to solvate a lithium ion and transfer the lithium ion in the electrolyte included in the electrode in charging and discharging. When the fluorinated cyclic carbonate is not used as a small amount of additive but is contributed to transportation of a lithium ion in charging and discharging, operation can be performed at low temperatures. In the secondary battery, a group of approximately several to several tens of lithium ions moves.

The use of the fluorinated cyclic carbonate for the electrolyte can reduce desolvation energy that is necessary for a solvated lithium ion to enter an active material particle in the electrolyte included in an electrode. The reduction in the desolvation energy can facilitate insertion or extraction of a lithium ion into or from the active material particle even in a low-temperature range. Although a lithium ion sometimes moves remaining in a solvated state, a hopping phenomenon in which coordinated solvent molecules are interchanged occurs in some cases. When desolvation of a lithium ion becomes easy, movement owing to the hopping phenomenon is facilitated and the lithium ion may easily move. A decomposition product of the electrolyte generated by charging and discharging of the secondary battery clings to the surface of the active material, which might cause deterioration of the secondary battery. However, since the electrolyte containing fluorine has a low viscosity, the decomposition product of the electrolyte is less likely to attach to the surface of the active material. Thus, the deterioration of the secondary battery can be suppressed.

In some cases, solvated lithium ions form a cluster in the electrolyte and the cluster moves in the negative electrode, between the positive electrode and the negative electrode, or in the positive electrode, for example.

An example of a structural formula of the fluorinated cyclic carbonate is shown below.

The monofluoroethylene carbonate (FEC) is represented by Formula (1) below.

[Chemical Formula 1]

Formula (1)

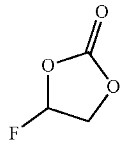

The tetrafluoroethylene carbonate (F4EC) is represented by Formula (2) below.

[Chemical Formula 2]

Formula (2)

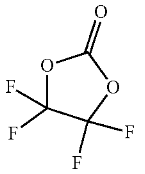

The difluoroethylene carbonate (DFEC) is represented by Formula (3) below.

[Chemical Formula 3]

Formula (3)

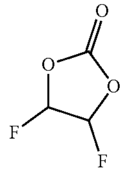

The use of one or more ionic liquids (room temperature molten salts) that are less likely to burn and volatize as the solvent of the electrolyte can prevent one or both of explosion and firing of a secondary battery even when the secondary battery internally shorts out or a temperature increase occurs in the internal region owing to overcharging or the like. An ionic liquid contains a cation and an anion, specifically, an organic cation and an anion. Examples of the organic cation include aliphatic onium cations such as a quaternary ammonium cation, a tertiary sulfonium cation, and a quaternary phosphonium cation, and aromatic cations such as an imidazolium cation and a pyridinium cation. Examples of the anion include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an ionic liquid containing imidazolium cations, an ionic liquid represented by General Formula (G1) below can be used, for example. In General Formula (G1), $R^1$ represents an alkyl group having 1 to 4 carbon atoms, $R^2$ to $R^4$ each independently represent a hydrogen atom or an alkyl group having 1 to 4 carbon atoms, and $R^5$ represents an alkyl group having 1 to 6 carbon atoms or a main chain composed of two or more atoms selected from C, O, Si, N, S, and P atoms. A substituent may be introduced into the main chain represented by $R^5$. Examples of the substituent to be introduced include an alkyl group and an alkoxy group.

[Chemical Formula 4]

(G1)

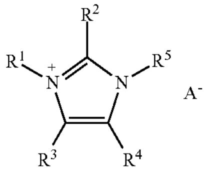

Examples of a cation represented by General Formula (G1) include a 1-ethyl-3-methylimidazolium cation, a 1-butyl-3-methylimidazolium cation, a 1-methyl-3-(propoxyethyl) imidazolium cation, and a 1-hexyl-3-methylimidazolium cation.

As an ionic liquid containing pyridinium cations, an ionic liquid represented by General Formula (G2) below may be used, for example. In General Formula (G2), $R^6$ represents an alkyl group having 1 to 6 carbon atoms or a main chain composed of two or more atoms selected from C, O, Si, N, S, and P atoms, and $R^7$ to $R^{11}$ each independently represent a hydrogen atom or an alkyl group having 1 to 4 carbon atoms. A substituent may be introduced into the main chain represented by $R^6$. Examples of the substituent to be introduced include an alkyl group and an alkoxy group.

[Chemical Formula 5]

(G2)

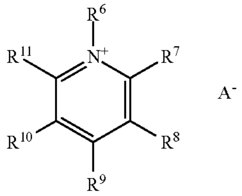

As an ionic liquid containing quaternary ammonium cations, any of ionic liquids represented by General Formula (G3) to General Formula (G6) below can be used, for example.

[Chemical Formula 6]

(G3)

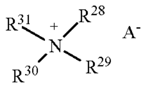

In General Formula (G3), $R^{28}$ to $R^{31}$ each independently represent an alkyl group, methoxy group, methoxymethyl group, or methoxyethyl group having 1 to 20 carbon atoms, or a hydrogen atom.

[Chemical Formula 7]

(G4)

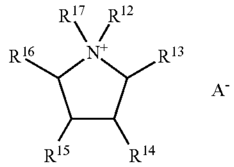

In General Formula (G4), $R^{12}$ and $R^{17}$ each independently represent an alkyl group having 1 to 3 carbon atoms. $R^{13}$ to $R^{16}$ each independently represent any of a hydrogen atom and an alkyl group having 1 to 3 carbon atoms. An example of a cation represented by General Formula (G4) is a 1-methyl-1-propylpyrrolidinium cation.

[Chemical Formula 8]

(G5)

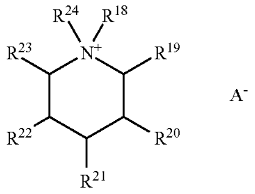

In General Formula (G5), $R^{18}$ and $R^{24}$ each independently represent an alkyl group having 1 to 3 carbon atoms. $R^{19}$ to $R^{23}$ each independently represent any of a hydrogen atom and an alkyl group having 1 to 3 carbon atoms. Examples of a cation represented by General Formula (G5) include an N-methyl-N-propylpiperidinium cation and a 1,3-dimethyl-1-propylpiperidinium cation.

[Chemical Formula 9]

(G6)

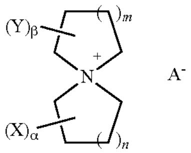

In General Formula (G6), n and m are greater than or equal to 1 and less than or equal to 3. Assume that $\alpha$ is greater than or equal to 0 and less than or equal to 6. When n is 1, $\alpha$ is greater than or equal to 0 and less than or equal to 4. When n is 2, $\alpha$ is greater than or equal to 0 and less than or equal to 5. When n is 3, $\alpha$ is greater than or equal to 0 and less than or equal to 6. Assume that $\beta$ is greater than or equal to 0 and less than or equal to 6. When m is 1, $\beta$ is greater than or equal to 0 and less than or equal to 4. When m is 2, $\beta$ is greater than or equal to 0 and less than or equal to 5. When m is 3, $\beta$ is greater than or equal to 0 and less than or equal to 6. Note that "$\alpha$ or $\beta$ is 0" means "unsubstituted." The case where both a and B are 0 is excluded. X or Y is a substituent such as a straight-chain or side-chain alkyl group having 1 to 4 carbon atoms, a straight-chain or side-chain alkoxy group having 1 to 4 carbon atoms, or a straight-chain or side-chain alkoxyalkyl group having 1 to 4 carbon atoms.

As an ionic liquid containing tertiary sulfonium cations, an ionic liquid represented by General Formula (G7) below can be used, for example. In General Formula (G7), $R^{25}$ to $R^{27}$ each independently represent a hydrogen atom, an alkyl group having 1 to 4 carbon atoms, or a phenyl group. Alternatively, as at least one of $R^{25}$ to $R^{27}$, a main chain composed of two or more atoms selected from C, O, Si, N, S, and P atoms may be used.

[Chemical Formula 10]

(G7)

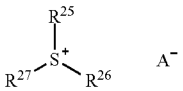

As an ionic liquid containing quaternary phosphonium cations, an ionic liquid represented by General Formula (G8) below can be used, for example. In General Formula (G8), $R^{32}$ to $R^{35}$ each independently represent a hydrogen atom, an alkyl group having 1 to 4 carbon atoms, or a phenyl group. Alternatively, as at least one of $R^{32}$ to $R^{35}$, a main chain composed of two or more atoms selected from C, O, Si, N, S, and P atoms may be used.

[Chemical Formula 11]

(G8)

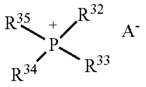

As A-shown in General Formula (G1) to General Formula (G8), one or more of a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion can be used.

As a monovalent amide-based anion, $(C_nF_{2n+1}SO_2)_2N^-$ (n is greater than or equal to 0 and less than or equal to 3) can be used, and as a monovalent cyclic amide-based anion, $(CF_2SO_2)_2N^-$ or the like can be used. As a monovalent methide-based anion, $(C_nF_{2n+1}SO_2)_3C^-$ (n is greater than or equal to 0 and less than or equal to 3) can be used, and as a monovalent cyclic methide-based anion, $(CF_2SO_2)_2C^-(CF_3SO_2)$ or the like can be used. As a fluoroalkyl sulfonic acid anion, $(C_mF_{2m+1}SO_3)^-$ (m is greater than or equal to 0 and less than or equal to 4) or the like is given. As a fluoroalkylborate anion, $\{BF_n(C_mH_kF_{2m+1-k})_{4-n}\}^-$ (n is greater than or equal to 0 and less than or equal to 3, m is greater than or equal to 1 and less than or equal to 4, and k is greater than or equal to 0 and less than or equal to 2m) or the like is given. As a fluoroalkylphosphate anion, $\{PF_n(C_mHAF_{2m+1-k})_{6-n}\}^-$ (n is greater than or equal to 0 and less than or equal to 5, m is greater than or equal to 1 and less than or equal to 4, and k is greater than or equal to 0 and less than or equal to 2m) or the like is given.

As a monovalent amide-based anion, one or more of a bis(fluorosulfonyl)amide anion and a bis(trifluoromethanesulfonyl)amide anion can be used, for example.

An ionic liquid may contain one or more of a hexafluorophosphate anion and a tetrafluoroborate anion.

Hereinafter, an anion represented by $(FSO_2)_2N^-$ is sometimes represented by an FSA anion, and an anion represented by $(CF_3SO_2)_2N^-$ is sometimes represented by a TFSA anion.

The secondary battery according to one embodiment of the present invention includes a lithium ion as a carrier ion, for example. The secondary battery according to one embodiment of the present invention may include, as a carrier ion, an alkali metal ion such as a sodium ion or a potassium ion or an alkaline earth metal ion such as a calcium ion, a strontium ion, a barium ion, a beryllium ion, or a magnesium ion.

In the case where a lithium ion is used as a carrier ion, for example, an electrolyte contains lithium salt. As the lithium salt, for example, $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, or $LiN(C_2F_5SO_2)_2$ can be used.

In this specification, an electrolyte is a general term of a solid material, a liquid material, a semi-solid-state material, and the like.

Deterioration is likely to occur at an interface existing in a secondary battery, e.g., an interface between an active material and an electrolyte. The secondary battery according to one embodiment of the present invention includes the electrolyte containing fluorine, which can prevent deterioration that might occur at an interface between the active material and the electrolyte, typically, alteration of the electrolyte or a higher viscosity of the electrolyte. Alternatively, a structure may be employed in which a binder, a graphene compound, or the like clings to or is held by the electrolyte containing fluorine. This structure can maintain the state where the viscosity of the electrolyte is low, i.e., the state where the electrolyte is smooth, and can improve the reliability of the secondary battery. DFEC to which two fluorine atoms are bonded and F4EC to which four fluorine atoms are bonded have lower viscosities, are smoother, and are coordinated to lithium more weakly than FEC to which one fluorine atom is bonded. Accordingly, it is possible to inhibit attachment of a decomposition product with a high viscosity to an active material particle. When a decomposition product with a high viscosity is attached to or clings to an active material particle, a lithium ion is less likely to move at an interface between active material particles. The solvating fluorine-containing electrolyte reduces generation of a decomposition product that is to be attached to the surface of the active material (the positive electrode active material or the negative electrode active material). Moreover, the use of the electrolyte containing fluorine prevents attachment of a decomposition product, which prevents generation and growth of a dendrite.

The use of the electrolyte containing fluorine as a main component is also a feature of the secondary battery according to one embodiment of the present invention, and the amount of the electrolyte containing fluorine is higher than or equal to 5 volume % or higher than or equal to 10 volume %, preferably higher than or equal to 30 volume % and lower than or equal to 100 volume %.

In this specification, a main component of an electrolyte occupies higher than or equal to 5 volume % of the whole electrolyte of a secondary battery. Here, "higher than or equal to 5 volume % of the whole electrolyte of a secondary battery" refers to the proportion in the whole electrolyte that is measured during manufacture of the secondary battery. In the case where a secondary battery is disassembled after manufactured, the proportions of a plurality of kinds of electrolytes are difficult to quantify, but it is possible to judge whether one kind of organic compound occupies higher than or equal to 5 volume % of the whole electrolyte.

With the use of the electrolyte containing fluorine, it is possible to provide a secondary battery that can operate in a wide temperature range, specifically, higher than or equal to −40° C. and lower than or equal to 150° C., preferably higher than or equal to −40° C. and lower than or equal to 85° C.

An additive such as vinylene carbonate, propane sultone (PS), tert-butylbenzene (TBB), lithium bis(oxalate)borate (LiBOB), or a dinitrile compound such as succinonitrile or adiponitrile may be added to the electrolyte. The concentration of the additive in the whole electrolyte is, for example, higher than or equal to 0.1 volume % and lower than 5 volume %.

The electrolyte may contain one or more aprotic organic solvents such as γ-butyrolactone, acetonitrile, dimethoxyethane, and tetrahydrofuran, in addition to the above.

When a gelled high-molecular material is contained in the electrolyte, safety against liquid leakage and the like is improved. Typical examples of gelled high-molecular materials include a silicone gel, an acrylic gel, an acrylonitrile gel, a polyethylene oxide-based gel, a polypropylene oxide-based gel, and a gel of a fluorine-based polymer.

As the high-molecular material, for example, a polymer having a polyalkylene oxide structure, such as polyethylene oxide (PEO); PVDF; polyacrylonitrile; a copolymer containing any of them; and the like can be used. For example, PVDF-HFP, which is a copolymer of PVDF and hexafluoropropylene (HFP), can be used. The formed polymer may be porous.

[Separator]

A separator is placed between the positive electrode and the negative electrode. As the separator, for example, fiber containing cellulose such as paper; nonwoven fabric; glass fiber; ceramics; synthetic fiber using a nylon resin (polyamide), a vinylon resin (polyvinyl alcohol-based fiber), a polyester resin, an acrylic resin, a polyolefin resin, or a polyurethane resin; or the like can be used. The separator is preferably formed to have an envelope-like shape to wrap one of the positive electrode and the negative electrode.

The separator is a porous material having a pore with a size of approximately 20 nm, preferably a pore with a size of greater than or equal to 6.5 nm, further preferably a pore with a diameter of at least 2 nm.

The separator may have a multilayer structure. For example, an organic material film of polypropylene, polyethylene, or the like can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charging and discharging at a high voltage can be suppressed and thus the reliability of the secondary battery can be improved. When the separator is coated with the fluorine-based material, the separator is easily brought into close contact with an electrode, resulting in high output characteristics. When the separator is coated with the polyamide-based material, in particular, aramid, the safety of the secondary battery can be improved because heat resistance is improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

As an exterior body included in the secondary battery, a can-type exterior body using a metal material such as aluminum or a case-type exterior body using a resin material can be used, for example. Alternatively, a film-like exterior body (also referred to as an exterior film) can also be used. As the exterior film, for example, it is possible to use a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body. With such a three-layer structure, passage of an electrolyte and a gas can be blocked and an insulating property and resistance to the electrolyte can be provided. Heat is applied to the exterior films stacked with the two inner surfaces facing each other, whereby the materials on the inner surfaces melt to cause fusion bonding between the two exterior films. Accordingly, a sealing structure can be formed.

As the exterior film, a fluorine resin film is preferably used. The fluorine resin film has high stability to acid, alkali, an organic solvent, and the like and suppresses a side reaction, corrosion, or the like caused by a reaction of a secondary battery or the like, whereby an excellent secondary battery can be provided. Examples of the fluorine resin film include PTFE (polytetrafluoroethylene), PFA (perfluoroalkoxy alkane: a copolymer of tetrafluoroethylene and perfluoroalkyl vinyl ether), FEP (a perfluoroethylene-propene copolymer: a copolymer of tetrafluoroethylene and hexafluoropropylene), and ETFE (an ethylene-tetrafluoroethylene copolymer: a copolymer of tetrafluoroethylene and ethylene).

This embodiment can be combined with the other embodiments as appropriate.

Embodiment 3

In this embodiment, specific structure examples of secondary batteries according to one embodiment of the present invention will be described with reference to FIG. 14 to FIG. 16.

FIG. 14 and FIG. 15 illustrate examples of external views of the secondary battery according to one embodiment of the present invention.

Figure 14A:
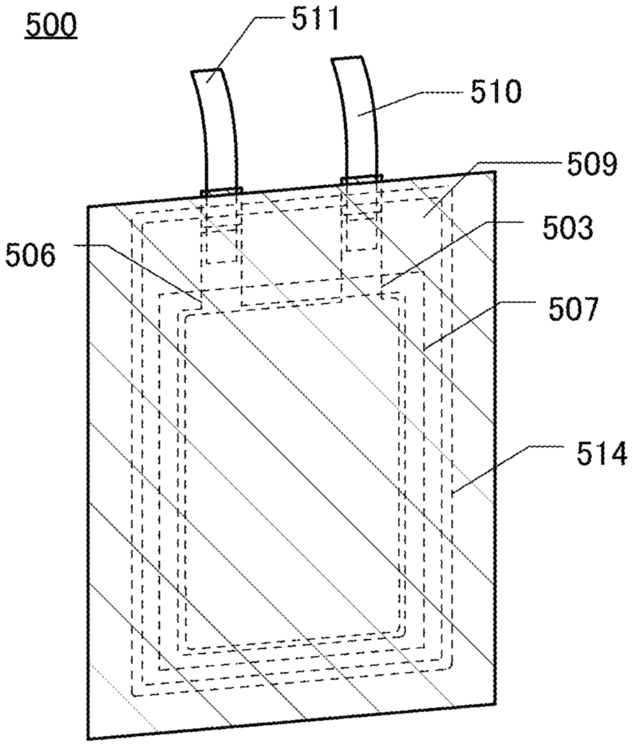
FIG. 14A to FIG. 14C are diagrams illustrating examples of the appearance of a secondary battery.

The secondary battery illustrated in FIG. 14A includes the positive electrode 503, the negative electrode 506, the separator 507, and the exterior body 509. The exterior body 509 is sealed with the seal region 514. The positive electrode 503, the negative electrode 506, and the separator 507 are stacked and placed inside the exterior body 509.

In FIG. 14A, the positive electrode lead electrode 510 is bonded to the positive electrode 503. The positive electrode lead electrode 510 is exposed to the outside of the exterior body 509. The negative electrode lead electrode 511 is bonded to the negative electrode 506, and the negative electrode lead electrode 511 is exposed to the outside of the exterior body 509.

Bonding of the lead electrodes will be described with reference to FIG. 16.

Figure 16A:
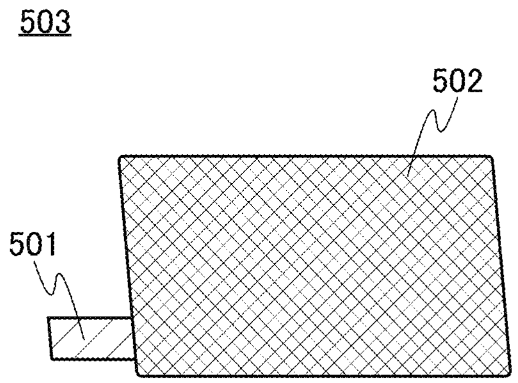
FIG. 16A to FIG. 16C are diagrams illustrating an example of a method for fabricating a secondary battery.

FIG. 16A is an external view of the positive electrode 503. The positive electrode 503 includes the positive electrode current collector 501, and the positive electrode active material layer 502 is formed on the surface of the positive electrode current collector 501. The positive electrode 503 also includes a tab region.

Figure 16B:
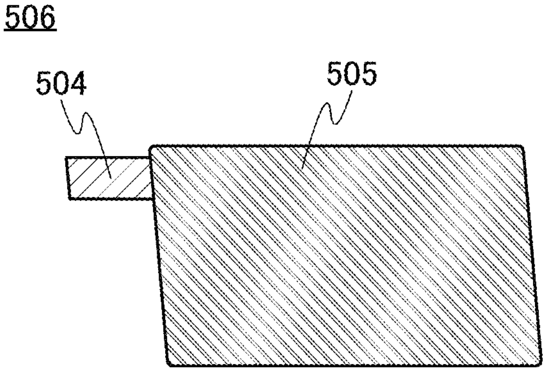

FIG. 16B is an external view of the negative electrode 506. The negative electrode 506 includes the negative electrode current collector 504, and the negative electrode active material layer 505 is formed on the surface of the negative electrode current collector 504. The negative electrode 506 also includes a region where the negative electrode current collector 504 is partly exposed, that is, a tab region. The areas or the shapes of the tab regions included in the positive electrode and the negative electrode are not limited to the examples illustrated in FIG. 16A and FIG. 16B.

Figure 16C:
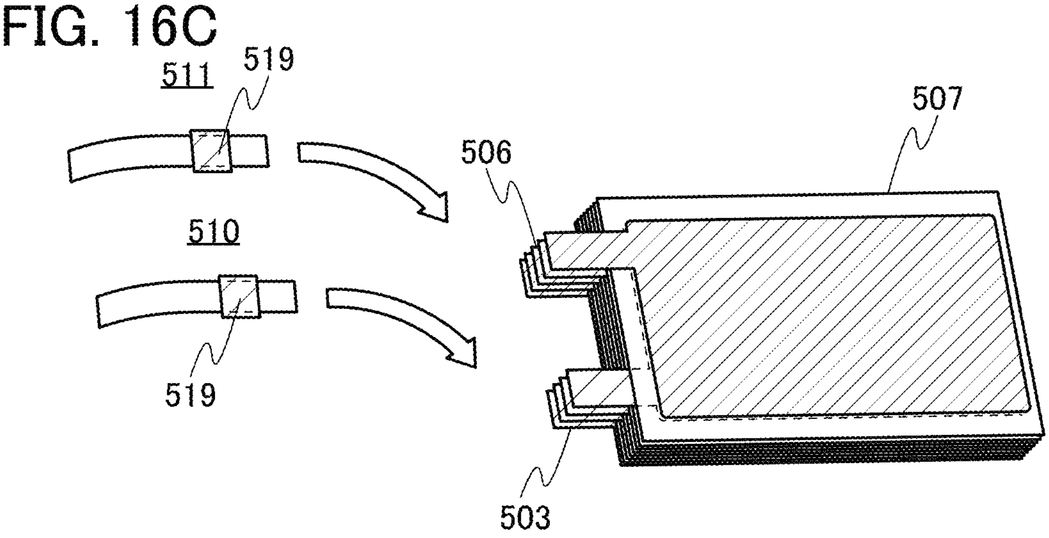

FIG. 16C is a diagram illustrating bonding of the lead electrodes. First, the negative electrode 506, the separator 507, and the positive electrode 503 are stacked. FIG. 16C illustrates a stack of the negative electrode 506, the separator 507, and the positive electrode 503. Here, the stack of the negative electrode, the separator, and the positive electrode includes five negative electrodes and four positive electrodes. The tab regions of the positive electrodes 503 are bonded to each other, and the positive electrode lead electrode 510 is bonded to the tab region of the positive electrode on the outermost surface. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface. The positive electrode lead electrode 510 and the negative electrode lead electrode 511 each include a sealing layer 519 (also referred to as a resin layer or the like). Providing the sealing layer 519 enables thermocompression bonding of the exterior body 509 and the sealing layer 519, thereby inhibiting generation of a space at the time of sealing. In addition, the lead electrodes and the exterior body 509 can be fixed to each other. For the sealing layer 519, a thermoplastic resin, e.g., polypropylene or the like, can be used.

Figure 14B:
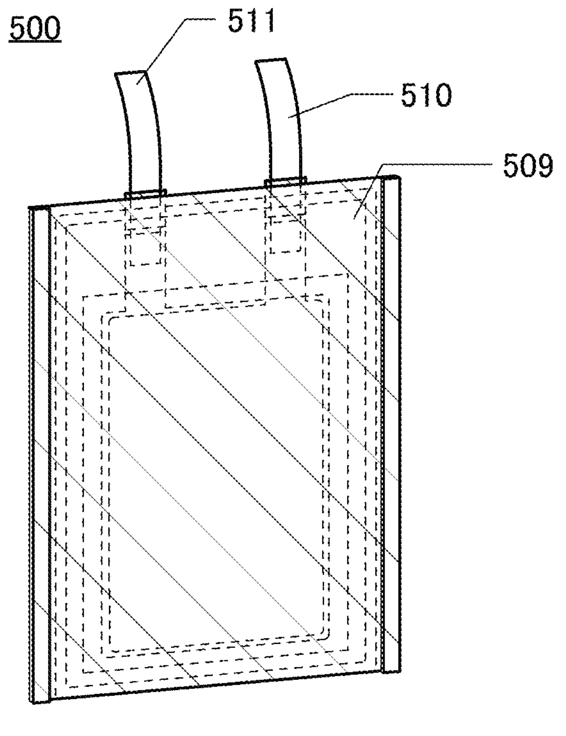
Figure 14C:
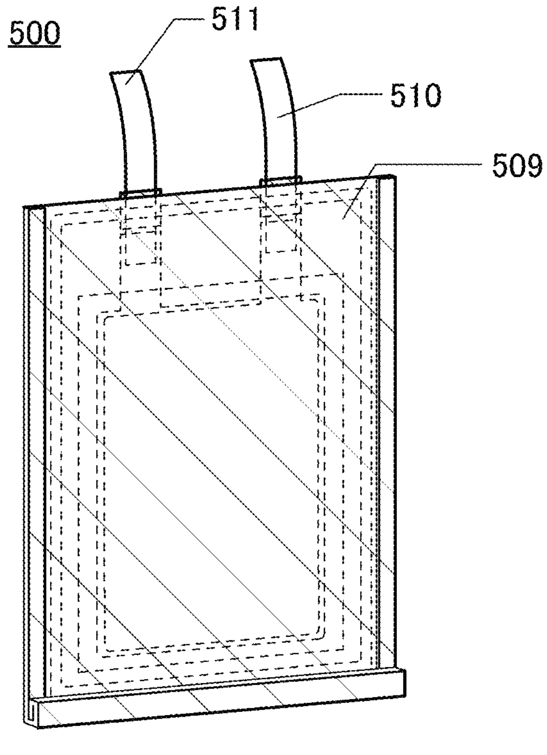

The external view shown in FIG. 14B illustrates an example in which end portions are folded at two sides of the side surfaces of the exterior body 509. Folding the end portions of the exterior body 509 can increase the strength of the exterior body 509. In the case where external force is applied to the secondary battery 500 or in the case where the secondary battery 500 is expanded because of generation of a gas or the like inside the exterior body 509, for example, a problem such as loosened sealing can be reduced. FIG. 14C illustrates an example in which three sides are folded.

Figure 15A:
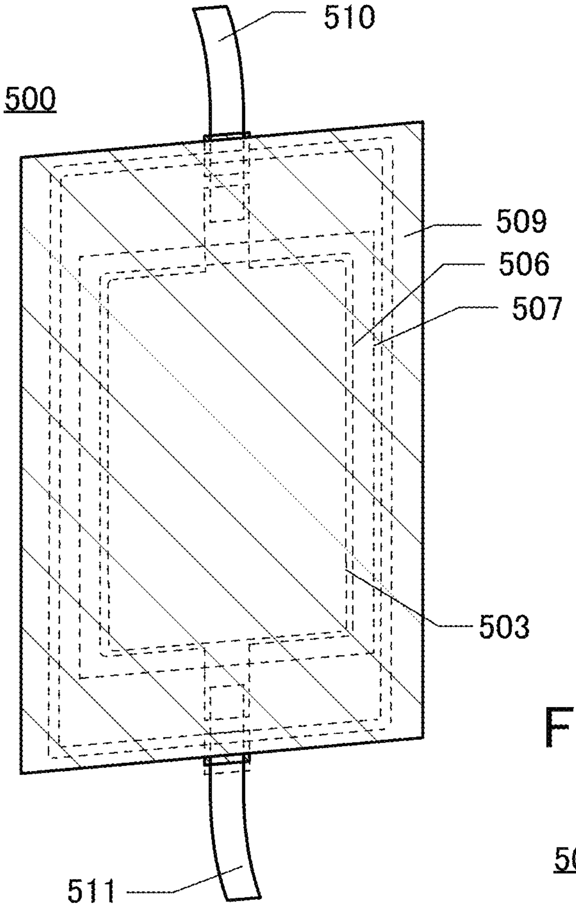
FIG. 15A and FIG. 15B are diagrams illustrating examples of the appearance of a secondary battery.
Figure 15B:
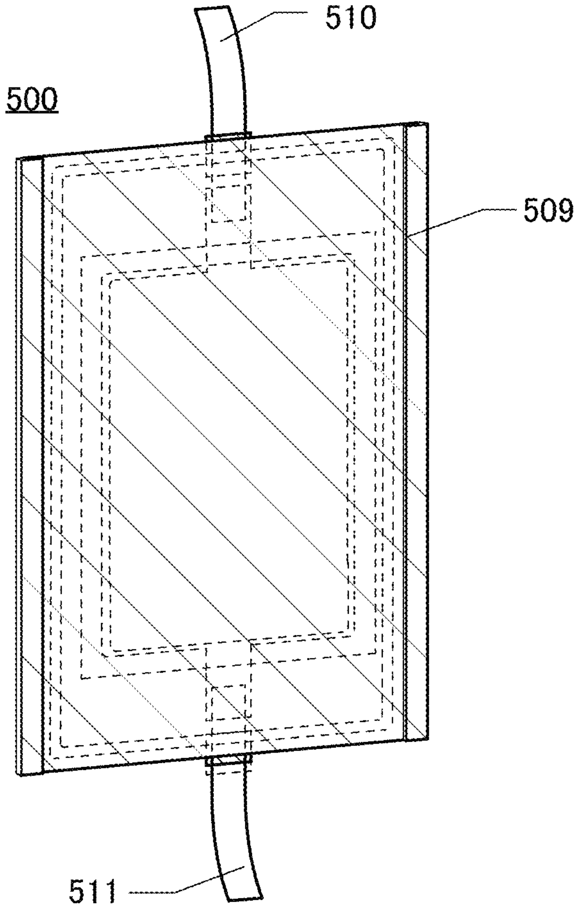

FIG. 14A to FIG. 14C each illustrate an example in which the positive electrode lead electrode 510 and the negative electrode lead electrode 511 are placed on the same side; however, the positive electrode lead electrode 510 and the negative electrode lead electrode 511 may be placed on different sides, e.g., upper and lower sides as illustrated in FIG. 15A. FIG. 15B illustrates an example in which the left side and the right side of the exterior body 509 in FIG. 15A are folded.

This embodiment can be combined with the other embodiments as appropriate.

Embodiment 4

In this embodiment, application examples of the secondary battery according to one embodiment of the present invention will be described with reference to FIG. 17 to FIG. 20.

[Electric Vehicle]

First, an example in which the secondary battery according to one embodiment of the present invention is used in an electric vehicle (EV) will be described.

Figure 17A:
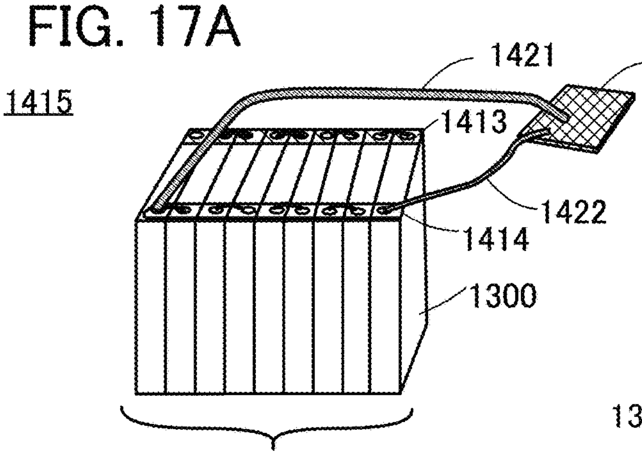
FIG. 17A is a perspective view illustrating an example of a battery pack.
Figure 17B:
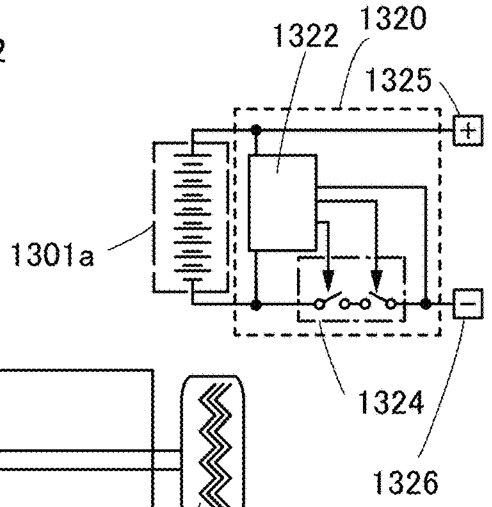
FIG. 17B is a block diagram illustrating an example of a battery pack.
Figure 17C:
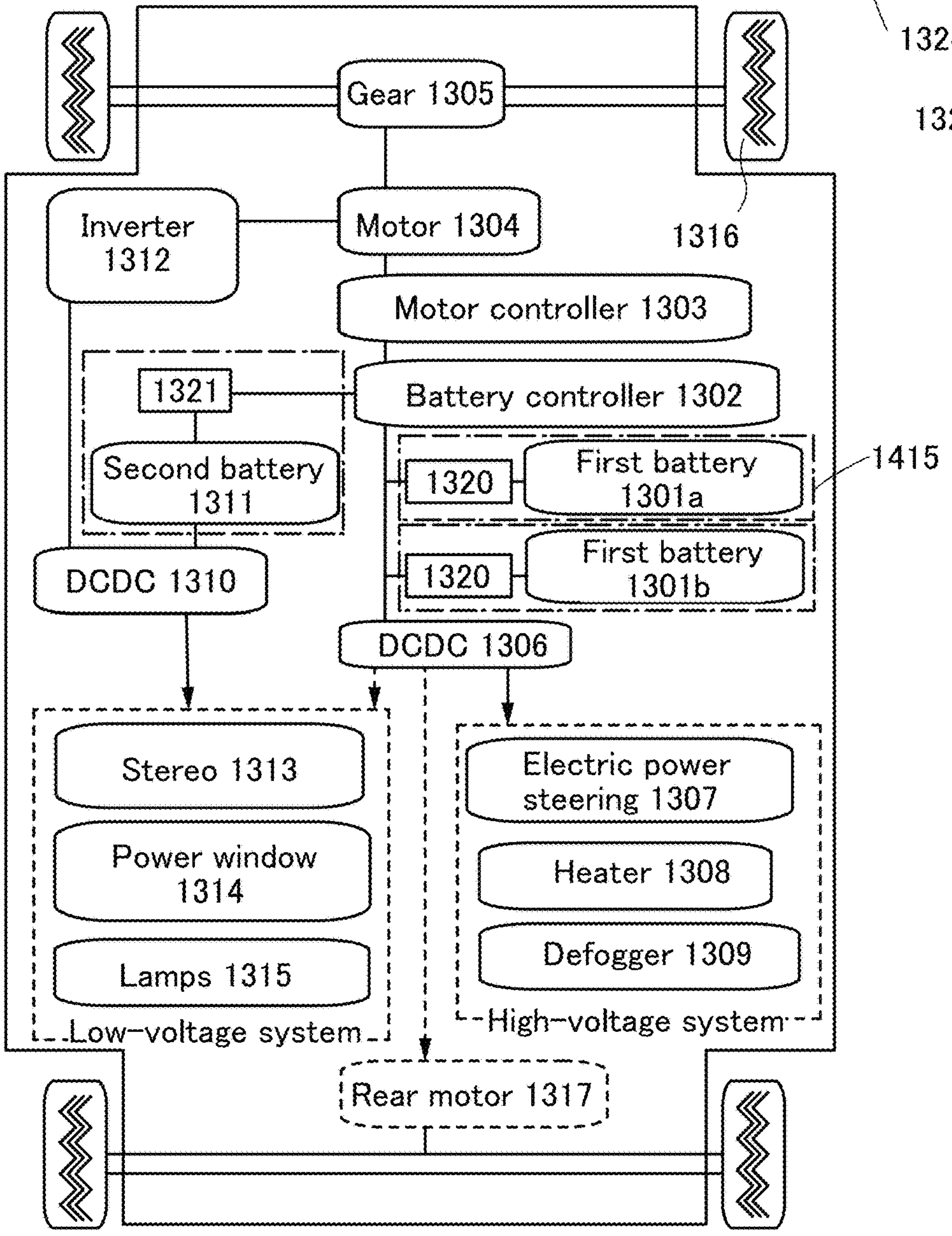
FIG. 17C is a block diagram illustrating an example of a vehicle including a motor.

FIG. 17C is a block diagram of a vehicle including a motor. The electric vehicle is provided with first batteries 1301*a* and 1301*b* as main secondary batteries for driving and a second battery 1311 that supplies electric power to an inverter 1312 for starting a motor 1304.

The second battery 1311 is also referred to as a cranking battery (also referred to as a starter battery). The second battery 1311 only needs high output and high capacity is not so much needed; the capacity of the second battery 1311 is lower than that of the first batteries 1301*a* and 1301*b*.

For example, as one or both of the first batteries 1301*a* and 1301*b*, the secondary battery fabricated by the method for fabricating the secondary battery described in Embodiment 1 can be used.

Although this embodiment illustrates an example in which the two first batteries 1301*a* and 1301*b* are connected in parallel, three or more batteries may be connected in parallel. In the case where the first battery 1301*a* can store sufficient electric power, the first battery 1301*b* may be omitted. With a battery pack including a plurality of secondary batteries, large electric power can be extracted. The plurality of secondary batteries may be connected in parallel, connected in series, or connected in series after being connected in parallel. The plurality of secondary batteries are also referred to as an assembled battery.

An in-vehicle secondary battery includes a service plug or a circuit breaker that can cut off high voltage without the use of equipment in order to cut off electric power from a plurality of secondary batteries. The first battery 1301*a* is provided with such a service plug or a circuit breaker.

Electric power from the first batteries 1301*a* and 1301*b* is mainly used to rotate the motor 1304 and is also supplied to in-vehicle parts for 42 V (for a high-voltage system) (such as an electric power steering 1307, a heater 1308, and a defogger 1309) through a DCDC circuit 1306. In the case where there is a rear motor 1317 for the rear wheels, the first battery 1301*a* is used to rotate the rear motor 1317.

The second battery 1311 supplies electric power to in-vehicle parts for 14 V (for a low-voltage system) (such as a stereo 1313, power windows 1314, and lamps 1315) through a DCDC circuit 1310.

The first battery 1301*a* will be described with reference to FIG. 17A.

FIG. 17A illustrates an example in which nine rectangular secondary batteries 1300 form one battery pack 1415. The nine rectangular secondary batteries 1300 are connected in series; one electrode of each battery is fixed by a fixing portion 1413 made of an insulator, and the other electrode of each battery is fixed by a fixing portion 1414 made of an insulator. Although this embodiment illustrates an example in which the secondary batteries are fixed by the fixing portions 1413 and 1414, a structure in which the secondary batteries are stored in a battery container box (also referred to as a housing) may be employed. Since vibration or a jolt is assumed to be given to the vehicle from the outside (a road surface or the like), the plurality of secondary batteries are preferably fixed with a battery container box or the like by the fixing portions 1413 and 1414. Furthermore, the one electrode of each battery is electrically connected to a control circuit portion 1320 through a wiring 1421. The other electrode of each battery is electrically connected to the control circuit portion 1320 through a wiring 1422.

The control circuit portion 1320 may include a memory circuit including a transistor using an oxide semiconductor. A charging control circuit or a battery control system that includes a memory circuit including a transistor using an oxide semiconductor may be referred to as a BTOS (Battery operating system or Battery oxide semiconductor).

The control circuit portion 1320 senses a terminal voltage of the secondary battery and controls the charging and discharging state of the secondary battery. For example, to prevent overcharging, an output transistor of a charging circuit and an interruption switch can be turned off substantially at the same time.

FIG. 17B illustrates an example of a block diagram of the battery pack 1415 illustrated in FIG. 17A.

The control circuit portion 1320 includes a switch portion 1324 that includes at least a switch for preventing overcharging and a switch for preventing overdischarging, a control circuit 1322 for controlling the switch portion 1324, and a portion for measuring the voltage of the first battery 1301*a*. The control circuit portion 1320 is set to have the upper limit voltage and the lower limit voltage of the secondary battery to be used, and imposes the upper limit of current from the outside, the upper limit of output current to the outside, or the like. The range from the lower limit voltage to the upper limit voltage of the secondary battery is a recommended voltage range, and when a voltage falls outside the range, the switch portion 1324 operates and functions as a protection circuit. The control circuit portion 1320 can also be referred to as a protection circuit because it controls the switch portion 1324 to prevent overdischarging or overcharging. For example, when the control circuit 1322 detects a voltage that is likely to cause overcharging, current is interrupted by turning off the switch in the switch portion 1324. Furthermore, a function of interrupting current in accordance with a temperature rise may be set by providing a PTC element in the charging and discharging path. The control circuit portion 1320 includes an external terminal 1325 (+IN) and an external terminal 1326 (−IN).

The switch portion 1324 can be formed by a combination of n-channel transistors and/or p-channel transistors. The switch portion 1324 is not limited to a switch including a Si transistor using single crystal silicon; the switch portion 1324 may be formed using a power transistor containing Ge (germanium), SiGe (silicon germanium), GaAs (gallium arsenide), GaAlAs (gallium aluminum arsenide), InP (indium phosphide), SiC (silicon carbide), ZnSe (zinc selenide), GaN (gallium nitride), $GaO_x$ (gallium oxide, where x is a real number greater than 0), or the like. A memory element using an OS transistor can be freely placed by being stacked over a circuit using a Si transistor, for example; hence, integration can be easy. Furthermore, an OS transistor can be fabricated with a manufacturing apparatus similar to that for a Si transistor and thus can be fabricated at low cost. That is, the control circuit portion 1320 using OS transistors can be stacked over the switch portion 1324 so that they can be integrated into one chip. Since the area occupied by the control circuit portion 1320 can be reduced, a reduction in size is possible.

The first batteries 1301*a* and 1301*b* mainly supply electric power to in-vehicle parts for a high-voltage system, and the second battery 1311 supplies electric power to in-vehicle parts for a low-voltage system. Lead batteries are usually used for the second battery 1311 due to cost advantage.

In this embodiment, an example in which a lithium-ion secondary battery is used as both the first battery 1301_a_ and the second battery 1311 is described. As the second battery 1311, a lead battery, an all-solid-state battery, or an electric double layer capacitor may be used.

Regenerative energy generated by rolling of tires 1316 is transmitted to the motor 1304 through a gear 1305, and is stored in the second battery 1311 from a motor controller 1303 or a battery controller 1302 through a control circuit portion 1321. Alternatively, the regenerative energy is stored in the first battery 1301_a_ from the battery controller 1302 through the control circuit portion 1320. Alternatively, the regenerative energy is stored in the first battery 1301_b_ from the battery controller 1302 through the control circuit portion 1320. For efficient charging with regenerative energy, the first batteries 1301_a_ and 1301_b_ are desirably capable of fast charging.

The battery controller 1302 can set the charge voltage, charge current, and the like of the first batteries 1301_a_ and 1301_b_. The battery controller 1302 can set charging conditions in accordance with charging characteristics of a secondary battery to be used, so that fast charging can be performed.

Although not illustrated, in the case of connection to an external charger, a plug of the charger or a connection cable of the charger is electrically connected to the battery controller 1302. Electric power supplied from the external charger is stored in the first batteries 1301_a_ and 1301_b_ through the battery controller 1302. Some chargers are provided with a control circuit, in which case the function of the battery controller 1302 is not used; to prevent overcharging, the first batteries 1301_a_ and 1301_b_ are preferably charged through the control circuit portion 1320. In addition, a connection cable or a connection cable of the charger is sometimes provided with a control circuit. The control circuit portion 1320 is also referred to as an ECU (Electronic Control Unit). The ECU is connected to a CAN (Controller Area Network) provided in the electric vehicle. The CAN is a type of a serial communication standard used as an in-vehicle LAN. The ECU includes a microcomputer. Moreover, the ECU uses a CPU or a GPU.

Next, examples in which the secondary battery according to one embodiment of the present invention is mounted on a vehicle, typically a transport vehicle, will be described.

By mounting the secondary battery according to one embodiment of the present invention on vehicles, next-generation clean energy vehicles such as hybrid vehicles (HVs), electric vehicles (EVs), and plug-in hybrid vehicles (PHVs) can be achieved. The secondary battery can also be mounted on transport vehicles such as agricultural machines, motorized bicycles including motor-assisted bicycles, motorcycles, electric wheelchairs, electric carts, boats or ships, submarines, aircraft such as fixed-wing aircraft and rotary-wing aircraft, rockets, artificial satellites, space probes, planetary probes, and spacecraft. With the use of the method for fabricating the secondary battery described in Embodiment 1, a large secondary battery can be provided. Thus, the secondary battery according to one embodiment of the present invention can be suitably used in transport vehicles.

Figure 18A:
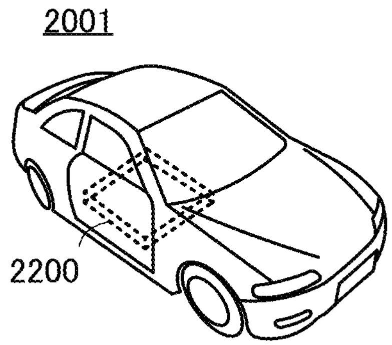
FIG. 18A to FIG. 18D are diagrams illustrating examples of transport vehicles.

FIG. 18A to FIG. 18D illustrate examples of transport vehicles that ues the secondary battery according to one embodiment of the present invention. A motor vehicle 2001 illustrated in FIG. 18A is an electric vehicle that runs on an electric motor as a power source. Alternatively, the motor vehicle 2001 is a hybrid electric vehicle that can appropriately select an electric motor or an engine as a driving power source. In the case where the secondary battery is mounted on the vehicle, the secondary battery is located at one position or several positions. The motor vehicle 2001 illustrated in FIG. 18A includes a battery pack 2200, and the battery pack includes a secondary battery module in which a plurality of secondary batteries are connected to each other. Moreover, the battery pack preferably includes a charge control device that is electrically connected to the secondary battery module.

The motor vehicle 2001 can be charged when the secondary battery included in the motor vehicle 2001 is supplied with electric power through external charging equipment by a plug-in system, a contactless power feeding system, or the like. In charging, a given method such as CHAdeMO (registered trademark) or Combined Charging System can be employed as a charging method, the standard of a connector, or the like as appropriate. The secondary battery may be a charging station provided in a commerce facility or a power source in a house. For example, with the use of the plug-in technique, a power storage device mounted on the motor vehicle 2001 can be charged by being supplied with electric power from the outside. The charging can be performed by converting AC electric power into DC electric power through a converter such as an ACDC converter.

Although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the vehicle is stopped but also when driven. In addition, the contactless power feeding system may be utilized to perform transmission and reception of electric power between two vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

Figure 18B:
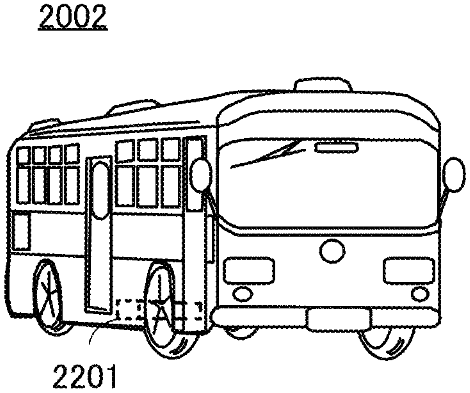

FIG. 18B illustrates a large transporter 2002 having a motor controlled by electricity as an example of a transport vehicle. A secondary battery module of the transporter 2002 includes a cell unit of four secondary batteries with 3.5 V or higher and 4.7 V or lower, for example, and 48 cells are connected in series to have a maximum voltage of 170 V. A battery pack 2201 has the same function as that in FIG. 18A except, for example, the number of secondary batteries configuring the secondary battery module; thus, the description is omitted.

Figure 18C:
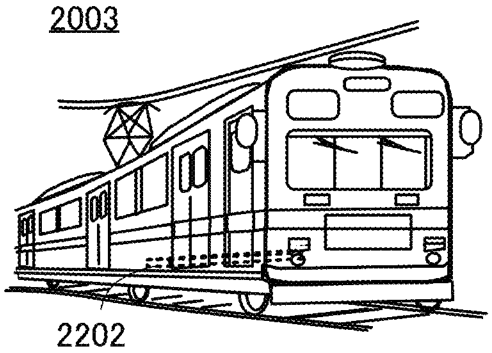

FIG. 18C illustrates a large transport vehicle 2003 having a motor controlled by electricity as an example. The secondary battery module of the transport vehicle 2003 has 100 or more secondary batteries with 3.5 V or higher and 4.7 V or lower connected in series, and the maximum voltage is 600 V, for example. Thus, the secondary batteries are required to have a small variation in the characteristics. With the use of the method for fabricating the secondary battery described in Embodiment 1, a secondary battery with stable battery performance can be manufactured, and mass production at low cost is possible in view of the yield. A battery pack 2202 has the same function as that in FIG. 18A except, for example, the number of secondary batteries configuring the secondary battery module; thus, the description is omitted.

Figure 18D:
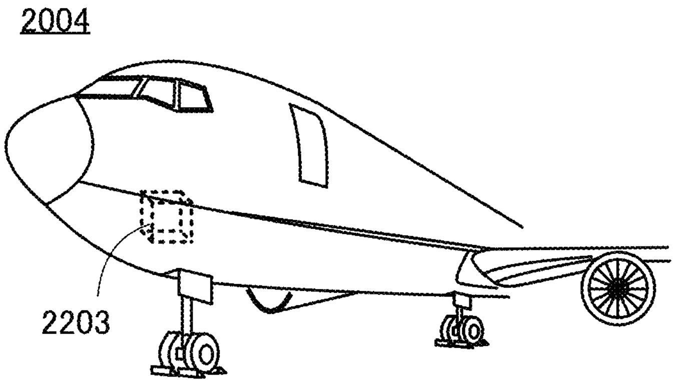

FIG. 18D illustrates an aircraft 2004 having a combustion engine as an example. The aircraft 2004 illustrated in FIG. 18D is regarded as a kind of transport vehicles because it has wheels for takeoff and landing, and includes a battery pack 2203 that includes a charging control device and a secondary battery module configured by connecting a plurality of secondary batteries.

The secondary battery module of the aircraft 2004 has eight 4 V secondary batteries connected in series and has a maximum voltage of 32 V, for example. The battery pack 2203 has the same function as that in FIG. 18A except, for example, the number of secondary batteries configuring the secondary battery module; thus, the description is omitted.

[Building]

Next, examples in which the secondary battery according to one embodiment of the present invention is mounted on a building will be described with reference to FIG. 19.

Figure 19A:
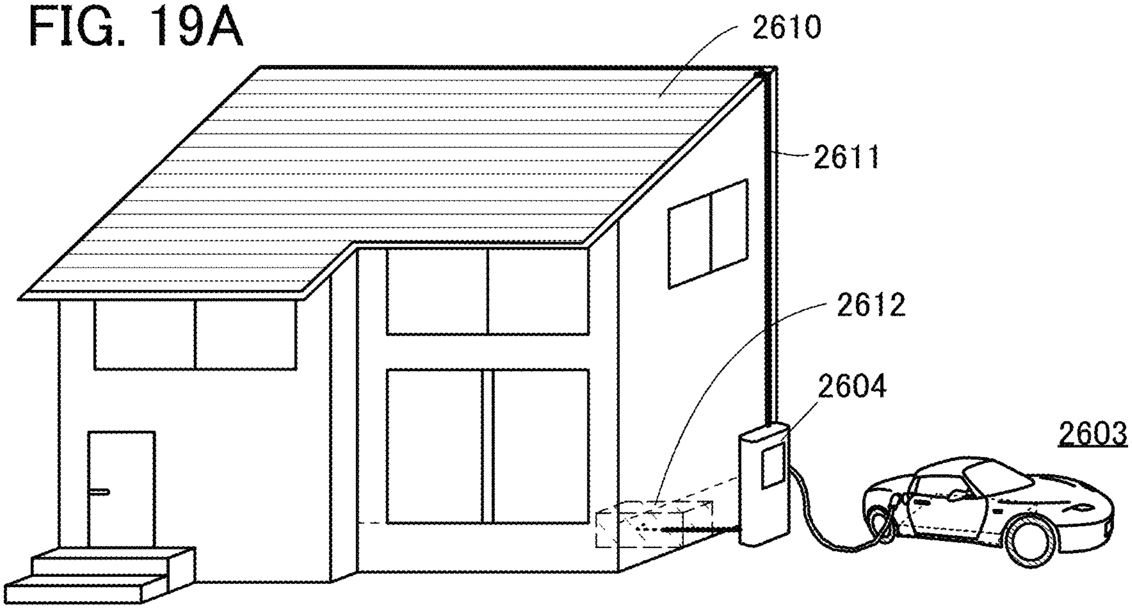
FIG. 19A and FIG. 19B are diagrams illustrating examples of a power storage device.

A house illustrated in FIG. 19A includes a power storage device 2612 including the secondary battery that has stable battery performance by using the method for fabricating the secondary battery described in Embodiment 1 and a solar panel 2610. The power storage device 2612 is electrically connected to the solar panel 2610 through a wiring 2611 or the like. The power storage device 2612 may be electrically connected to ground-based charging equipment 2604. The power storage device 2612 can be charged with electric power generated by the solar panel 2610. The secondary battery included in a vehicle 2603 can be charged with the electric power stored in the power storage device 2612 through the charging equipment 2604. The power storage device 2612 is preferably provided in an underfloor space. The power storage device 2612 is provided in the underfloor space, in which case the space on the floor can be effectively used. Alternatively, the power storage device 2612 may be provided on the floor.

The electric power stored in the power storage device 2612 can also be supplied to other electronic devices in the house. Thus, with the use of the power storage device 2612 as an uninterruptible power source, electronic devices can be used even when electric power cannot be supplied from a commercial power source due to power failure or the like.

Figure 19B:
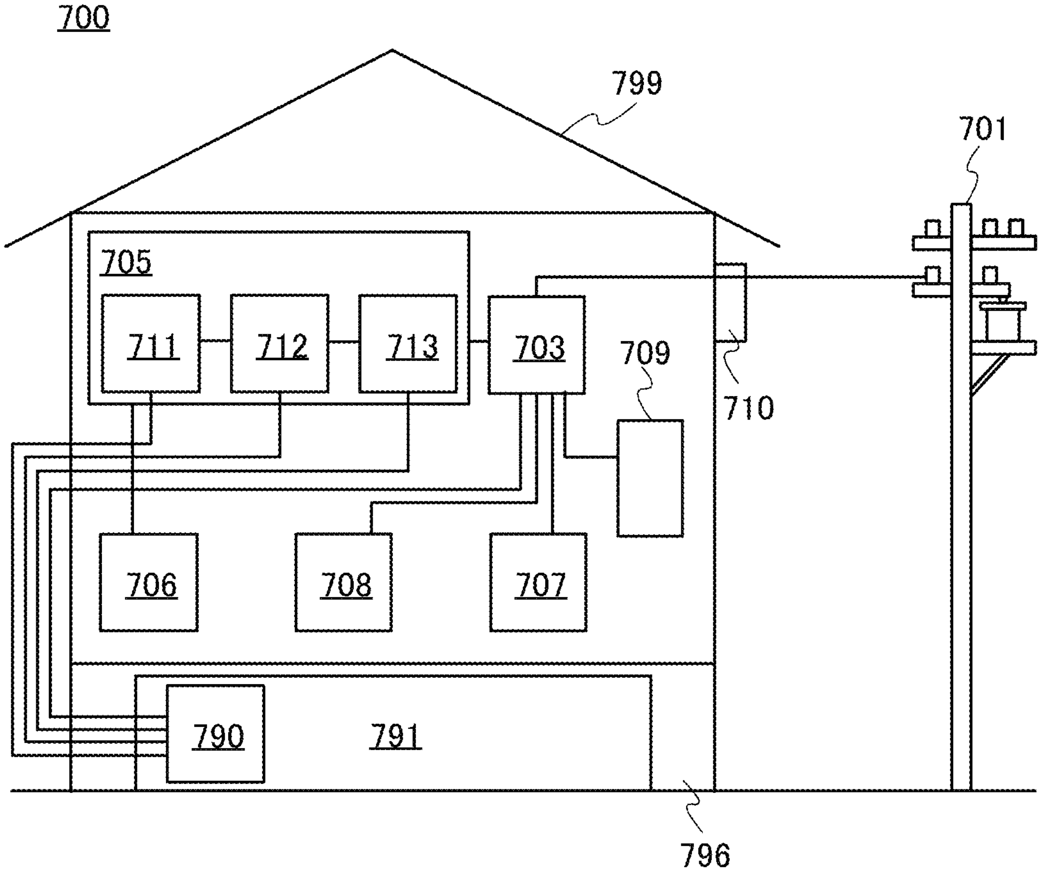

FIG. 19B illustrates an example of a power storage device 700 according to one embodiment of the present invention. As illustrated in FIG. 19B, a large power storage device 791 obtained by the method for fabricating the secondary battery described in Embodiment 1 is provided in an underfloor space 796 of a building 799.

The power storage device 791 is provided with a control device 790, and the control device 790 is electrically connected to a distribution board 703, a power storage controller 705 (also referred to as a control device), an indicator 706, and a router 709 through wirings.

Electric power is transmitted from a commercial power source 701 to the distribution board 703 through a service wire mounting portion 710. Moreover, electric power is transmitted to the distribution board 703 from the power storage device 791 and the commercial power source 701, and the distribution board 703 supplies the transmitted electric power to a general load 707 and a power storage load 708 through outlets (not illustrated).

The general load 707 is, for example, an electric device such as a TV or a personal computer. The power storage load 708 is, for example, an electric device such as a microwave oven, a refrigerator, or an air conditioner.

The power storage controller 705 includes a measuring portion 711, a predicting portion 712, and a planning portion 713. The measuring portion 711 has a function of measuring the amount of electric power consumed by the general load 707 and the power storage load 708 during a day (e.g., from midnight to midnight). The measuring portion 711 may have a function of measuring the amount of electric power of the power storage device 791 and the amount of electric power supplied from the commercial power source 701. The predicting portion 712 has a function of predicting, on the basis of the amount of electric power consumed by the general load 707 and the power storage load 708 during a given day, the demand for electric power consumed by the general load 707 and the power storage load 708 during the next day. The planning portion 713 has a function of making a charging and discharging plan of the power storage device 791 on the basis of the demand for electric power predicted by the predicting portion 712.

The amount of electric power consumed by the general load 707 and the power storage load 708 and measured by the measuring portion 711 can be checked with the indicator 706. It can be checked with an electric device such as a TV or a personal computer through the router 709. Furthermore, it can be checked with a portable electronic terminal such as a smartphone or a tablet through the router 709. With the indicator 706, the electric device, or the portable electronic terminal, for example, the demand for electric power depending on a time period (or per hour) that is predicted by the predicting portion 712 can be checked.

[Electronic Device]

The secondary battery according to one embodiment of the present invention can be used for one or both of an electronic device and a lighting device, for example. Examples of the electronic device include portable information terminals such as mobile phones, smartphones, and laptop computers; portable game machines; portable music players; digital cameras; and digital video cameras.

Figure 20A:
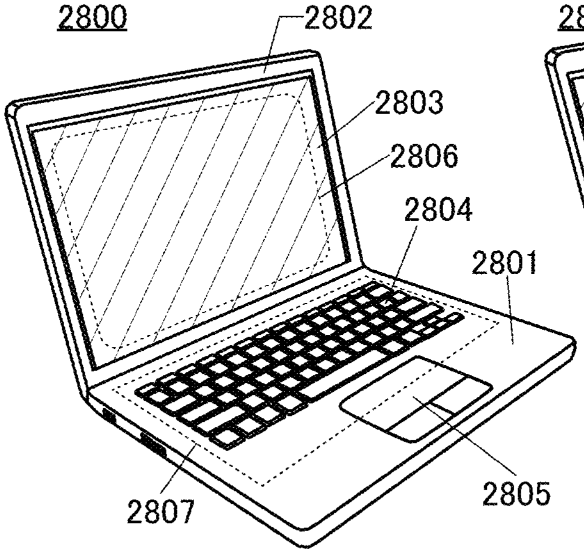
FIG. 20A to FIG. 20E are diagrams illustrating examples of electronic devices.
Figure 20B:
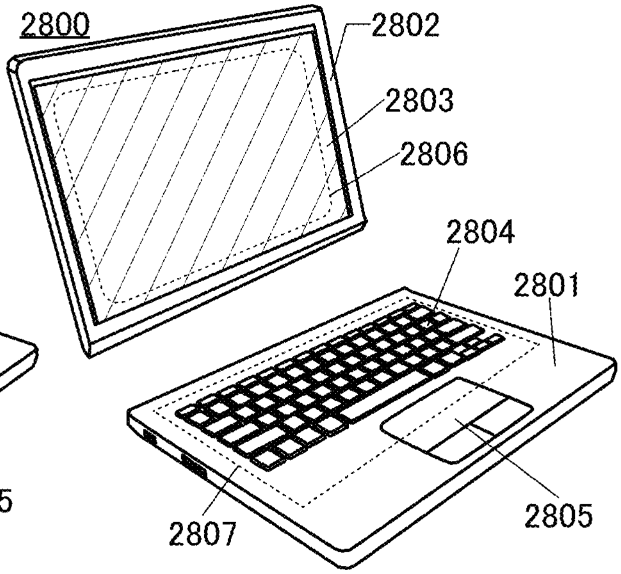

A personal computer 2800 illustrated in FIG. 20A includes a housing 2801, a housing 2802, a display portion 2803, a keyboard 2804, a pointing device 2805, and the like. A secondary battery 2807 is provided inside the housing 2801, and a secondary battery 2806 is provided inside the housing 2802. A touch panel is used for the display portion 2803. As illustrated in FIG. 20B, the housing 2801 and the housing 2802 of the personal computer 2800 can be detached and the housing 2802 can be used alone as a tablet terminal.

The large secondary battery obtained by the method for fabricating the secondary battery described in Embodiment 1 can be used as one or both of the secondary battery 2806 and the secondary battery 2807. The shape of the secondary battery obtained by the method for fabricating the secondary battery described in Embodiment 1 can be changed freely by changing the shape of the exterior body. When the shapes of the secondary batteries 2806 and 2807 fit with the shapes of the housings 2801 and 2802, for example, the secondary batteries can have high capacity and thus the operating time of the personal computer 2800 can be lengthened. Moreover, the weight of the personal computer 2800 can be reduced.

Figure 20C:
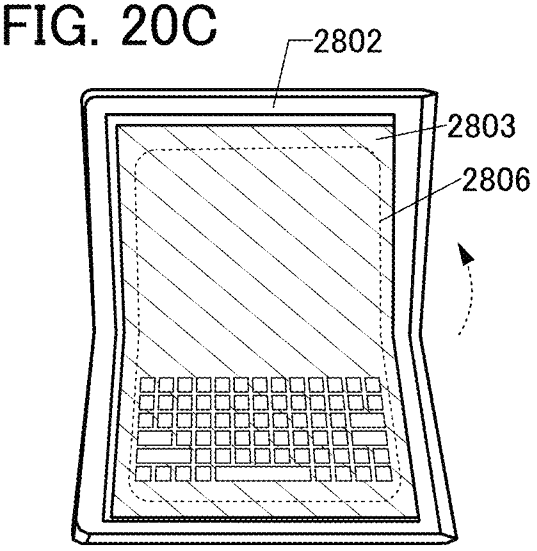

A flexible display is used for the display portion 2803 of the housing 2802. As the secondary battery 2806, the large secondary battery obtained by the method for fabricating the secondary battery described in Embodiment 1 is used. With the use of a flexible film as the exterior body in the large secondary battery obtained by the method for fabricating the secondary battery described in Embodiment 1, a bendable secondary battery can be obtained. Thus, as illustrated in FIG. 20C, the housing 2802 can be used while being bent. In that case, part of the display portion 2803 can be used as a keyboard as illustrated in FIG. 20C.

Figure 20D:
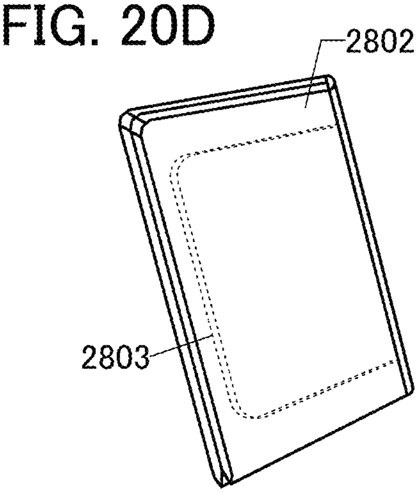
Figure 20E:
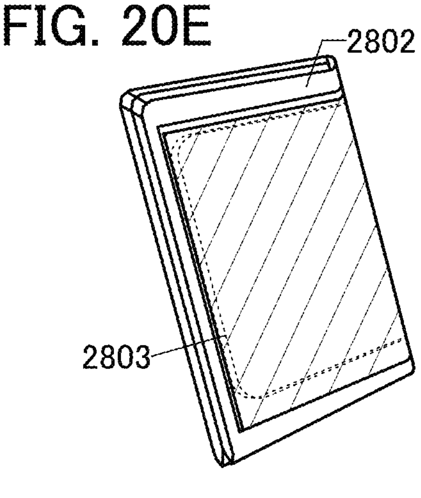

Furthermore, the housing 2802 can be folded such that the display portion 2803 is placed inward as illustrated in FIG. 20D, and the housing 2802 can be folded such that the display portion 2803 faces outward as illustrated in FIG. 20E.

This embodiment can be used in appropriate combination with the other embodiments.

(Notes on Description of this Specification and the Like)

In this specification and the like, crystal planes and orientations are indicated by the Miller index. In the crystallography, a bar is placed over a number in the expression of crystal planes and orientations; however, in this specification and the like, because of application format limitations, crystal planes and orientations may be expressed by placing-(a minus sign) at the front of a number instead of placing a bar over the number. Furthermore, an individual direction that shows an orientation in a crystal is denoted by "[ ]," a set direction that shows all of the equivalent orientations is denoted by "< >," an individual plane that shows a crystal plane is denoted by "( )," and a set plane having equivalent symmetry is denoted by "{ }."

In this specification and the like, a surface portion of a particle of an active material or the like is preferably a region that is less than or equal to 50 nm, further preferably less than or equal to 35 nm, still further preferably less than or equal to 20 nm from the surface, for example. A plane generated by a split or a crack may also be referred to as a surface. In addition, a region whose position is deeper than that of the surface portion is referred to as an inner portion.

In this specification and the like, a layered rock-salt crystal structure of a composite oxide containing lithium and a transition metal refers to a crystal structure in which a rock-salt ion arrangement where cations and anions are alternately arranged is included and lithium and the transition metal are regularly arranged to form a two-dimensional plane, so that lithium can be diffused two-dimensionally. Note that a defect such as a cation or anion vacancy may exist. In the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, a pseudo-spinel crystal structure of a composite oxide containing lithium and a transition metal refers to a crystal structure with a space group R-3m, which is not a spinel crystal structure but a crystal structure where oxygen is hexacoordinated to ions of cobalt, magnesium, or the like and the cation arrangement has symmetry similar to that of the spinel crystal structure.

The orientations of crystals in two regions being substantially aligned with each other can be judged, for example, from a TEM (transmission electron microscope) image, a STEM (scanning transmission electron microscope) image, a HAADF-STEM (high-angle annular dark field scanning transmission electron microscopy) image, an ABF-STEM (annular bright-field scanning transmission electron microscopy) image, or the like. XRD, electron diffraction, neutron diffraction, and the like can also be used for judging. In a TEM image and the like, alignment of cations and anions can be observed as repetition of bright lines and dark lines. When the orientations of cubic close-packed structures in the layered rock-salt crystal and the rock-salt crystal are aligned, a state where an angle made by the repetition of bright lines and dark lines in the crystals is less than or equal to 5°, preferably less than or equal to 2.5° can be observed. Note that in a TEM image and the like, a light element typified by oxygen or fluorine cannot be clearly observed in some cases; in such a case, alignment of orientations can be judged by arrangement of metal elements.

In this specification and the like, a theoretical capacity of a positive electrode active material refers to the amount of electricity obtained when all lithium that can be inserted and extracted and is contained in the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, the charge depth obtained when all lithium that can be inserted and extracted is inserted is 0, and the charge depth obtained when all lithium that can be inserted and extracted and is contained in a positive electrode active material is extracted is 1.

In this specification and the like, charging refers to transfer of lithium ions from a positive electrode to a negative electrode in a battery and transfer of electrons from a positive electrode to a negative electrode in an external circuit. For a positive electrode active material, extraction of lithium ions is called charging. A positive electrode active material with a charge depth greater than or equal to 0.7 and less than or equal to 0.9 may be referred to as a positive electrode active material charged with a high voltage.

Similarly, discharging refers to transfer of lithium ions from a negative electrode to a positive electrode in a battery and transfer of electrons from a negative electrode to a positive electrode in an external circuit. For a positive electrode active material, insertion of lithium ions is called discharging. A positive electrode active material with a charge depth less than or equal to 0.06 or a positive electrode active material from which more than or equal to 90% of the charge capacity is discharged from a high-voltage charged state is referred to as a sufficiently discharged positive electrode active material.

In this specification and the like, an unbalanced phase change refers to a phenomenon that causes a nonlinear change in physical quantity. For example, an unbalanced phase change is presumed to occur around a peak in a dQ/dV curve obtained by differentiating capacitance (Q) with voltage (V) (dQ/dV), resulting in a large change in the crystal structure.

A secondary battery includes a positive electrode and a negative electrode, for example. A positive electrode active material is a material included in the positive electrode. The positive electrode active material is a substance that performs a reaction contributing to the charge and discharge capacity, for example. Note that the positive electrode active material may partly contain a substance that does not contribute to the charge and discharge capacity.

REFERENCE NUMERALS

300: manufacturing apparatus, 301: material introduction chamber, 302: transfer chamber, 303: treatment chamber, 304: treatment chamber, 305: treatment chamber, 306: material extraction chamber, 320: transfer mechanism, 331: stage, 332: alignment camera, 333: suction jig, 334: nozzle, 335: nozzle, 500: secondary battery, 501: positive electrode current collector, 502: positive electrode active material layer, 503: positive electrode, 504: negative electrode current collector, 505: negative electrode active material layer, 506: negative electrode, 507: separator, 509*a*: exterior body, 509*b*: exterior body, 509*c*: concave portion, 509: exterior body, 510: positive electrode lead electrode, 511: negative electrode lead electrode, 512: stack, 513: resin layer, 514:

seal region, 515*a*: electrolyte, 515*b*: electrolyte, 515*c*: electrolyte, 517: resin, 518: resin layer, 519: sealing layer, 521: resin layer, 525: seal region, 529*a*: ultraviolet light transmission region, 529*b*: ultraviolet light blocking region, 700: power storage device, 701: commercial power source, 703: distribution board, 705: power storage controller, 706: indicator, 707: general load, 708: power storage load, 709: router, 710: service wire mounting portion, 711: measuring portion, 712: predicting portion, 713: planning portion, 790: control device, 791: power storage device, 796: underfloor space, 799: building, 1300: rectangular secondary battery, 1301*a*: first battery, 1301*b*: first battery, 1302: battery controller, 1303: motor controller, 1304: motor, 1305: gear, 1306: DCDC circuit, 1307: electric power steering, 1308: heater, 1309: defogger, 1310: DCDC circuit, 1311: second battery, 1312: inverter, 1313: stereo, 1314: power window, 1315: lamps, 1316: tire, 1317: rear motor, 1320: control circuit portion, 1321: control circuit portion, 1322: control circuit, 1324: switch portion, 1413: fixing portion, 1414: fixing portion, 1415: battery pack, 1421: wiring, 1422: wiring, 2001: motor vehicle, 2002: transporter, 2003: transport vehicle, 2004: aircraft, 2200: battery pack, 2201: battery pack, 2202: battery pack, 2203: battery pack, 2603: vehicle, 2604: charging device, 2610: solar panel, 2611: wiring, 2612: power storage device, 2800: personal computer, 2801: housing, 2802: housing, 2803: display portion, 2804: keyboard, 2805: pointing device, 2806: secondary battery, 2807; and secondary battery.

The invention claimed is:

1. A method for fabricating a secondary battery, comprising:

placing a first electrode over a first exterior body;

placing a separator over the first electrode;

placing a second electrode over the separator;

dripping an electrolyte on at least one of the first electrode, the separator, and the second electrode;

placing a resin layer over the first exterior body to surround the first electrode, the separator, and the second electrode in a frame-like manner;

impregnating at least one of the first electrode, the separator, and the second electrode with the electrolyte and then placing a second exterior body over the first exterior body to cover the first electrode, the separator, and the second electrode;

curing at least part of the resin layer by irradiation of the resin layer with ultraviolet light under reduced pressure; and sealing the first electrode, the separator, and the second electrode with the first exterior body and the second exterior body under atmospheric pressure after the ultraviolet light irradiation, wherein one of the first electrode and the second electrode is a positive electrode, and the other is a negative electrode, and wherein an area of the resin layer irradiated with the ultraviolet light during the sealing is larger than an area of the resin layer irradiated with the ultraviolet light under the reduced pressure.

2. The method for fabricating a secondary battery, according to claim 1, wherein the first exterior body comprises a concave portion, and wherein the first electrode, the separator, and the second electrode are placed in the concave portion.

3. The method for fabricating a secondary battery, according to claim 1, wherein the sealing is performed by thermocompression bonding.

4. The method for fabricating a secondary battery, according to claim 1, wherein the second exterior body is configured to transmit ultraviolet light at least in a region overlapping the resin layer.

5. The method for fabricating a secondary battery, according to claim 1, wherein the second exterior body is configured to block ultraviolet light at least in a region overlapping at least one of the first electrode, the separator, and the second electrode.

6. The method for fabricating a secondary battery, according to claim 1, further comprising a step of connecting a first lead electrode to the first electrode and a step of connecting a second lead electrode to the second electrode before the ultraviolet light irradiation under the reduced pressure.

7. The method for fabricating a secondary battery, according to claim 1, wherein the electrolyte comprises fluorine.

8. The method for fabricating a secondary battery, according to claim 1, wherein the electrolyte comprises an ionic liquid.

9. The method for fabricating a secondary battery, according to claim 1, wherein one or both of the first electrode and the second electrode comprise graphene.

10. The method for fabricating a secondary battery, according to claim 1, wherein the first electrode comprises a first active material layer on one or both surfaces of a first current collector.

11. The method for fabricating a secondary battery, according to claim 1, wherein the second electrode comprises a second active material layer on one or both surfaces of a second current collector.

* * * * *